US006413448B1

(12) United States Patent
Wand et al.

(10) Patent No.: US 6,413,448 B1
(45) Date of Patent: Jul. 2, 2002

(54) CYCLOHEXYL- AND CYCLOHEXENYL-SUBSTITUTED LIQUID CRYSTALS WITH LOW BIREFRINGENCE

(75) Inventors: Michael Wand, Boulder; William Thurmes, Longmont; Kundalika M. More, Denver; Xin-Hua Chen, Erie, all of CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 09/299,511

(22) Filed: Apr. 26, 1999

(51) Int. Cl.$^7$ .......................... C09K 19/30; C09K 19/20

(52) U.S. Cl. ............................ 252/299.63; 252/299.67

(58) Field of Search .................. 252/299.63, 299.6, 252/299.01, 299.61, 299.5; 544/298; 546/339, 342

(56) References Cited

U.S. PATENT DOCUMENTS

| | | | | |
|---|---|---|---|---|
| 4,212,762 A | * | 7/1980 | Dubois et al. | 252/299.67 |
| 5,180,521 A | | 1/1983 | Eidenschink et al. | 252/299.61 |
| 4,490,278 A | * | 12/1984 | Schubert et al. | 252/299.63 |
| 4,874,544 A | | 10/1989 | Yong et al. | 252/299.61 |
| 4,886,622 A | | 12/1989 | Miyazawa et al. | 252/299.61 |
| 4,943,384 A | | 7/1990 | Sucrow et al. | 252/299.61 |
| 4,952,335 A | | 8/1990 | Furukawa et al. | 252/299.61 |
| 5,051,506 A | | 9/1991 | Wand et al. | 544/289 |
| 5,082,589 A | * | 1/1992 | Buchecker et al. | 252/299.63 |
| 5,190,692 A | | 3/1993 | Coates et al. | 252/299.63 |
| 5,250,219 A | | 11/1993 | Mori et al. | 252/299.61 |
| 5,271,864 A | | 12/1993 | Wand et al. | 252/299.61 |
| 5,346,647 A | | 9/1994 | Kelly et al. | 252/299.63 |
| 5,391,319 A | * | 2/1995 | Junge et al. | 252/299.01 |
| 5,393,458 A | * | 2/1995 | Kelly | 252/299.01 |
| 5,445,763 A | | 8/1995 | Schlosser et al. | 252/299.61 |
| 5,453,218 A | | 9/1995 | Wand et al. | 252/299.01 |
| 5,629,428 A | | 5/1997 | Schlosser et al. | 546/303 |
| 5,744,060 A | * | 4/1998 | Tarumi et al. | 252/299.63 |
| 5,866,036 A | | 2/1999 | Wand et al. | 252/299.6 |
| 5,972,241 A | * | 10/1999 | Johnson | 252/299.61 |
| 6,057,006 A | * | 5/2000 | Kirsch et al. | 428/1 |
| 6,106,908 A | * | 8/2000 | Duffy et al. | 428/1.1 |

FOREIGN PATENT DOCUMENTS

| | | |
|---|---|---|
| DE | 3906040 | 9/1989 |
| DE | 3928267 | 2/1991 |
| DE | 4315867 A1 | 11/1994 |
| EP | 0 307 880 | 3/1989 |
| EP | 331091 | 9/1989 |
| EP | 0 356 672 | 3/1990 |
| EP | 0 401 522 | 12/1990 |
| WO | 86/06401 | 11/1986 |
| WO | 87/05015 | 8/1987 |
| WO | 87/05018 | 8/1987 |

OTHER PUBLICATIONS

CAPLUS 1989: 240081.*
CAPLUS 1980: 604304.*
CAPLUS 1996: 179123.*

Bezborodov et al. (1989), "Synthesis, mesomorphic porperties and potential applications of aryl esters of 4–n–alkycyclohexene–1–carboxylic acids in electrooptic displays," Liq. Cryst. 4(2):209–215.

Fung et al. (1989), "Liquid Crystals Containing a Cyclohexene Ring," Mol. Cryst. Liq. Cryst. Let. 6(6):191–196.

Kelly, S. M. (1991), "Four unit linking groups. II. Some novel smectic C materials," Liq. Cryst.10(2):243–260.

Li et al. (1991), "Liquid Crystals with a Chiral Core: Cyclohexene Carboxylates," Mol. Cryst. Liq. Cryst. 199:379–386.

Wand et al. (CAPLUS 1995: 16385).

(List continued on next page.)

*Primary Examiner*—Shean C. Wu
(74) *Attorney, Agent, or Firm*—Greenlee, Winner & Sullivan, P.C.

(57) ABSTRACT

A liquid crystal composition comprising a host material and a low birefringence liquid crystal composition of the formula:

$$R_1—Ar—R_2$$

wherein $R_1$ and $R_2$, independently of one another, are selected from the group consisting of internally branched alkyl groups having from 4 to 20 carbon atoms, terminally branched alkyl groups having from 3 to 20 carbon atoms, internally branched alkenyl groups having from 3 to 20 carbon atoms and terminally branched alkenyl groups having from 4 to 20 carbon atoms, wherein one or more —$CH_2$— groups in $R_1$ and $R_2$ may be independently replaced with O, said $R_1$ or $R_2$, independently of one another, can be partially or fully halogenated, and wherein one or both of said $R_1$ and $R_2$ can be absent;

Ar is a ring core moiety of the general formula:

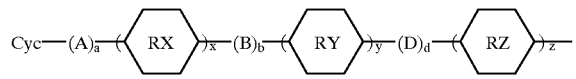

wherein Cyc is a cyclohexyl ring or a cyclohexenyl ring;
RX is a phenyl ring which may be optionally substituted with one or more fluorines; RY is a cyclohexyl or cyclohexenyl ring;
wherein x and y are 1 and z is 0;
wherein A is COO; and B is selected from the group of small alkyl or alkenyl group having from 1 to 8 carbon atoms, COO and OCO;
wherein a and b are 1 and d is zero.

6 Claims, No Drawings

OTHER PUBLICATIONS

Coates, D. and Greenfield, S. (1991), "Liquid crystal compositions comprising 4–alkyl–4'–(o–fluorophenethyl)bicyclohexanes for supertwisted nematic eletrooptical display devices," Chem. Abstracts, vol. 115, Abstract No. 115:82430v, p. 752.

Escher, C. et al. (1991), "Liquid crystal compositions for electrooptical display devices," Chem. Abstracts vol. 115, Abstract No. 115:194312q, p. 775.

Nohira, H. et al. (1989), "Optically active compounds and liquid–crystal compositions and devices containing them," Chem. Abstracts vol. 111, Abstract No. 111:15479x, p. 571.

Takatsu, H. et al. (1984), "Synthesis and Some Properties of Nematic Compounds Containing Three Ring Systems," Mol. Cryst. Liq. Cryst. Liq. Cryst. 111:311–319.

Takehara, S. et al. (1991), "A ferroelectric chiral smectic liquid crystal composition contaiing a high temperature liquid crystal: trans–1–(hetero)aryloxymethyl–4–alkylcyclohexane," Chem. Abstracts, vol. 115, Abstract No. 115: 102976h, p. 735.

Takehara, S. et al. (1991), "Ferroelectric liquid crystal compositions," Chem. Abstracts, vol. 115, Abstract No. 115:82385j, p. 750.

Takiguchi, T. et al. (1991), "Ferroelectric liquid crystal composition," Chem. Abstract, vol. 115, Abstract No. 115:82387m, p. 750.

* cited by examiner

CYCLOHEXYL- AND CYCLOHEXENYL-SUBSTITUTED LIQUID CRYSTALS WITH LOW BIREFRINGENCE

STATEMENT REGARDING FEDERALLY SPONSORED RESEARCH OR DEVELOPMENT

This research was made with partial support of the United States Government under National Science Foundation Contract No. DMI 9303208. The United States Government has certain rights in this invention.

BACKGROUND OF THE INVENTION

Liquid crystals have found use in a variety of electro-optical and display device applications, in particular those which require compact, energy-efficient, voltage-controlled light valves such as watch and calculator displays. Development of a flat panel display device capable of high quality color/gray scale output is an important technological goal. Liquid crystal displays have a number of unique useful characteristics, including low voltage and low power of operation. In such displays, a thin layer of liquid crystal material is placed between glass plates and the optical properties of small domains in the layer are controlled by the application of electric fields with high spatial resolution. This gives a device called a spatial light modulator (SLM), which is an array of pixels which either block or transmit light. The current generation of LCDs utilize the supertwisted nematic cell for displays with high contrast but limited off-axis viewability. These devices are based upon the dielectric alignment effects in nematic, cholesteric and smectic phases of the liquid crystal compound in which, by virtue of dielectric anisotropy, the average molecular long axis of the compound takes a preferred orientation in an applied electric field. However, since the coupling to an applied electric field by this mechanism is rather weak, the electro-optical response time of liquid crystal based displays may be too slow for many potential applications such as in flat-panel displays for use in video terminals, oscilloscopes, radar and television screens. Fast optical response times become increasingly important for applications to larger area display devices. Insufficient nonlinearity of liquid crystal based displays can also impose limitations for many potential applications.

Electro-optic effects with sub-microsecond switching speeds can be achieved using the technology of ferroelectric liquid crystals (FLCs) of N. A. Clark and S. T. Lagerwalll (1980) Appl. Phys. Lett. 36:899 and U.S. Pat. No. 4,367,924. These investigators have reported display structures prepared using FLC materials having not only high speed response (about 1,000 times faster than currently used twisted nematic devices), but which also exhibit bistable, threshold sensitive switching. Such properties make FLC based devices excellent candidates for light modulation devices including matrix addressed light valves containing a large number of elements for passive displays of graphic and pictorial information, optical processing applications, as well as for high information content dichroic displays.

Ferroelectric liquid crystals (FLCs) are fluids possessing thermodynamically stable polar order. As the liquid crystal cools from a normal isotropic liquid (I) to a crystalline state (X), it passes through a series of mesogenic phases of increasing molecular order. Some of these phases include the smectic A (A or $S_A$), and smectic C (C, SC, or $S_C$), or chiral smectic C (C*). Only the smectic C phase possesses the thermodynamically stable polar order necessary to exhibit a net dipole moment. In the smectic C phase the molecules self-assemble into layers, with the long axis of the molecules coherently tilted with respect to the layer normal. The single polar axis of the phase is normal to the tilt plane. For most such FLCs, a spontaneous macroscopic dipole density or spontaneous ferroelectric polarization (P) along the polar axis is easily measurable.

Smectic C liquid crystal phases composed of chiral, nonracemic molecules possess this spontaneous ferroelectric polarization, or macroscopic dipole moment, deriving from a dissymmetry in the orientation of molecular dipoles in the liquid crystal phases (Meyer et al. (1975) J. Phys. (Les Ulis, Fr) 36:L-69). The ferroelectric polarization density is an intrinsic property of the material making up the phase and has a magnitude and sign for a given material under a given set of conditions. In ferroelectric liquid crystal display devices, like those of Clark and Lagerwall, appropriate application of an external electric field results in alignment of the chiral molecules in the ferroelectric liquid crystal phase with the applied field. When the sign of the applied field is reversed, realignment or switching of the FLC molecules occurs. This switching can be employed for light modulation. Within a large range of electric field strengths, the switching speed (optical rise time) is inversely proportional to applied field strength and polarization or dipole density (P), and directly proportional to orientational viscosity. Fast switching speeds are then associated with FLC phases which possess high polarization density and low orientational viscosity. The necessary switching speed to achieve a fall color display with temporal gray-scale is about $6\mu$ sec.

Birefringence is given by the following equation:

$$\Delta n = n_e - n_o$$

where $n_e$ is the index of refraction along the extraordinary axis of a birefringent material (parallel to the optical axis) and $n_o$ is the index of refraction along the ordinary axis (perpendicular to the optical axis). Many compounds of the present invention have improved solubility in FLC mixtures containing such compounds, and improved melting temperatures of FLC mixtures containing such compounds. Many compounds of the present invention confer to FLC mixtures containing them decreased viscosity and improved tilt angle.

Another important material characteristic is the birefringence. The birefringence of a compound or composition is the difference in refractive indices between different orientations of the LC.

Birefringence refers to the property of a liquid crystal to interact more strongly with light along one LC axis than along another LC axis. Most LCs are made of a core with extensive electron delocalization, to which one or two tails may be attached to help orient the molecules, give a dipole moment or polarization, or confer other desirable properties on the molecule. Typical LCs are rod-shaped with the majority of the π electron delocalization along the long or extraordinary axis (also referred to as the director). As a consequence, the extraordinary axis of LCs have a higher index of refraction than the ordinary axis, so the birefringence (Δn) is positive. Birefringence of a liquid crystal at a given wavelength is given by:

$$\Delta n = G(T) \frac{\lambda^2 \lambda^{*2}}{\lambda^2 - \lambda^{*2}}$$

where Δn is the birefringence at a given wavelength, G is a constant, T is the temperature, λ is the wavelength, λ* is the mean resonance frequency which can be calculated using the spectrum of a material, or its birefringence at several wavelengths. See, e.g., S.-T. W (1986) Phys. Rev. A 33:1270; S.-T. W (1987) Opt. Eng. 26:120; S.-T. W, C.-S. W (1989) J. Appl. Phys. 66:5297; S.-T. W et al. (1993) Opt. Eng. 32:1775. As the wavelength of interest moves away from $\lambda^*$, the birefringence decreases asymptotically until in the infrared, the birefringence is relatively constant (except in the near-IR portion of the spectrum).

The optimum thickness of the FLC film when used as a half-wave plate (the half-wave thickness $d_{1/2}$) in the device depends on the birefringence ($\Delta n$) of the material and light wavelength ($\lambda$) according to the following equation:

$$d_{1/2} = \frac{\lambda}{2\Delta n}$$

Optimal thickness of a FLC film is achieved when the contrast is maximized and true color transmission is exhibited.

Some of the materials with the lowest birefringence currently available possess birefringence around 0.20. This corresponds to a thickness of the FLC for visible light modulation of about 2 $\mu$m gm. The use of thinner devices is limited by manufacturing techniques and material characteristics. Manufacturing techniques for large area, very thin devices are expensive and difficult to implement. When thin LC cells are used, small variances in cell thickness can have a significant effect on the cell's optical properties. For example, a 0.1 $\mu$m variance in thickness of a cell that is 1.1 $\mu$m thick results in a ±9% difference in transmission, whereas the same variance in a thicker 1.9 $\mu$m cell results in only a ±5% difference in transmission. Thinner LC cells also tend to suffer from non-uniform spacing, which can lead to short circuits. Environmental contamination of LC cells, for example inclusion of dust and other contaminants, has a more severe effect on thinner cells. For flat panel video screens, for example, lower birefringence FLCs would allow thicker cells with lower fabrication costs. In addition, compounds with lower birefringence than currently available materials possess would permit LC cell designs using thicker cells for more stability, easier manufacturing and lower cost. There is a need in the art for LC materials, particularly FLC materials, with decreased birefringence.

Another area where low birefringence FLCs would provide a significant advantage are UV modulators for laser marking applications. At the short wavelengths used in laser marking applications (308 and 349 nm), the device FLC film thickness approaches 1 $\mu$m and manufacturability becomes an issue. Decreasing the birefringence by approximately 40% brings the cell thickness back into the range of normal fabrication capabilities.

A basic requirement for application of ferroelectric liquid crystals in such devices is the availability of chemically stable liquid crystal materials which exhibit ferroelectric phases (chiral smectic C*) over a substantial temperature range about room temperature. Useful device operating temperatures range from about 10° C. to about 80° C. More typical device operating temperatures range from 10° C. to 30° C. In some cases, the ferroelectric liquid crystal compound itself will possess an enantiotropic or monotropic ferroelectric (chiral smectic C*) liquid crystal phase. More typically, the device properties of interest can not be achieved in a single compound, but by mixing components of a mixture, the desired device properties can be achieved. Ferroelectric liquid crystal mixtures possessing chiral smectic C* phases with useful temperature ranges can also be obtained by mising chiral, nonracemic compounds, designated ferroelectric liquid crystal dopants, into a liquid crystal host material (which may or may not be composed of chiral molecules). Commercial LC mixtures are generally composed of at least eight components. FLC mixtures generally contain two types of components: 1) a smectic C host, designed to give the mixture the required temperature range and other standard LC properties; and 2) dopant molecules that affect the ferroelectric polarization density and/or the viscosity of the C* phase and thereby affect the switching speed. Desirable FLC dopants are molecules which impart high ferroelectric polarization density to an FLC material without significantly increasing the orientational viscosity of the mixture. These dopants can be chiral components which are designed to induce ferroelectric polarization and produce fast switching or other desirable properties (e.g., tilt angle adjustments) in the FLC film. The dopants can also be achiral components that adjust other desirable FLC properties. The components of FLC mixtures can also be adjusted to vary phase transition temperatures or to introduce desired LC phases.

For modulation of intense light sources, the material must possess low absorption at the wavelengths of interest and high stability to the light transmitted. SLMs designed to modulate TV light, for example, must use materials stable and transparent to UV light.

In addition to the above-described characteristics, the composition of ferroelectric liquid crystal materials can be adjusted to vary the tilt angle, pitch, stability and mixing properties of the FLC materials. Addition of molecules which optimally impart a 22.5° tilt angle to an FLC material used in a shutter or light switch, results in maximum throughout in the "ON" state of the device. A 22.5° tilt angle is particularly desirable for FLC materials used in direct drive, flat panel display applications. A longer helix pitch in the smectic C* phase, particularly a pitch longer than about 3.0 $\mu$m, is also a desirable characteristic of FLC materials for certain applications, since such a longer helix pitch improves the alignment of the FLC compounds in electro-optical devices, decreases surface interactions and as a consequence improves the usefulness of these compounds in SSFLC (Surface Stabilized Ferroelectric Liquid Crystal) devices. In an SSFLC cell, the orientation of the molecules in the FLC phase is strongly coupled to externally applied fields, due to the presence of a ferroelectric polarization P, and a fast light valve with high contrast, bistability, a sharp threshold, low power requirements and high spatial resolution are achieved. FLC components can also be added which increase the stability of the smectic phases of the FLC material, for example, by suppressing crystallization of FLC materials, and/or improving the miscibility and/or viscosity of the liquid crystal composition. Fabrication of large-area multiplexed matrix addressed arrays of pixels is quite feasible using the properties of the SSFLC geometry.

Thermotropic liquid crystal molecules typically possess structures which combine a rigid core coupled with two relatively "floppy" tails (see Demus et al. (1974) Flussige Kristalle In Tabellen, VEB Deutscher Verlag fur Grundstoffmdustrie, Lebzig for a compilation of the molecular structures of LC molecules). FLC materials have been prepared by the introduction of a stereocenter into one of the tails, thus introducing chirality. The first FLC compound to be characterized was DOBAMBC (Meyer et al., supra) which contains an (S)-2-methylbutyloxy chiral tail. Pure DOBAMBC exhibits a smectic C* phase with a ferroelectric polarization of $-3$ nC/cm$^2$.

There are a number of reports of compounds containing two or more aromatic rings such as those having phenylbenzoate, biphenyl, phenylpyrimidine, phenylpyridine and related cores coupled to chiral tails which possess smectic C* phases displaying fast switching speeds at room temperature, or which can be employed as FLC dopants to induce high polarization and fast switching speeds when combined in mixtures with FLC host materials. There are also several reports of FLC compounds having cores which contain cyclohexane and cyclohexene rings.

The following are exemplary reports of FLC compounds containing cyclohexane or cyclohexane rings.

Li et al. (1991) Mol. Cryst. Liq. Cryst. 199:379–386 disclose cyclohexenyl liquid crystal compounds, having a chiral center in the mesogenic core, derived from the Diels-Alder reaction between myrcene and methyl acrylate, followed by hydrolysis and esterification with 4-hydroxy-4'-n-alkoxybiphenyl. The liquid crystal materials reported have the following structure:

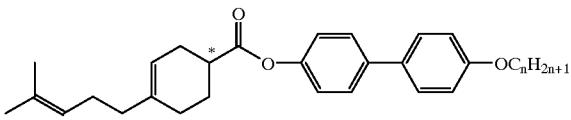

The lower member cyclohexenecarboxylates (n=1 and 2) have a large nematic range, and the higher members (n=3–10) have multiple smectic phases in addition to the nematic phase. The presence of the cyclohexene ring is suggested to lead to multiple smectic phases. Nonracemic 4'-n-octyloxybiphenyl 4-(4-methyl-3-pentenyl)-3-cyclohexenecarboxylate is reported to have a smectic C phase and a normal tilt angle, however, its polarization density is extremely small (extrapolated polarization density, $P_{ext}$, less than 1 nC/cm$^2$). It is suggested that the small polarization density is due to the small dipole associated with the chiral carbon in the tilt plane, which does not contribute to P. Further, the carbonyl adjacent to the chiral produces nearly equivalent, but opposite, dipole moments in the two potential configurations, which occur with nearly equal probability.

Fung et al. (1989) Mol. Cryst. Liq. Cryst. Let. 6(6):191–196 report liquid crystal compounds containing a cyclohexene ring, derived from the Diels-Alder reaction between myrcene and methyl acrylate, followed by hydrolysis and esterification of the resulting acid with 4-hydroxy-4'-methoxybiphenyl or 4-hydroxy-4'-cyanobiphenyl. The liquid crystal materials reported have the following structure:

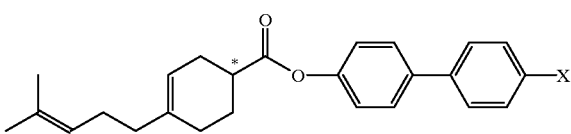

where X is a methoxy or cyano group. The two compounds exhibit broad nematic ranges (79–153° C. and 93–152° C., respectively).

Bezborodov et al. (1989) Liq. Cryst. 4(2):209–215 disclose the mesomorphic (nematic) properties of cyclohexenyl liquid crystal compounds derived from 4-substituted phenols and 4-n-alkylcyclohexene-1-carbonyl chlorides where the double bond is in the 1, 2 or 3 position in the cyclohexene ring. The reference indicates that compounds containing the double bond in the 2 position of the cyclohexene (numbering from the carboxy group as is conventional) are the most promising for use as liquid crystal components, since the appearance of the double bond in the first or 3 positions of the ring causes a large distortion in the shape of the molecule. This distortion reportedly affects both the mesophase (nematic) range and the melting point.

German patent document, Reiffenrath et al., DE 3906040, published Sep. 21, 1989 and WPI Abstract 89-279241/39, refers to cyclohexene derivatives having the general formula:

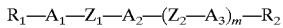

where $R_1$ and $R_2$ are 1–15 carbon alkyl or 3–15 carbon alkenyl groups, optionally with one CN or at least one fluorine or chlorine substituent, in which a $CH_2$ group can be replaced with —O—, —OCO—, —COO— or —OCOO—, and one of $R_1$ and $R_2$ can be CN; where $A_1$, $A_2$ and $A_3$ can be 1,4-cyclohexenylene or trans-1,4-cyclo-hexylene in which one or two non-adjacent $CH_2$ groups can be replaced by —O—, or 1,4-phenylene, optionally with one or two fluorine substituents, in which one or two $CH_2$ groups can be replaced by nitrogen, at least one of $A_{1-3}$ being 2,3-difluoro-1,4-phenylene, and at least one of $A_{1-3}$ being 1,4-cyclohexenylene; and where $Z_1$ and $Z_2$ can be —COO—, —OCO—, —CH$_2$O—, —OCH$_2$—, —CH$_2$CH$_2$— or a single bond. The reference refers to 1,4-cyclohexenylenes having the double bond in the 1, 2 or 3 position.

Tanaka et al. (1989) European Patent Application, Pub. No. 331091 refers to tetracyclic cyclohexylcyclohexene derivatives having the formula:

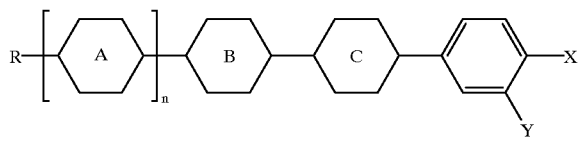

where R is a straight-chained alkyl group having 1–9 carbon atoms; A is a cyclohexyl, cyclohexenyl, or phenyl ring; B and C are cyclohexyl or clyclohexenyl rings; n is 0 or 1; when n is 0, X is a cyano group and Y is a hydrogen or fluorine atom; when n is 1, X is a fluorine atom, a straight-chained alkyl group having 1–9 carbon atoms, and Y is a hydrogen or fluorine atom. The disclosed liquid crystal compounds exhibit high N—I and low C—N or S—N points.

Eidenschink et al, WO 87/05015, discloses cyclohexane containing liquid crystal and ferroelectric liquid crystal compositions having the general formulas:

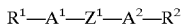

where $A_1$ and $A_2$ can be a phenyl, cyclohexyl, phenylpyrimidine, or substituted cyclohexene ring. Eidenschink et al. does not specifically disclose a cyclohexene ring, but generically discusses reduced groups at page 14, fourth paragraph, and suggests that the claimed compounds can include reduced groups.

U.S. Pat. No. 5,271,864 (Wand et al.) describes ferroelectric liquid crystal compounds and compositions containing cyclohexyl derivatives of the formula:

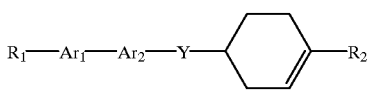

$R_1$ and $R_2$ can be an alkyl, cycloalkyl, alkenyl, alkoxy, thioalkyl, or alkylsilyl group having from one to about 20 carbons. Y is an ester or ether group. $Ar_1$ and $Ar_2$, independent of each other, can be phenyl rings, halogenated phenyl rings, and nitrogen-containing aromatic rings. $Ar_1$ and $Ar_2$ are not separated by a linker.

While a number of useful liquid crystal and smectic liquid crystal materials (both pure compounds and mixtures) have been reported, there is a growing need for LC and FLC materials with varying properties of pitch and tilt angle for use in varied applications. In order to obtain faster switching speeds, FLC materials with low orientational viscosity are desirable. Further, there is a need for LC host materials and FLC dopants with varying mixing properties (which are dependent, at least in part, on chemical composition) for use in the preparation of FLC mixtures having desired chiral smectic phases at useful device operating temperatures (e.g. about 0°–100° C., preferably around room temperature about 10°–35° C.). LC and FLC materials which result in mixtures that are stable to crystallization over useful device operating temperatures are desirable. LC host materials and FLC dopants which are readily synthesized and which possess low birefringence, impart longer chiral smectic phase pitch, tilt angle of about 22.5°, lower orientational viscosity, broader LC and FLC phases, and suppress crystallization in such mixtures are of particular interest.

BRIEF SUMMARY OF THE INVENTION

The present invention provides new LC compounds that have low birefringence (i.e., birefringence of 0.17 or less, preferably 0.15 or less) and liquid crystal mixtures containing such compounds. The compounds have core groups containing cyclohexyl and/or cyclohexenyl rings. Compounds of this invention have improved solubility in mixtures containing them. Mixtures containing these compounds have improved properties, including broader temperature range for the C* phase (lower low end temperature and/or higher high end temperature), improved (lower) viscosity, and in some cases higher tilt angle. Some of the compounds of the present invention have a C* phase and some have a B* but no C* phase. Some of the compounds of the present invention contain a stereocenter and are chiral, others do not contain a stereocenter and are not chiral. Mixtures which do not contain a chiral or nonracemic component are not ferroelectric. Those compounds which are not chiral are preferably doped with a chiral material to yield a ferroelectric mixture.

The present invention includes compounds of the formula:

$$R_1—Ar—R_2$$

wherein $R_1$ and $R_2$, independently of one another, are selected from the group consisting of alkyl, cycloalkyl, alkenyl, cycloalkenyl, alkynyl, alkoxy, thioalkyl, thioether and ether groups having from 1 to about 20 carbon atoms, wherein one or more —$CH_2$— groups in $R_1$ and $R_2$ may be independently replaced with a member of the group consisting of O, S, —$CH_2O$—, —$OCH_2$—, —COO—, —OOC—, —$CH_2S$—, —$SCH_2$—, —COS—, —SCO—, a double bond, a triple bond, and an alkyl silyl group, $Si(R_e)(R_f)$, in which $R_e$ and $R_f$, independently of one another, are small alkyl or alkenyl groups having from about 1 to about 8 carbon atoms, said $R_1$ or $R_2$, independently of one another, can be partially or fully halogenated, and said $R_1$ or $R_2$, independently of one another, can be internally or terminally branched;

Ar is a ring core moiety of the general formula:

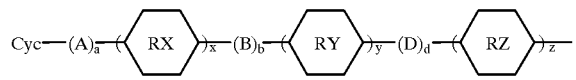

wherein Cyc is a cyclohexyl ring or a cyclohexenyl ring, which may be optionally substituted with members selected from the group consisting of halogen atoms, methyl groups, trifluoromethyl groups, cyano groups, methoxy groups, and trifluoromethoxy groups; RX, RY and RZ, independently of one another, are aromatic or non-aromatic rings which are selected from the group consisting of 1,4-phenyl, 2,5-pyridinyl, 2,5-pyrimidinyl, 2,5-pyrazinyl, 3,6-pyridazinyl, 2,5-dithiazolyl, 1,4-cyclohexyl, 1-4-cyclohex-2-enyl, and 1,4-cyclohexenyl rings, wherein any hydrogen in RX, RY and RZ may optionally be substituted with a halogen atom; wherein x, y, z are, independently of one another, 0, 1, or 2 such that x+y+z=1, 2, or 3; wherein A, B and D, independently of one another, are linkers selected from the group —$(CH_2)_w$—, wherein w is 0 to about 8, and wherein one or more —$CH_2$— groups in A, B or D may be independently replaced with a member selected from the group consisting of O, S, —$CH_2O$—, —$OCH_2$—, —COO—, —OOC—, —$CH_2$—, —$SCH_2$—, —COS—, —SCO —, a double bond, a triple bond, and an alkyl silyl group, $Si(R_e)(R_f)$, in which $R_e$ and $R_f$, independently of one another, are small alkyl or alkenyl groups having from about 1 to about 8 carbon atoms; wherein a, b, d, independently of one another, are 0 or 1, such that a+b+d=1, 2, or 3.

In general, suitable liquid crystal cores (Ar) are rigid, linear moieties. Preferred cores are those that are chemically stable and which do not impart high orientational viscosity in the liquid crystal phase. Cores of the present invention contain either a cyclohexyl or cyclohexenyl ring which is also bonded, preferably at the para position from its bond to other core moieties, to a branched or unbranched $R_1$.

Exemplary RX, RY and/or RZ rings of the Ar core include, but are not limited to, the following:

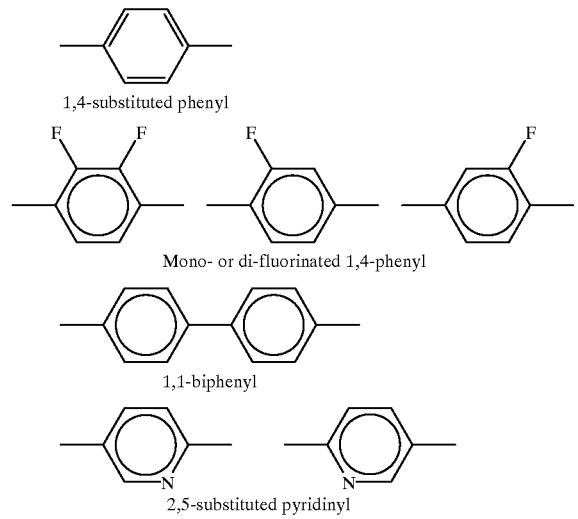

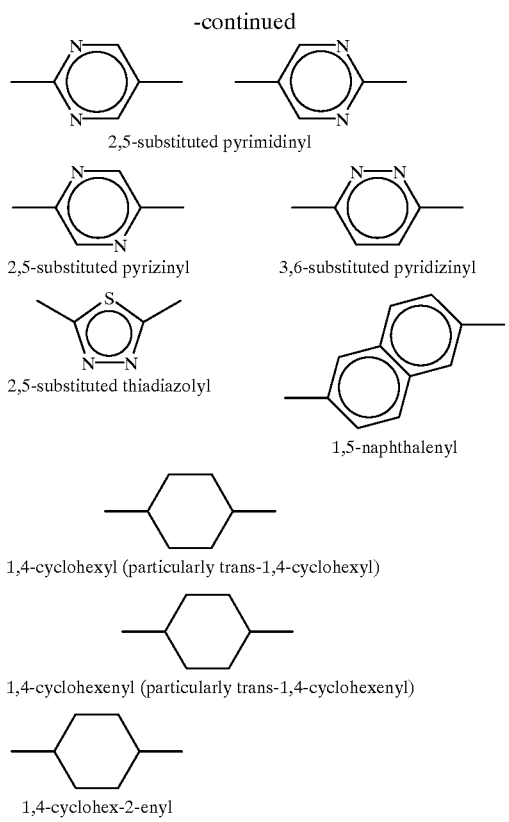

2,5-substituted pyrimidinyl 2,5-substituted pyrizinyl 3,6-substituted pyridizinyl 2,5-substituted thiadiazolyl 1,5-naphthalenyl 1,4-cyclohexyl (particularly trans-1,4-cyclohexyl)

1,4-cyclohexenyl (particularly trans-1,4-cyclohexenyl)

1,4-cyclohex-2-enyl

Any of RX, RY and/or RZ rings of the Ar core may optionally be partially or fully halogenated. If halogenated, preferably fluorine is the halogen. Preferred halogenated RX, RY and RZ rings are fluorinated 1,4-phenyl rings with 2-fluoro, 3-fluor or 2,3-difluoro substituted 1,4-phenyl rings and 2-fluoro, 3,6-substituted pyridine rings being more preferred.

Preferred Ar core moieties of this invention include 1,4-substituted phenyl rings, halogenated 1,4-substituted phenyl rings, phenylpyridinyl rings, pyridinylphenyl rings, phenylpyrimidinyl rings, and pyrimidinylphenyl rings.

Tails $R_1$ and $R_2$ are preferably linked on opposite ends of the core in a para arrangement. The rings of the core other than the Cyc ring can be arranged within the core in either orientation with respect to the Cyc ring and the $R_1$ tail.

The compounds of the present invention have $R_2$ which may or may not be chiral. $R_2$ tails of the present invention include alkyl, cycloalkyl, alkenyl, cycloalkenyl, alkynyl, cycloalkynyl, alkoxy, ether, thioalkyl, thioether, or alkylsilyl groups having one to twenty carbon atoms. The $R_2$ tails can be straight-chain or branched. Alkenyl $R_2$ tails preferably have one double bond. $R_2$ tails include alkoxy tails, e.g., $R_2=C_nH_{2n+1}$—O— (where n is preferably 20 or less) and ether tails, e.g., $C_nH_{2n+1}$—O—$C_mH_{2m+1}$— (where n and m are preferably 19 or less) and preferably contain one oxygen atom. $R_2$ tails include thioalkyl tails, e.g., $R_2=C_nH_{2n+1}$—S— (where n and m are preferably 20 or less), and thioether tails, e.g., $R_2=C_nH_{2n+1}$—S—$C_mH_{2m+1}$— (where n and m are preferably less than 19), and preferably contain one sulfur atom. $R_2$ tails also include allylsilyl tails, e.g., $C_nH_{2n+1}$—Si(CH$_3$)$_2$—$C_mH_{2m+1}$— (where n and m are preferably 18 or less) or (CH$_3$)$_3$Si—$C_nH_{2n+1}$— (where n is preferably 17 or less), where a dialkylsilyl group such as (CH$_3$)$_2$Si is inserted within an alkyl chain. $R_2$ cycloalkyl tails include cyclopropyl tails, particularly wherein a cyclopropyl group is at the end of the tail (ω-position), e.g., c-propyl-$C_nH_{2n+1}$— (where n is preferably 17 or less). Preferred $R_2$ tails have one to twenty carbon atoms, i.e., n≦20 in the above exemplified formulas. $R_2$ tails of the present invention are most preferably alkyl, alkoxy and ω-alkenyl tails containing one to twenty carbon atoms. Non-adjacent carbon atoms in $R_2$ alkyl, alkoxy or alkenyl tails can be replaced with a double bond, oxygen atom, sulfur atom, cyclopropyl group or silylalkyl group such as Si(CH$_3$)$_2$. Preferred tails contain only one such substitution. $R_2$ tails more preferably contain three to twelve carbon atoms and most preferably five to twelve carbon atoms. Preferred tails contain trans alkenyl groups.

In general, $R_1$ can be any alkyl, cycloalkyl, alkenyl, cycloalkenyl, alkynyl, cycloalkynyl, alkoxy, ether, thioalkyl, thioether, or alkylsilyl groups as they are defined above for $R_2$. $R_1$ and $R_2$ can be the same or different tail groups. As with $R_2$, $R_1$ tails can be straight-chain or branched, chiral nonracemic or achiral groups. Preferred $R_1$ tails contain 1 to 20 carbon atoms. Tails having three to twelve carbons are more preferred and tails having five to twelve carbons are most preferred. In any compounds of this invention wherein Cyc is 1,4-cyclohexenyl, the double bond of the cyclohexenyl ring can be at any position in the ring: 1, 2, 3, 4, 5, or 6. These various configurations are shown below. In the diagrams below, —Y—) indicates the remainder of the molecule.

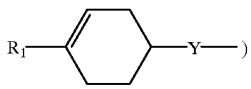

position 1

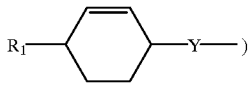

position 2

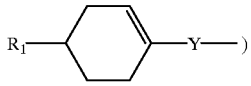

position 3

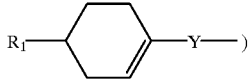

position 4

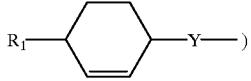

position 5

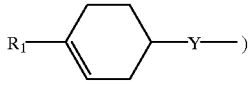

position 6

Of the compounds of this invention which contain a cyclohexenyl ring, preferred compounds are those with the double bond in the cyclohexenyl ring at the position attached to the tail at position 4. In compounds wherein $R_1$ is attached to the cyclohexenyl ring at the double bond, preferred $R_1$ tails have a CH$_2$ group at the first position in the tail.

$R_1$ that are alkyl and alkenyl groups are more preferred. For $R_1$ that is a thioether or ether, tails containing a single S or O are preferred, such as $C_nH_{2n+1}$—S—$C_mH_{2m+1}$ and $C_nH_{2n+1}$—O—$C_mH_{2m+1}$ (where n and m are preferably 19 or less). In alkyl, alkenyl, thioether and ether $R_1$ tails, one or more of the non-neighboring carbon atoms can be replaced with a cyclopropyl group, alkylsilyl group, S atom or O atom. Preferably, $R_1$ groups contain only one such substitution and such substitution is preferably not at the 1-position in the tail.

If $R_2$ or $R_1$ is an alkenyl group, the double bonds can be located at any position in the group and can be cis or trans substituted double bonds. However, trans double bonds are preferred over cis double bonds which are likely to result in reduced solubility of the compound in host materials. Additionally, cis double bonds in $R_1$ and $R_2$ tails will likely narrow the smectic C* range.

$R_1$ and $R_2$ can be straight chain or branched. Branching of $R_1$ and/or $R_2$ can broaden the smectic C* phase of the compound itself or of an FLC mixture containing the compound. The branching effect is enhanced when branching is more distant from the core. It has also been observed that if branching occurs at carbons 2–8 (relative to the core), the polarization density of the FLC molecule is generally not significantly affected.

Specific $R_1$ and/or $R_2$ groups include, but are not limited to: methyl, ethyl, n-propyl, iso-propyl, n-butyl, s-butyl, iso-butyl, t-butyl, n-pentyl, 1-methylbutyl, 2-methylbutyl, 3-methylbutyl, 2,2-dimethylpropyl, 1,1-dimethylpropyl, n-hexyl, 1-methylpentyl, 2-methylpentyl, 3-methylpentyl, 4-methylpentyl, n-heptyl, 1-methyhexyl, 2-methylhexyl, 3-methylhexyl, 4-methylhexyl, 5-methylhexyl, n-octyl, 1-methylheptyl, 2-methylheptyl, 3-methylheptyl, 4-methylheptyl, 5-methylheptyl, 6-methylheptyl, n-nonyl, 1-methyloctyl, 2-methyloctyl, 3-methyloctyl, 4-methyloctyl, 5-methyloctyl, 6-methyloctyl, 7-methyloctyl, n-decyl, 1-methylnonyl, 2-methylnonyl, 3-methylnonyl, 4-methylnonyl, 5-methylnonyl, 6-methylnonyl, 7-methylnonyl, 8-methylnonyl, dimethylpentyl, dimethylhexyl, dimethylheptyl, dimethyloctyl, dimethylnonyl, n-undecyl, n-dodecyl, dimethyldecyl, n-propadecyl, n-butadecyl, n-pentadecyl, n-hexadecyl, n-heptadecyl, n-octadecyl, 3-butenyl, 4-pentenyl, 5-hexenyl, 6-heptenyl, n-propoxy, n-ethoxy, n-butoxy, n-undecoxy, n-dodecoxy, 2-methoxymethyl, 2-methoxypentyl, 2-oxypentyl, 3-oxypentyl, 4-oxypentyl, 2-oxyhexyl, 3-oxyhexyl, 4-oxyhexyl, 5-oxyhexyl, 2-oxyheptyl, 3-oxyheptyl, 4-oxyheptyl, 5-oxyheptyl and 6-oxyheptyl, n-5-hexenyl, n-6-heptenyl, n-7-octenyl, n-8-nonenyl, n-9-decenyl, 4-methyl-3-pentenyl, 5-methyl-4-hexenyl, n-8-cyclopropyloctyl, n-7-cyclopropylheptyl, 6-trimethylsilylhexyl, 7-trimethylsilylheptyl, 8-trimethylsilyloctyl, n-butyldimethylsilylbutyl.

Formulas for $R_1$ and/or $R_2$ groups include, but are not limited to the following (where $n \leq 20$):

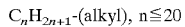
$C_nH_{2n+1}$-(alkyl), $n \leq 20$

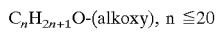
$C_nH_{2n+1}$O-(alkoxy), $n \leq 20$

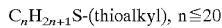
$C_nH_{2n+1}$S-(thioalkyl), $n \leq 20$

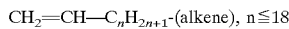
$CH_2=CH-C_nH_{2n+1}$-(alkene), $n \leq 18$

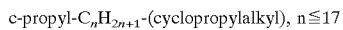
c-propyl-$C_nH_{2n+1}$-(cyclopropylalkyl), $n \leq 17$

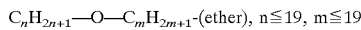
$C_nH_{2n+1}-O-C_mH_{2m+1}$-(ether), $n \leq 19$, $m \leq 19$

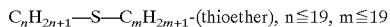
$C_nH_{2n+1}-S-C_mH_{2m+1}$-(thioether), $n \leq 19$, $m \leq 19$

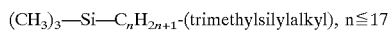
$(CH_3)_3-Si-C_nH_{2n+1}$-(trimethylsilylalkyl), $n \leq 17$

The invention provides compounds of Formula IIIA:

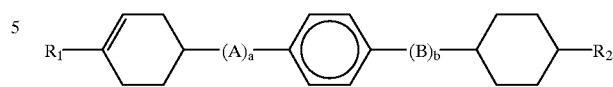

IIIA

In Formula IIIA, A is as defined above and is preferably an ester, e.g. —COO—. In Formula IIIA, the phenyl ring can be halogenated, preferably with fluorine, and, if halogenated, is preferably mono- or di-halogenated. In Formula IIIA, b is as defined above and is preferably an even integer and more preferably 2 or 4, and such that the linker between the phenyl and the cyclohexyl rings is, for example, preferably $(CH_2)_2$—, $—(CH_2)_4—$, or $—(CH_2)_2—CH=CH—$. $R_1$ and $R_2$ are tails as defined above and are preferably alkyl or alkenyl having from 1 to about 20 carbons atoms, and more preferably are small alkyl or small alkenyl having from 1 to about 8 carbon atoms. $R_1$ and $R_2$ tails can be branched or unbranched. For example, $R_1$ can be 4-methyl-3-pentenyl, and $R_2$ can be $—(CH_2)_4CH_3$ or $—O—(CH_2)_4CH_3$.

The cyclohexyl ring of Formula IIIA can be replaced with a cyclohexenyl ring, to yield compounds of Formula IIIB:

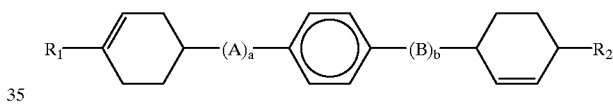

IIIB

The double bond of either cyclohexenyl ring can be in any of the 6 possible positions. For example following structures show the double bond of the cyclohexenyl ring attached to $R_2$ in various positions:

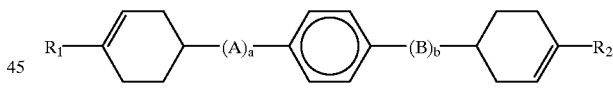

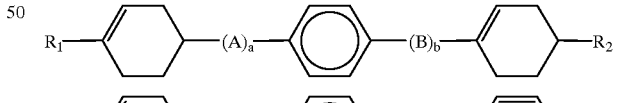

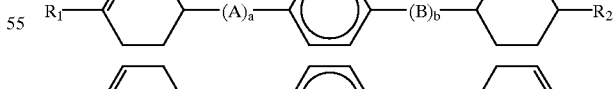

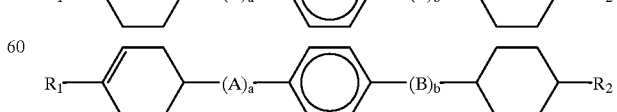

The invention further provides compounds of Formula IVA:

IVA

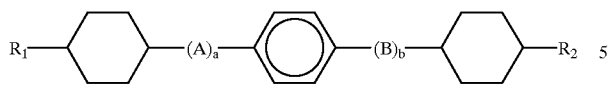

In Formula IVA, A is as defined above and is preferably an ester, e.g. —COO—. The phenyl ring can be halogenated, preferably with fluorine, and, if halogenated, is/are preferably mono- or di-halogenated. In Formula IVA, b is as defined above and is preferably an even integer and more preferably 2 or 4, and such that the linker between the phenyl and the cyclohexyl rings is, for example, preferably —$(CH_2)_2$—, —$(CH_2)_4$—, or —$(CH_2)_2$—CH=CH—. $R_1$ and $R_2$ are tails as defined above and are preferably alkyl or alkenyl having from 1 to about 20 carbons atoms, and more preferably are small alkyl or small alkenyl having from 1 to about 8 carbon atoms. $R_1$ is branched, preferably terminally branched, e.g. at the carbon farthest from the core. $R_2$ can be branched or unbranched. For example, $R_1$ can be 4-methylpentyl, and $R_2$ can be —$(CH_2)_4CH_3$ or —O—$(CH_2)_7CH_3$.

The cyclohexyl ring attached to $R_2$ can be replaced with a cyclohexenyl ring to yield compounds of Formula IVB:

IVB

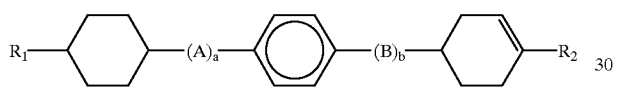

The invention further provides compounds of Formula VA:

VA

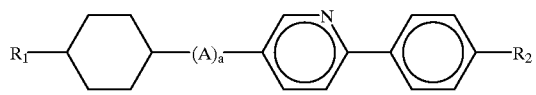

In Formula VA, A is as defined above and is preferably an ester, e.g. —COO—. The phenyl and/or pyrindinyl rings can be halogenated, preferably with fluorine, and, if halogenated, is/are preferably mono- or di-halogenated. The order of the phenyl and pyridinyl rings can be reversed. $R_1$ and $R_2$ are tails as defined above and are preferably alkyl, alkenyl or alkoxy having from 1 to about 20 carbons atoms, and more preferably are small alkyl, small alkenyl or small alkoxyl having from 1 to about 8 carbon atoms. $R_1$ is branched, preferably terminally branched, e.g. at the carbon farthest from the core. $R_2$ can be branched or unbranched. For example, $R_1$ can be 4-methylpentyl, and $R_2$ can be —$(CH_2)_7CH_3$ or —O—$(CH_2)_7CH_3$.

The pyridinyl ring of Formula VA can be replaced by a phenyl ring, so that the core contains a biphenyl system, yielding compounds of Formula VB:

VB

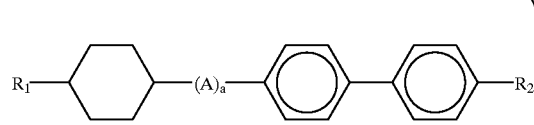

The invention further provides compounds of Formula VIA:

VIA

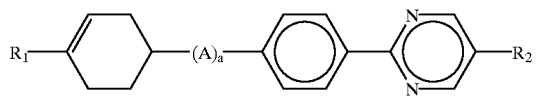

In Formula VIA, A is as defined above and is preferably an ester, e.g. —COO—. The phenyl and/or pyrimidinyl rings can be halogenated, preferably with fluorine, and, if halogenated, is/are preferably mono- or di-halogenated. The order of the phenyl and pyrimidinyl rings can be reversed, i.e., the phenylpyrimidinyl group can be replaced by a pyrimidinylphenyl group. $R_1$ and $R_2$ are tails as defined above and are preferably alkyl, alkenyl, alkoxyl or ether groups having from 1 to about 20 carbons atoms, and more preferably are small alkyl, small alkenyl, small alkoxyl or small ether groups having from 1 to about 8 carbon atoms or medium alkyl, medium alkenyl, medium alkoxyl or medium ether groups having from about 9 to about 15 carbon atoms. $R_1$ and $R_2$ can be branched or unbranched. For example, $R_1$ can be —$C_5H_{11}$—, $CH_3$—$CH_2$—O—$(CH_2)_4$— or $C_4F_9$—$(CH_2)_4$—, and $R_2$ can be $C_{10}H_{21}$ or —O—$C_{10}H_{21}$. As explained above, the double bond of the cyclohexenyl ring can be at any position in the ring.

The pyrimidinyl ring of Formula VIA can be replaced with a phenyl ring such that the core contains a biphenyl system, yielding compounds of Formula VIB:

VIB

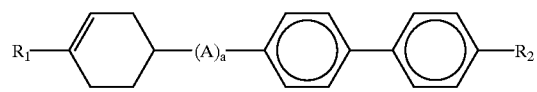

The invention also provides compounds of Formula XC:

XC

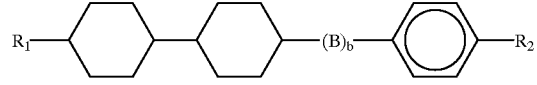

In Formula XC, B is as defined above and is preferably an ester, e.g. —COO—. In Formula XC, the phenyl ring can be halogenated, preferably with fluorine, and if halogenated, is preferably mono- or di-halogenated. In Formula XC, b is greater than 0, preferably 1. $R_1$ and $R_2$ are tails as defined above and are preferably alkyl or alkenyl having from 1 to about 20 carbon atoms. $R_1$ and $R_2$ tails can be branched or unbranched.

The linker B of Formula XC can be absent, and the second cyclohexyl ring after $R_1$ of Formula XC can be replaced with an aromatic ring, to yield compounds of Formula XA:

XA

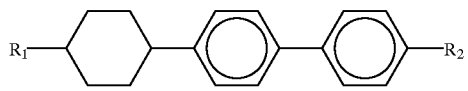

In Formula XA, the phenyl rings can be halogenated, preferably with fluorine, and if halogenated, is preferably mono- or di-halogenated. In Formula XE, $R_1$ and $R_2$ are tails as defined above and are preferably alkyl or alkenyl having from 1 to about 20 carbon atoms. $R_1$ and $R_2$ tails can be branched or unbranched and can contain oxygen. $R_1$ and $R_2$ can also be halogenated, preferably with fluorine.

The second cyclohexyl ring after $R_1$ of Formula XC can be replaced with an aromatic ring, and a linker added between said aromatic ring and the first cyclohexyl ring after $R_1$ of Formula XC, to yield compounds of Formula XE:

XE

In Formula XE, A is as defined above and is preferably —(CH$_2$)—. In Formula XE, a is as defined above and is preferably an even integer and more preferably 2 or 4, such that the linker between the cyclohexyl ring and the first aromatic ring after $R_1$ is, for example, preferably —(CH$_2$)$_2$—, or —(CH$_2$)$_4$—. In Formula XE, B is as defined above and preferably contains oxygen, for example, —COO— or —O(CH$_2$)—. In Formula XE, b is defined above and is greater than 0, preferably an even integer and more preferably 2 or 4. In Formula XE, the phenyl rings can be halogenated, preferably with fluorine, and if halogenated, is preferably mono- or di-halogenated. In Formula XE, $R_1$ and $R_2$ are tails as defined above and are preferably alkyl or alkenyl having from 1 to about 20 carbon atoms. $R_1$ and $R_2$ tails can be branched or unbranched and can contain oxygen.

In Formula XE, only one linker and only one aromatic ring can be present, to yield compounds of Formula XB.

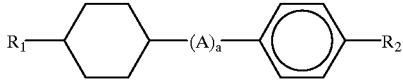

XB

In Formula XB, A is as defined above and is preferably —(CH$_2$)—. In Formula XE, a is as defined above and is preferably an even integer and more preferably 2 or 4, such that the linker between the cyclohexyl ring and the first aromatic ring after $R_1$ is, for example, preferably —(CH$_2$)$_2$—, or —(CH$_2$)$_4$—. In Formula XE, the phenyl ring can be halogenated, preferably with fluorine, and if halogenated, is preferably mono- or di-halogenated. In Formula XE, $R_1$ and $R_2$ are tails as defined above and are preferably alkyl or alkenyl having from 1 to about 20 carbon atoms. $R_1$ and $R_2$ tails can be branched or unbranched and can contain oxygen or halogen atoms.

In the compounds of the invention, the linker between the cyclohexenyl ring and the aromatic ring is preferably described as:

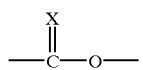

where X can be H$_2$ or O.

Preferred compounds of the invention include compounds of the formula $R_1$—Ar—$R_2$, wherein Ar is a ring core moiety of the general formula:

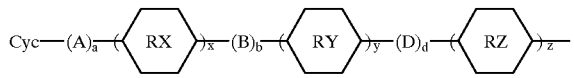

wherein at least one of $R_1$ and $R_2$ is terminally or internally branched or contains at least one atom other than carbon or hydrogen, and at least one of A, B and D contains at least one oxygen atoms, and one or more of RX, RY and RZ is aromatic.

Also preferred are compounds of the formula $R_1$—Ar—$R_2$, wherein Ar is a ring core moiety of the general formula:

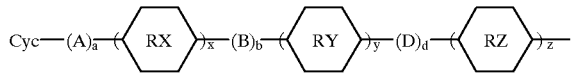

wherein Cyc is a cyclohexyl ring, RX is an aromatic ring, RY is a cyclohexyl ring, A is —COO—, a, b, x, and y are 1, d and z are 0, $R_1$ is a terminally branched alkyl group, having from about 1 to about 10 carbon atoms optionally partially or fully halogenated (e.g., fluorinated) and optionally containing oxygen, $R_2$ is a straight chain alkyl group, having from 1 to about 12 carbon atoms, B is —(CH$_2$)$_w$—, wherein w is 1 to about 6.

Also preferred are compounds of the formula $R_1$—Ar—$R_2$, wherein Ar is a ring core moiety of the general formula:

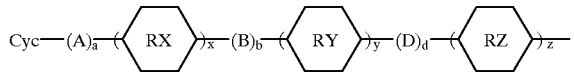

wherein Cyc is a 1,4-cyclohexenyl ring, RX is an aromatic ring, RY is a 1,4-cyclohexyl ring, A is —COO—, a, b, x and y are 1, d and z are 0, $R_1$ is a terminally branched alkyl group optionally, partially or fully halogenated (fluorinated), and optionally containing oxygen, having from about 1 to about 10 carbon atoms, $R_2$ is a straight chain alkyl group, having from 1 to about 12 carbon atoms, B is —(CH$_2$)$_w$—, wherein w is 1 to about 6.

Also preferred are compounds of the formula $R_1$—Ar—$R_2$, wherein Ar is a ring core moiety of the general formula:

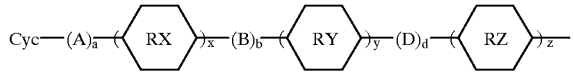

wherein Cyc is a 1,4-cyclohexenyl ring, RX is a 2,5-pyrimidinyl ring, RY is an aromatic ring, A is —COO—, a, x and y are 1, $R_1$ is a straight chain alkyl group, having from about 1 to about 10 carbon atoms, optionally partially or fully halogenated with fluorine and optionally containing oxygen, $R_2$ is a straight chain alkyl group, having from 1 to about 12 carbon atoms, b, d and z are 0, and wherein the —CH$_2$— group of the $R_2$ alkyl chain bonded to RY is replaced with —O—.

Also preferred are compounds of the formula $R_1$—Ar—$R_2$, wherein Ar is a ring core moiety of the general formula:

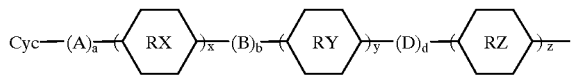

wherein Cyc is a 1,4-cyclohexenyl ring, RX is an aromatic ring, RY is a 2,5-pyrimidinyl ring, A is —CH$_2$O—, a, x and y are 1, $R_1$ is a terminally branched alkenyl group, having from about 1 to about 10 carbon atoms, $R_2$ is a straight chain alkyl group, having from 1 to about 12 carbon atoms partially halogenated with fluorine, b, d and z are 0, and wherein the —$CH_2$— group of the $R_2$ alkyl chain bonded to RY is replaced with —O—.

Also preferred are compounds of the formula $R_1$—Ar—$R_2$, wherein Ar is a ring core moiety of the general formula:

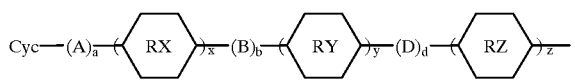

wherein Cyc is a 1,4-cyclohexyl ring, RX is an aromatic ring, RY is a 2,5-pyrimidinyl ring, A is —COO—, a, x and y are 1, b, d and z are 0, $R_1$ is a terminally branched alkyl group, having from about 1 to about 10 carbon atoms, $R_2$ is a straight chain alkyl group, having from 1 to about 15 carbon atoms.

This invention includes LC and FLC compositions and FLC host compositions having a low birefringence (i.e., 0.17 or less, preferably 0.15 or less) containing one or more of the compounds of Formulas IIIA, IIIB, IVA, IVB, VA, VB, VIA, VIB, XA, XB, XC and XE.

DETAILED DESCRPTION OF THE INVENTION

The compounds of the present invention contain at least one cyclohexyl or cyclohexenyl ring and exhibit low birefringence (0.17 or less, preferably 0.15 or less measured using an Abbe refractometer). Birefringence is given by the following equation:

$$\Delta n = n_e - n_o$$

where ne is the index of refraction along the extraordinary axis of a birefringent material (parallel to the optical axis) and $n_0$ is the index of refraction along the ordinary axis (perpendicular to the optical axis). Many compounds of the present invention have improved solubility in FLC mixtures containing such compounds, and improved melting temperatures of FLC mixtures containing such compounds. Many compounds of the present invention confer to FLC mixtures containing them decreased viscosity and improved tilt angle. Tilt angle is measured using optical microscopy. Rise time is used to determine viscosity.

Preferred examples of the compounds and liquid crystal mixtures of this invention include but are not limited to the illustrated examples shown.

Formula IIIA encompasses the following non-limiting examples.

MDW 942

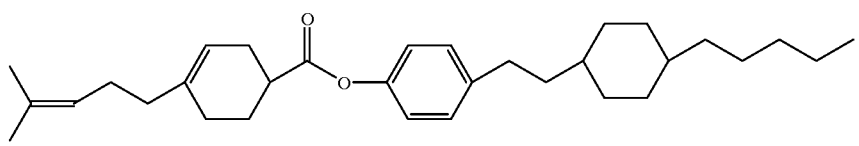

MDW 1122

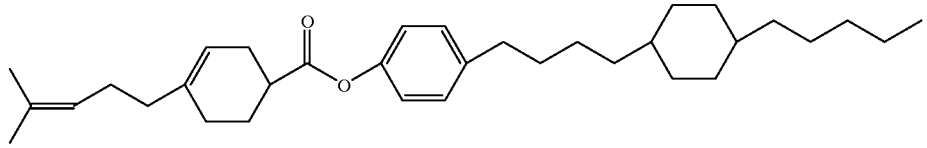

MDW 1125

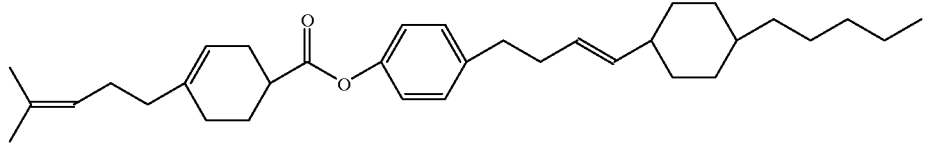

MDW 1124

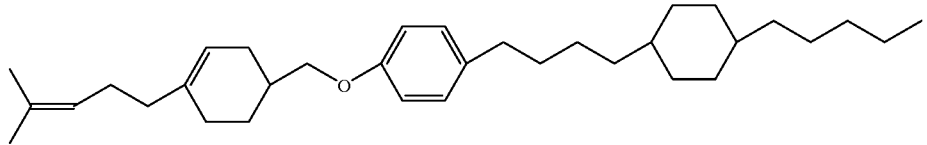

MDW 1126

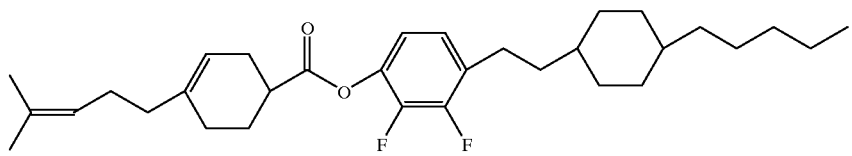

MDW 1273

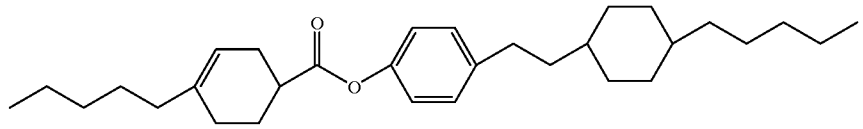

-continued
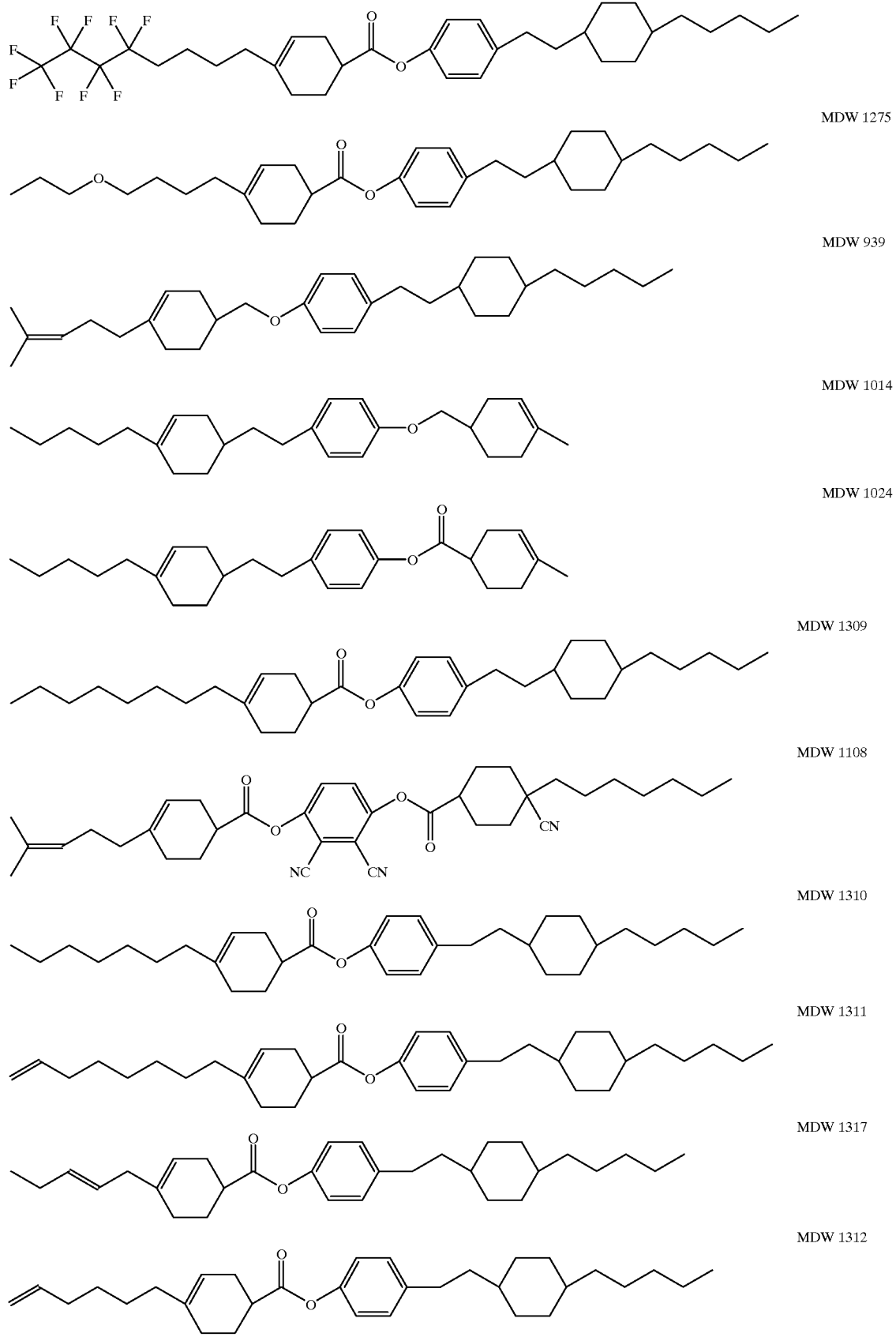
MDW 1274
MDW 1275
MDW 939
MDW 1014
MDW 1024
MDW 1309
MDW 1108
MDW 1310
MDW 1311
MDW 1317
MDW 1312

-continued
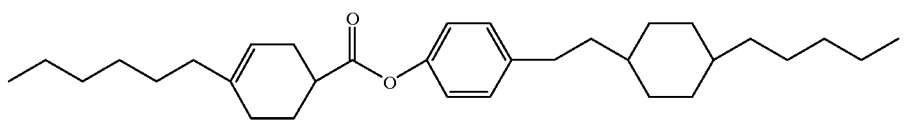
MDW 1306
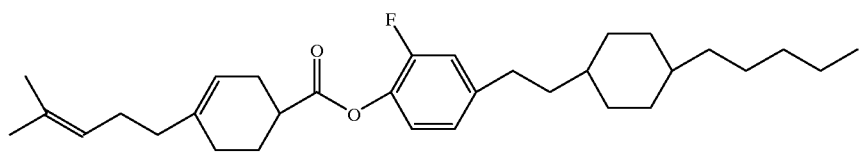
MDW 1456
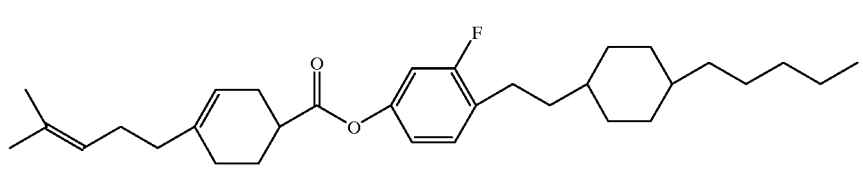
MDW 1457
Non-limiting examples of compounds of Formula IIIB include the following:
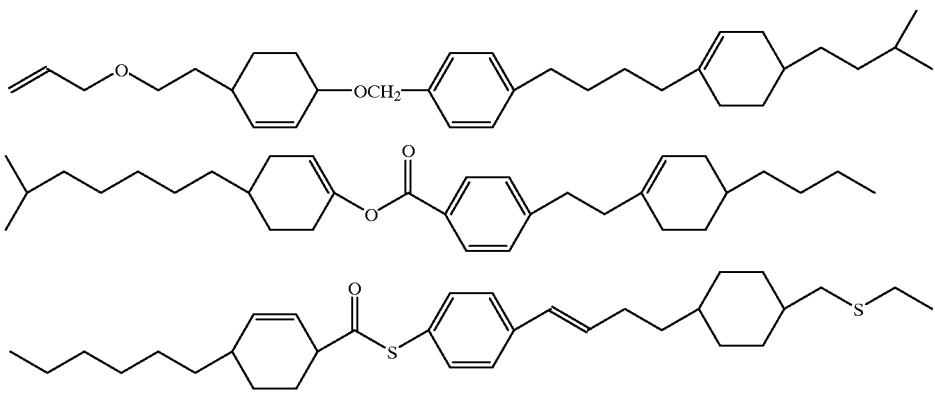
Formula IVA encompasses the following non-limiting examples:
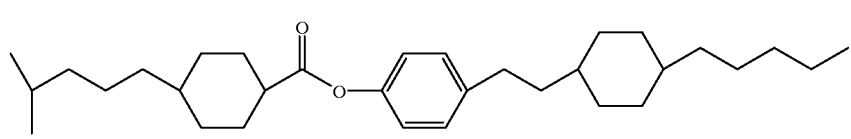
MDW 1055
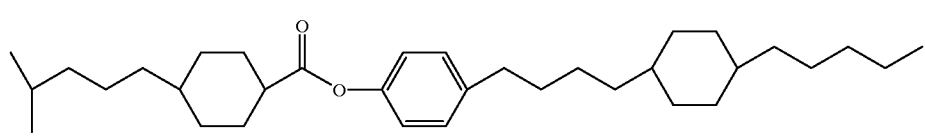
MDW 1123
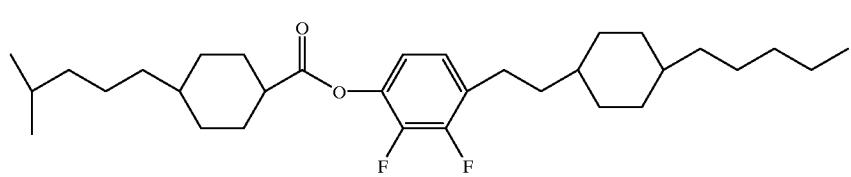
MDW1076

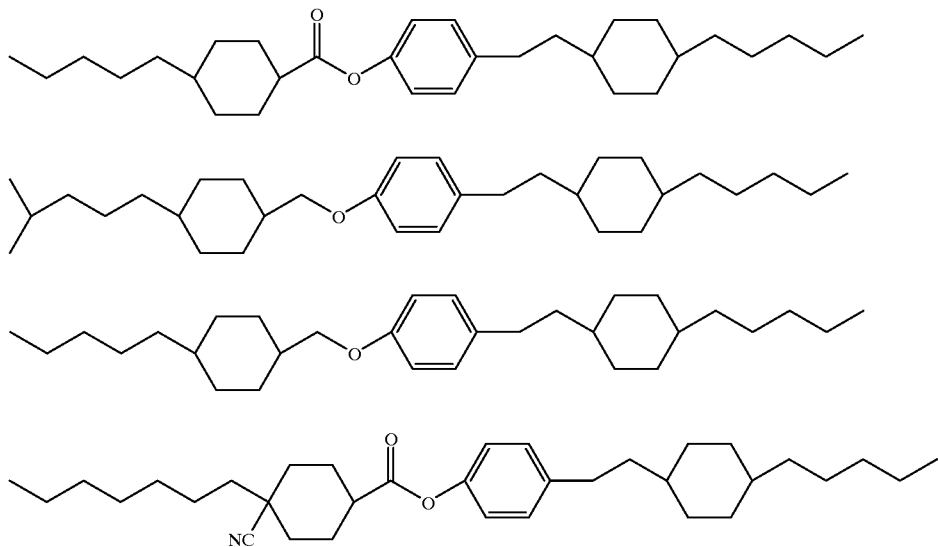
MDW 934
MDW 1064
MDW 938
MDW 1071
Non-limiting examples of compounds of Formula IVB include the following:
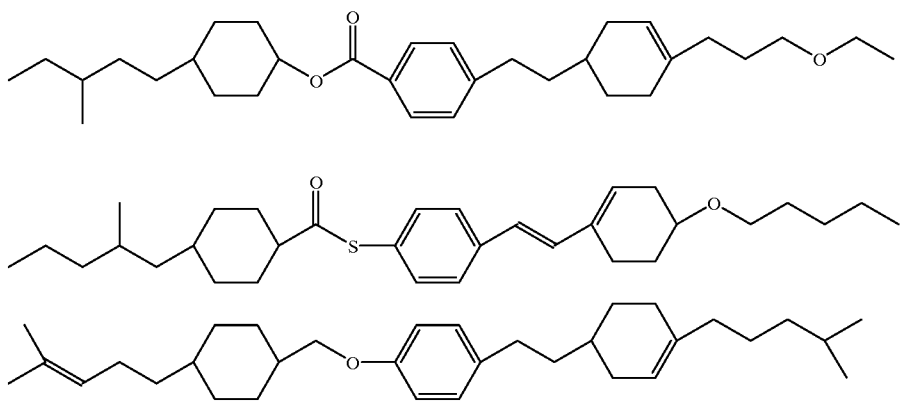
Formula VA encompasses the following non-limiting examples:
MDW 1136
MDW 1135
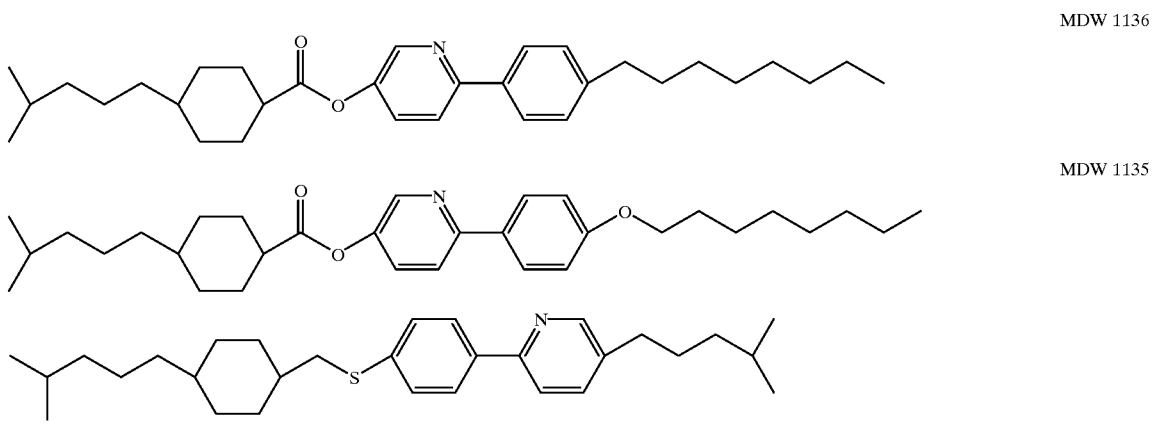

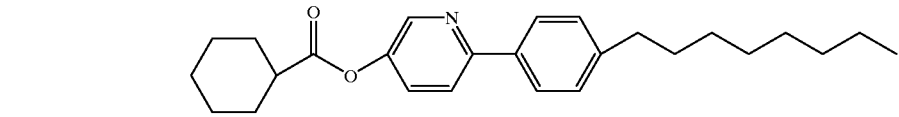
MDW 1345
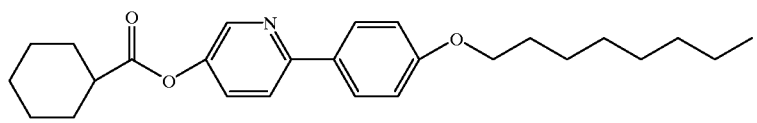
MDW 1344
RX and RY of Formula VA can be optionally substituted with 2 nitrogen to give representative compounds:
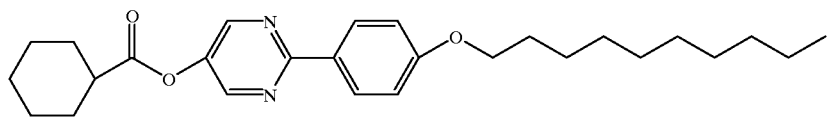
MDW 1359
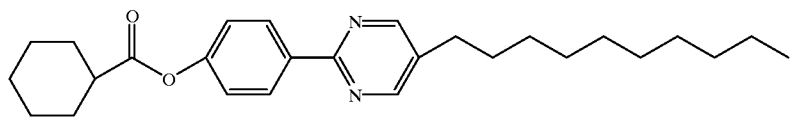
MDW 1343
Non-limiting examples of compounds of Formula VB include the following:
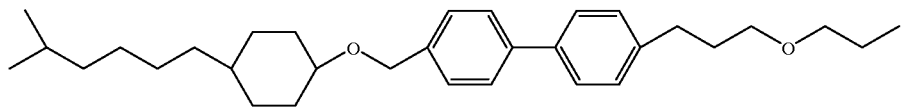
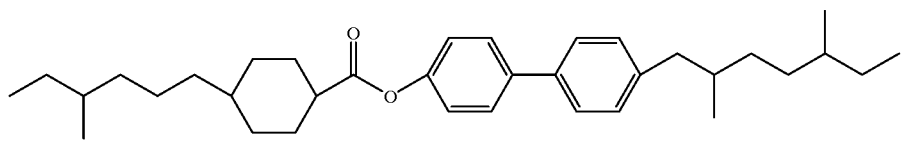
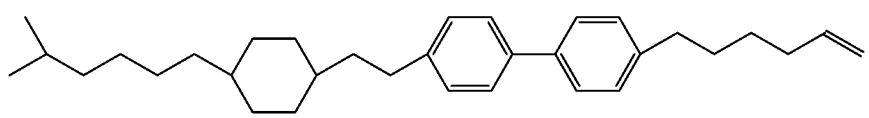
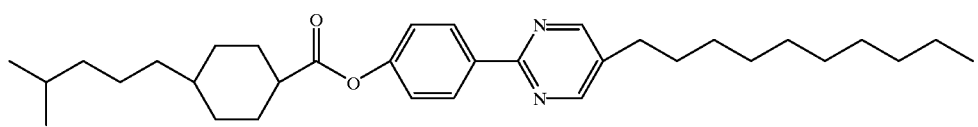
MDW 1059
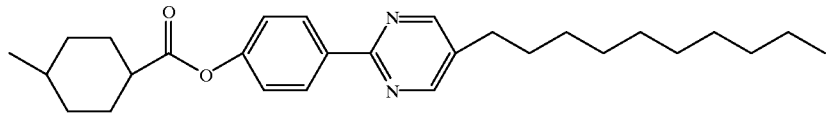
MDW 1060

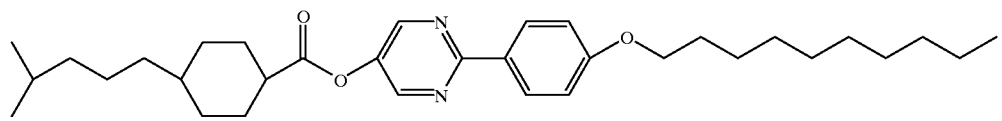
MDW 1061
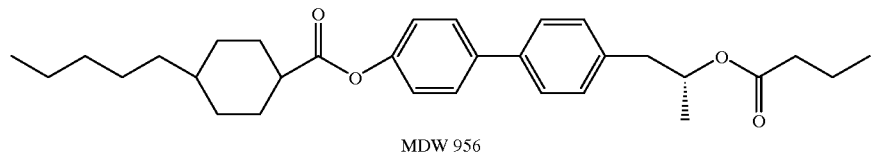
MDW 956
Formula VIA encompasses the following non-limiting examples:
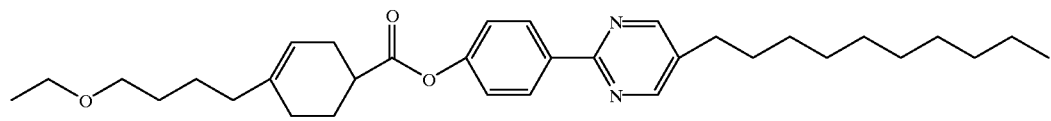
MDW 1267
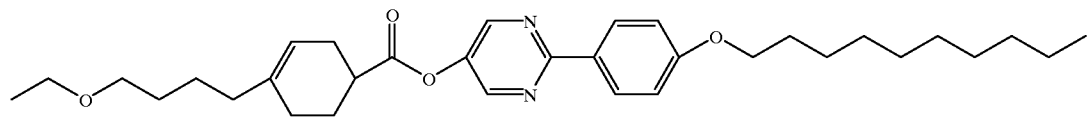
MDW 1268
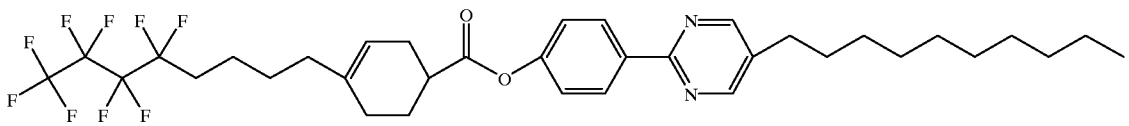
MDW 1269
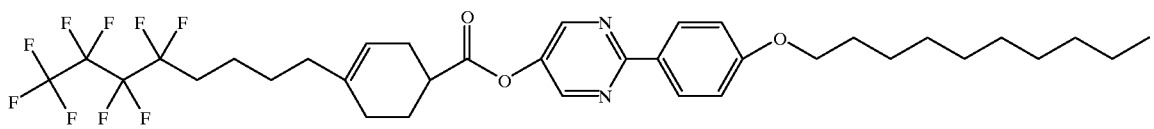
MDW 1270
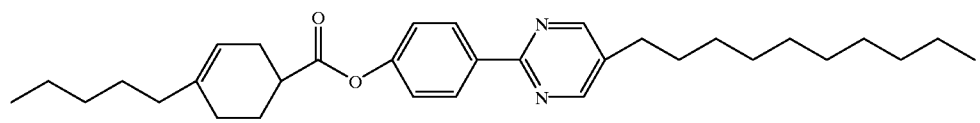
MDW 1271
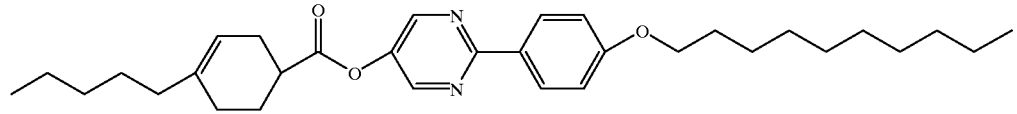
MDW 1272
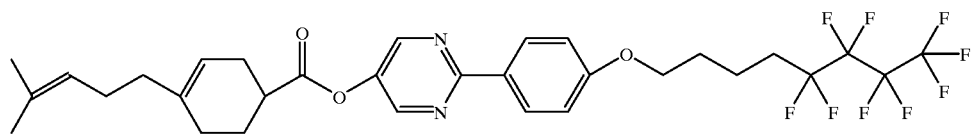
MDW 1025

-continued
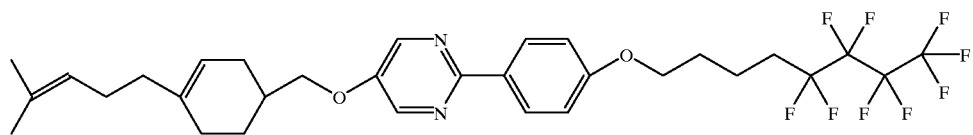
MDW 1027
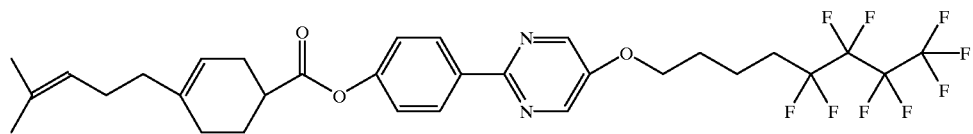
MDW 1026
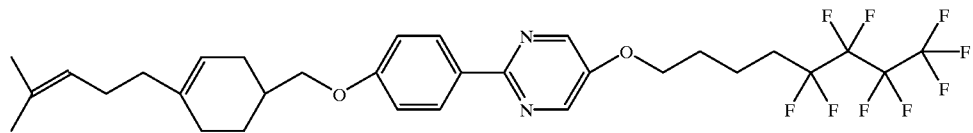
MDW 1028
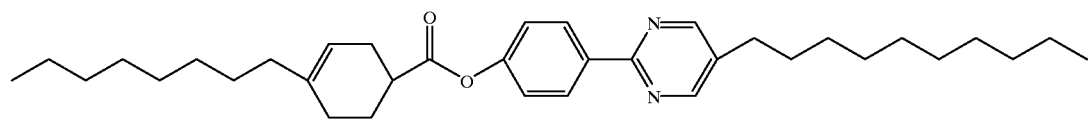
MDW 1300
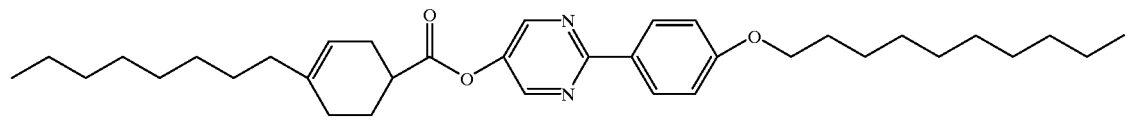
MDW 1303
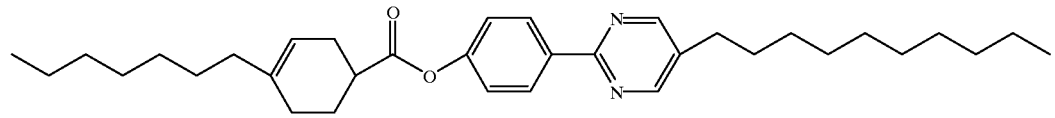
MDW 1301
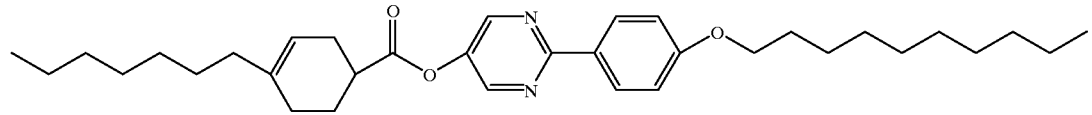
MDW 1304
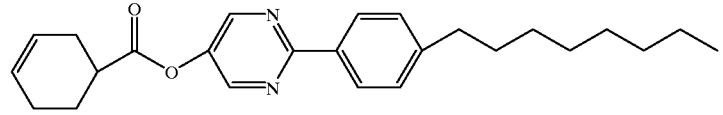
MDW 1353
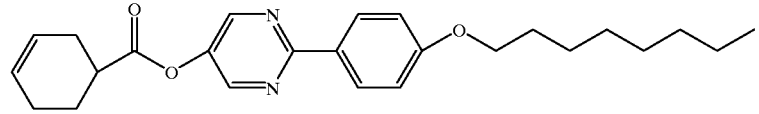
MDW 1354
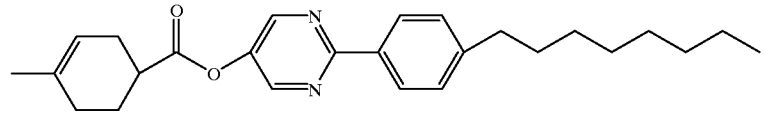
MDW 1367

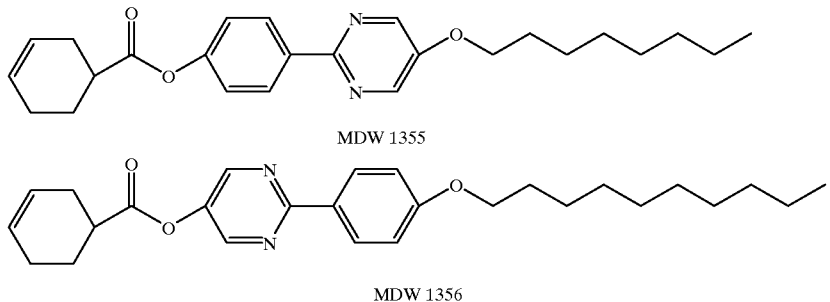
MDW 1355
MDW 1356
Non-limiting examples of the compounds of Formula VIB include the following:
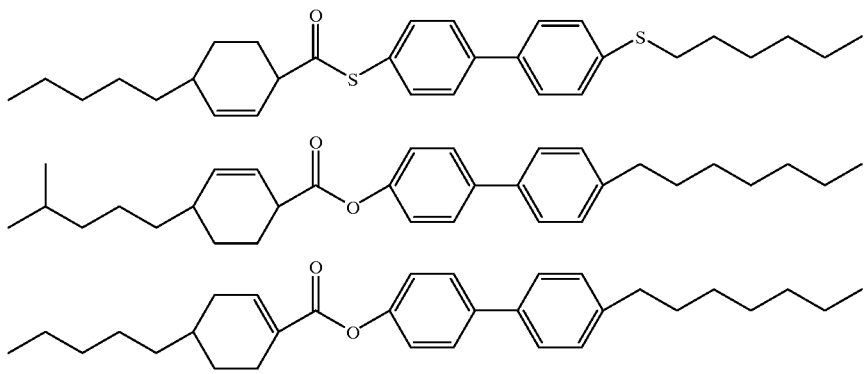
Formula XA encompasses the following non-limiting examples:
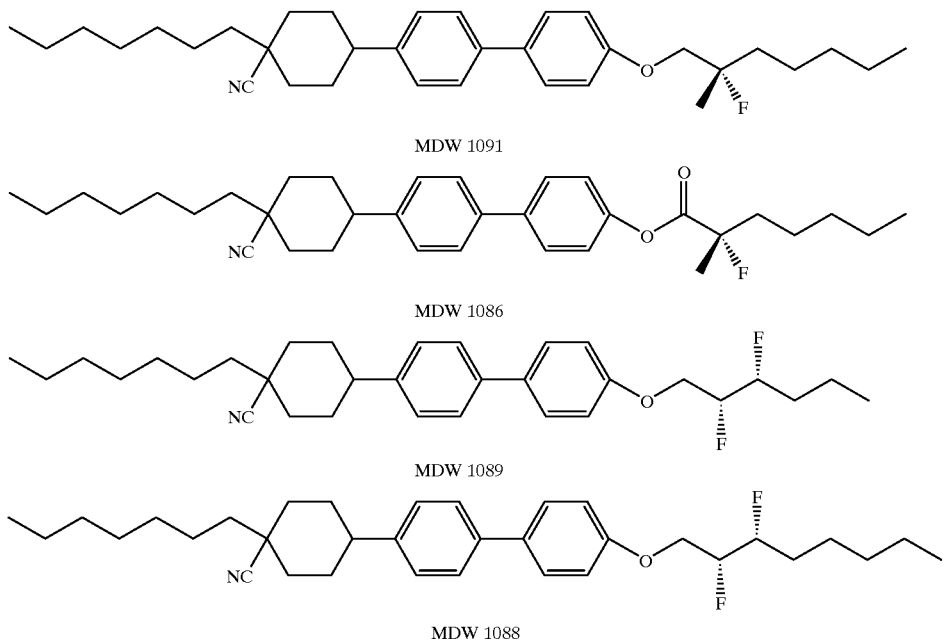
MDW 1091
MDW 1086
MDW 1089
MDW 1088

Formula XE encompasses the following non-limiting examples.
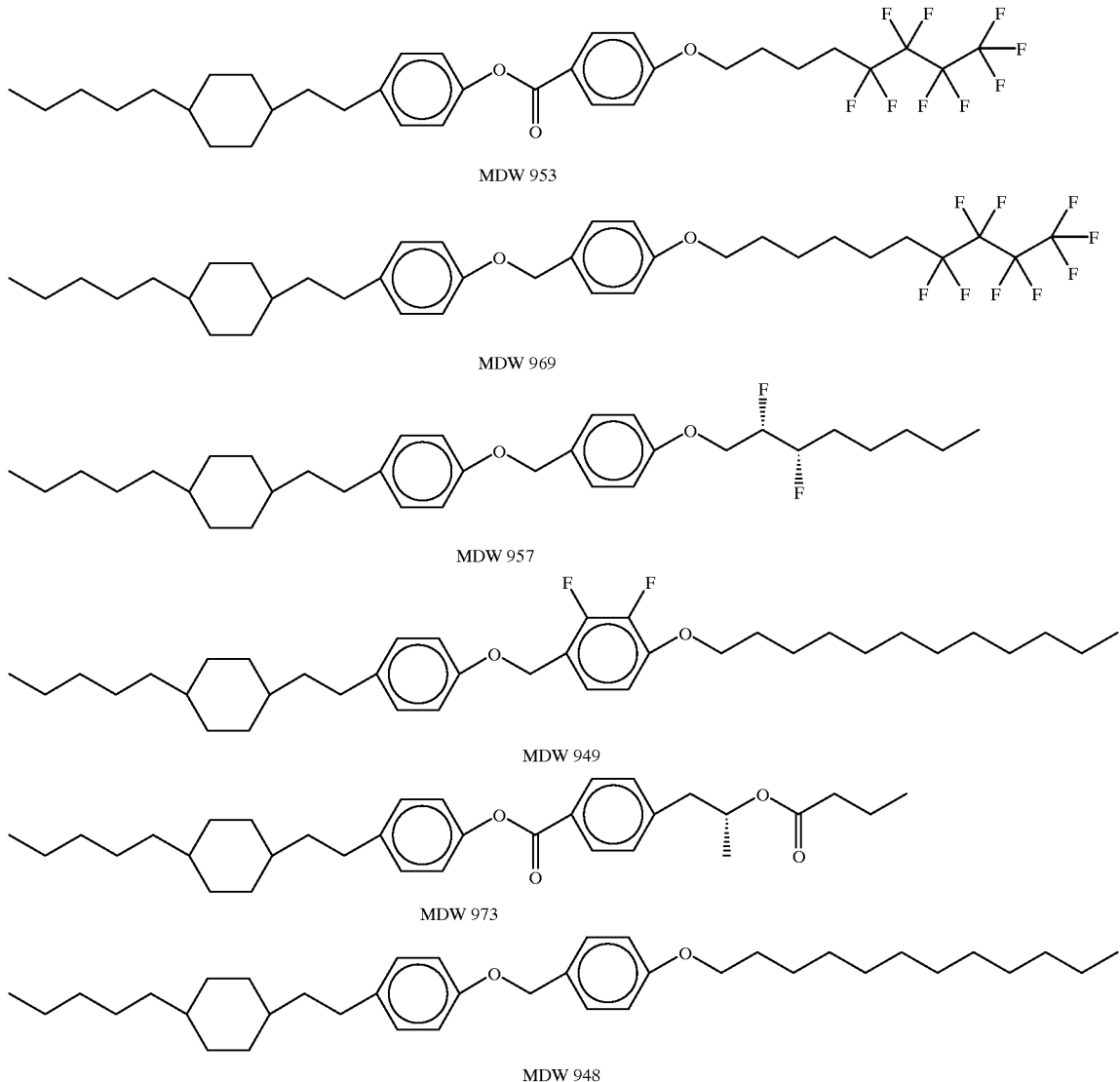
Formula XB encompasses the following non-limiting examples.
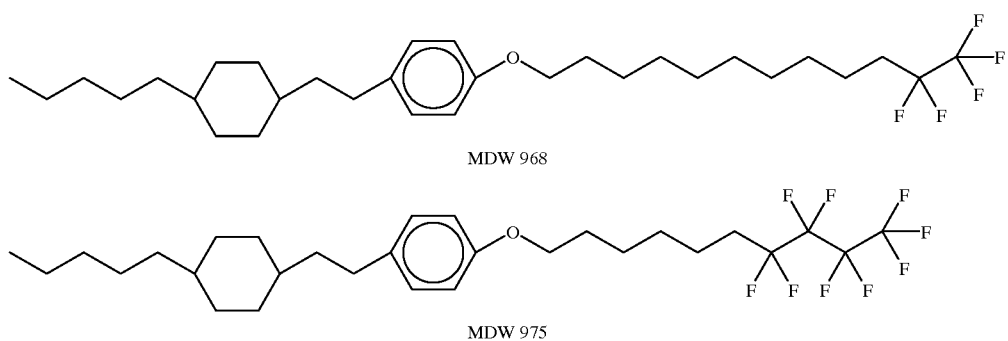

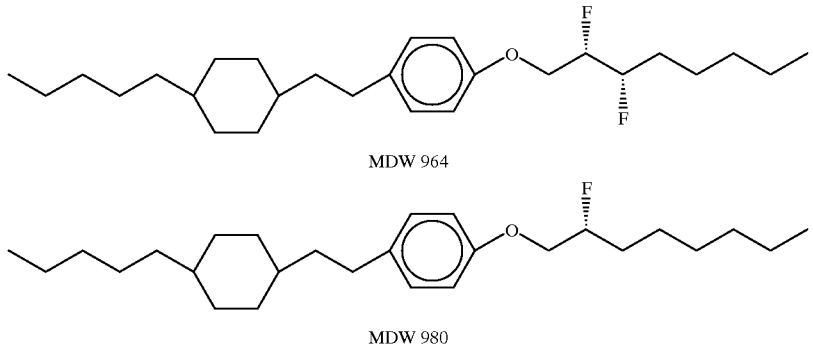

MDW 964

MDW 980

The compounds of the invention encompass examples other than those specifically illustrated. For example, the invention encompasses various ring substitutions and configuration, including compounds as those when Cyc is a 1,4-cyclohexyl ring, then any of RX, RY or RZ can be unhalogenated 2,5-pyridinyl. Also, compounds with one or two 1,4-cyclohexyl rings are included in the invention.

When any of RX, RY or RZ (but not all of RX, RY and RZ) are $R_1$—Ar—$R_2$, 2,3-difluorophenyl, then preferred compounds include those in which none of RX, RY or RZ is 1,4-cyclohexenyl or trans-1,4-cyclohexyl.

The linkers are also extremely variable. For example, a variety of lengths of linkers (A, B, D) can be present. In certain cases, when Cyc is a 1,4-cyclohexyl group, and when A, B or D is represented by —$(CH_2)_w$—, w can be 0 to 8, preferably not 4, and any —$CH_2$— group can be substituted with a variety of groups.

The linker A can be further limited in compounds of the invention. For example, when Cyc is a 1,4-cyclohexenyl or 1,4-cyclohexyl ring, and b, d, and z are 0, and when A contains 1 or 2 oxygen atoms, compounds of the invention include those where at least one of $R_1$ and $R_2$ contains one or more halogen atoms, preferably fluorine.

In general, the compounds of this invention have lower viscosity and greater solubility in liquid crystal host mixtures, as well as lower low temperature for the C* phase than those previously reported. These properties are shown by Tables 1–4. Table 1 lists the tilt angle, switching time, crystallization temperature and melting point for some of the compounds of the invention. Table 2 lists the polarization, host material used for the polarization measurement, concentration of the dopant in the host, tilt angle of the mixture, and the rise times of the mixture. The rise time is inversely proportional to the polarization of the mixture. A high polarization will therefore not always result in a short response time, as the compound may have a higher than average viscosity. Smaller tilt angles lead to shorter optical responses, but a tilt angle of less than 22.5° leads to lower than optimal contrast ratios.

The phase diagrams for some of the compounds of the invention are shown in Tables 3–4. It is preferred that a compound have a C phase, since the presence of a C phase in the compound widens the C phase of a mixture incorporating the compound. The lack of a C phase does not indicate the compound is not useful in a particular application, since the components and amounts of compounds used in mixtures used can be adjusted to obtain the phases desired. Table 5 illustrates the composition of the hosts used in the measurements. Table 6 shows representative birefringence data.

There are certain structure-property correlations that are seen in the compounds of the invention. Compounds with partially or fully fluorinated tails exhibit phase diagrams similar to those of materials having more rings. For example, when $R_1$ and/or $R_2$ are substituted with F, the viscosity of the compound is lower than if no fluorine is present. In addition, partially fluorinated tails on two- or one-ring compounds provide mesogenic phases similar to that present in three-ring compounds. Partially perfluorinated tails tend to increase the phase transition temperatures, similar to the behavior seen when an additional aromatic ring is found in the compound with less increase in viscosity than a compound with an additional aromatic ring. In compounds that contain three aromatic rings are more likely to have a smectic C phase, but the viscosity and birefringence are higher than compounds with fewer rings exhibit. Compounds with two aromatic rings have lower viscosity and lower birefringence than compounds with three aromatic rings. Compounds with two non-conjugated rings have even lower birefringence than compounds with two conjugated rings. When the compound contains cyclohexyl rings, the ring is more "floppy" and less easily stacked than aromatic rings. However, cyclohexyl rings in a molecule act similarly to an aromatic ring with respect to the properties of the compound. Compounds that contain only two non-conjugated rings generally have even lower birefringence than compounds with two conjugated rings. Solubility improvement depends on the host into which dopant is to be dissolved and on dopant structure. Phenylpyrimidine hosts are preferred over phenylbenzoate hosts.

Compounds with two cylcohexyl rings or one cyclohexyl and one cyclohexenyl ring (for example, Groups IIIA and IVA), give a higher ordered smectic B phase than would otherwise be expected. The smectic B phase in these compounds is similar to a smectic A phase in other molecules.

Cyano substitution on the Cyc ring helps increase the dielectric constant of the material (for example MDW 1091, 1086). A fluoromethyl tail such as seen in compounds 1091 and 1086 has lower twisting power than a difluoro tail, and has lower polarization than a difluoro tail. A compound with a monofluoro tail tends to have polarization similar to that of a fluoromethyl compound.

Another important physical characteristic of a compound is the ultraviolet (UV) absorption and UV stability. In certain applications, it is desired to use compounds that have low UV absorption and high stability. In general, the more aromatic rings the molecule has, the more the compound absorbs UV light. Fewer conjugated rings that are present in the molecule should also lower UV absop tion. Certain functional groups such as a hydroquinone ring or a diacetylene are particularly unstable to UV light.

In addition, compounds with the following structure:

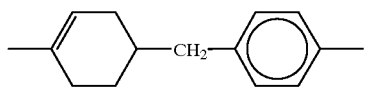

exhibit lower birefringence and viscosity than compounds with the following structure present in the molecule:

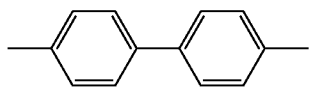

The tails also contribute to the characteristics of the molecule. Generally, straight chain or branched alkyl chains leads to increased tilt angle as compared to tails that are ethers or contain F.

In general, the presence of oxygen in the tails gives a wider smectic C phase than branched or straight chain alkyl chains in the tails. Also, more aromatic rings present in the molecule generally give a wider phase than fewer aromatic rings present in the molecule. In addition, compounds containing a connector between RX and RY have a narrower smectic C phase than compounds having no connector between RX and RY. When an unsubstituted phenyl ring is present for RX, RY or RZ, the smectic C phase is wider than a phenyl ring substituted with 2 fluorine molecules.

In general, the melting point of the molecule is higher for straight chain alkyl tails with no fluorine substitutions than if fluorine is substituted on the tails.

This invention will be more fully understood by reference to the following examples and methods, which are intended to be representative of the invention, but are in no way limiting.

EXAMPLES

General Remarks

In general, dialkylsilyl groups can be introduced into $R_1$ or $R_2$ tails employing known methods, for example as described in EP application 355,008 published Feb. 21, 1990, or by routine adaptation of methods described therein.

$R_2$- and $R_1$-substituted starting materials are commercially available or can be readily synthesized by known methods or routine adaptation of known methods particularly in view of the guidance provided herein.

Example 1

Representative Synthesis Example

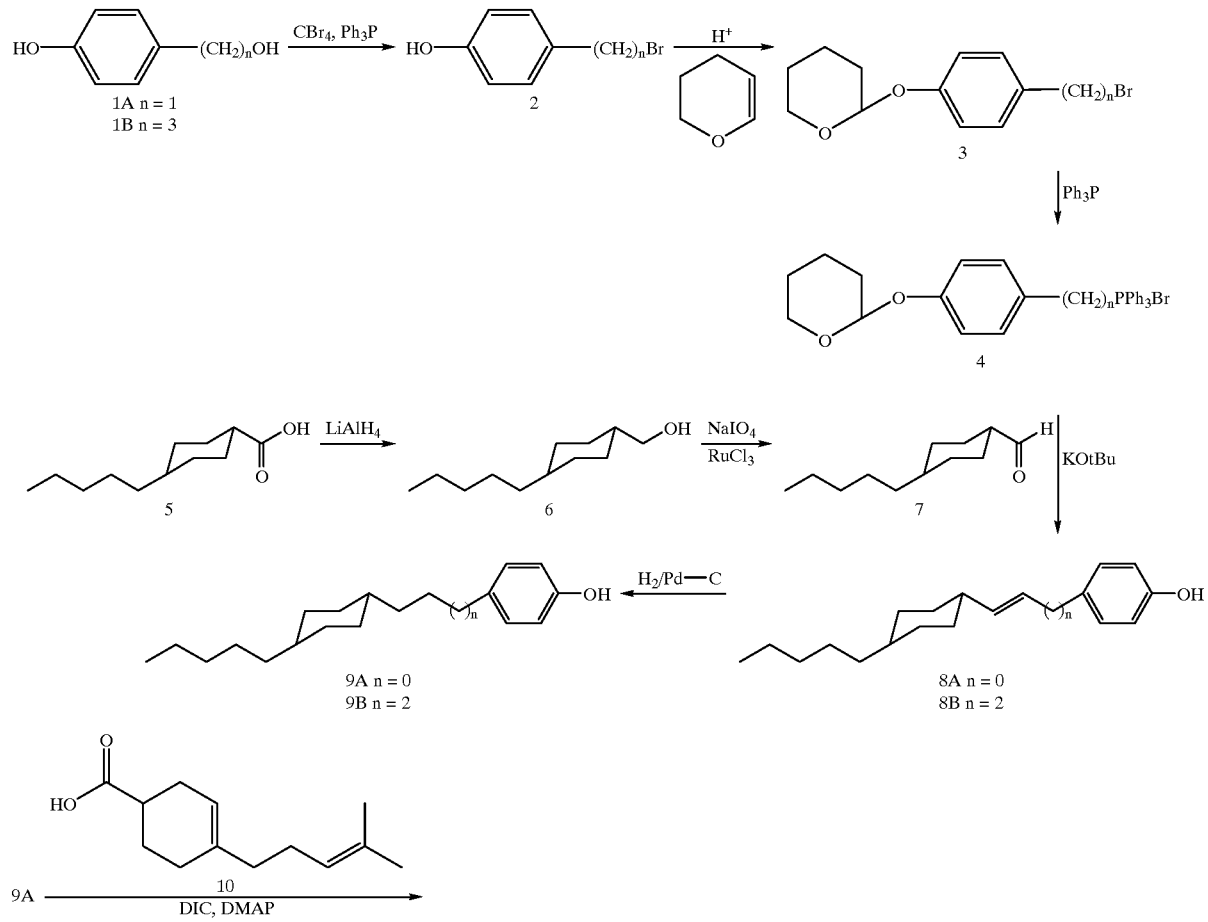

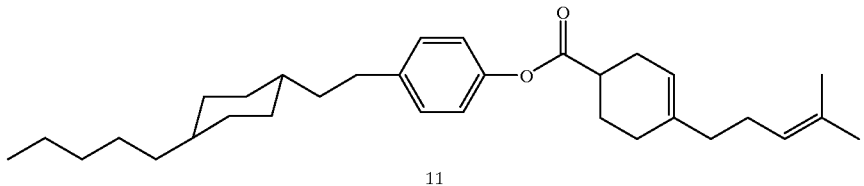

11

Step 1

A solution of tetrabromomethane (1.125 eq.) in dichloromethane (0.5 ml/mole) was added dropwise to the solution of the commercially available 3-(4-hydroxyphenyl)-1-propanol 1B (1 eq.) and triphenylphosphine (1.125 eq.) in dichloromethane at 0° C. The reaction mixture was stirred at room temperature for 2 days, extracted with dichloromethane, and the organic layer was washed with water and dried over anhydrous magnesium sulfate. The solvent was removed in vacuo. the crude reaction mixture was filtered through silica gel, eluting with 10% ethyl acetate in hexane, to give 3-(4-hydroxyphenyl)-1-bromopropane 2 as a brown oil in 62% yield.

Step 2

Five drops of phosphorous oxychloride were added to the solution of 3-(4-hydroxyphenyl)-1-bromopropane 2 (1 eq.) in anhydrous dichloromethane (10 ml/mole) at 0° C. Dihydropyran (1.5 eq.) was added dropwise (15 minutes) and the reaction mixture was stirred at room temperature for 2 days. Anhydrous potassium carbonate (1 g/mole) was then added and the reaction mixture was stirred at room temperature for 1 hour. the solvent was removed by rotovap and the reaction mixture was then extracted with 50% ethyl acetate in hexane. The organic layer was washed with saturated sodium bicarbonate and dried over a mixture of anhydrous sodium sulfate and potassium carbonate. The solvent was removed in vacuo to give tetrahydropyran derivative 3 as a brown oil in 85% yield.

Step 3

A solution of tetrahydropyran derivative 3 (1 eq.) and triphenylphosphine (1.2 eq.) in N,N-dimethylformamide (0.5 ml/mole) was heated at 100° C. for three hours. As it cooled to room temperature, a stream of nitrogen was bubbled through it. A white precipitate formed. The cooled reaction mixture was filtered, washed with ethyl acetate, and dried in vacuo to give product 4 in 54% yield.

Step 4

Anhydrous ether (4 ml/mole of carboxylic acid) was added to the commercially available lithium aluminum hydride (LAH) powder at 0° C. and the slurry was stirred for 10 minutes. A solution of the commercially available 4-trans-pentylcyclohexylcarboxylic acid 5 (1 eq.) In anhydrous ether (1 ml/mole) was added dropwise. The reaction mixture was stirred at room temperature overnight. The solution was cooled to 0° C., and water (1 ml/1 g LAH), 15% aqueous sodium hydroxide (1 ml/1 g LAH), and water (3 ml/Ig LAH), was added successively dropwise to the reaction mixture. The reaction mixture was stirred for one hour, until only white solid remained. Solid anhydrous magnesium sulfate (1 g/mole) was added to the reaction mixture and stirred for half an hour. The mixture was filtered through celite and the solvent was removed in vacuo to give alcohol 6 as a colorless oil in 78% yield.

Step 5

To a biphasic solution of alcohol 6 (1 eq.), benzyltriethylammonium chloride (0.05 eq.), ruthenium trichloride (0.03 eq.), potassium carbonate (0.15 eq.) And chloroform:water (1:1) (1 ml/mole alcohol) stirring at 0° C. was added a solution of sodium periodate (1.5 eq.) In isopropanol (0.3 ml/mole). The reaction mixture was stirred at 0° C. for one hour, then extracted with dichloromethane. The organic layer was washed with water and dried over anhydrous magnesium sulfate. The solvent was removed in vacuo. The crude reaction mixture was filtered through silica gel eluting with 5% ethyl acetate in hexane to give aldehyde 7 as a colorless oil in 85% yield.

Step 6

Potassium-tert-butoxide (1.6 eq.) was added to a stirred solution of aldehyde 7 (1 eq.), phosphonium bromide 4 (1.5 eq.) and tert-butylmethyl ether (6 ml/mole) at room temperature. A dark orange color was observed. The reaction mixture was stirred at room temperature overnight, then poured into water (15 ml/mole), and extracted with ether. The organic layer was washed with water, dried over anhydrous magnesium sulfate, filtered, and evaporated. The residue was purified by column chromatography on silica gel using 25% toluene in hexane to give phenol 8 as a white solid.

Step 7

Hydrogen gas was bubbled through a solution of alkene 8B (1 eq.) in a mixture of ethyl acetate:ethyl alcohol (1:1) (10 ml/mole) containing 10% palladium on carbon catalyst (0.01 g/g alkene) for 24 hours. The reaction mixture was filtered through celite and the solvent was removed in vacuo to give phenol 9B as a white solid in 95% yield.

Step 8

Diisopropylcarbodiinide (DIC) (1.2 eq.) and dimethylaminopyridine (DMAP) (0.1 eq.) was added to the solution of cyclohexene acid 10 (1 eq.), phenol 9A (1 eq.), and ethyl acetate:hexane (1:1) at room temperature. The reaction mixture was stirred at room temperature overnight, washed with water, and saturated solution of sodium chloride. The organic layer was dried over anhydrous magnesium sulfate, filtered, and the solvent removed in vacuo. The residue was purified by column chromatography on silica gel using 1% ethyl acetate in hexane, then recrystallized from 25% ethyl acetate in acetonitrile to give ester 11 as a white solid in 79% yield.

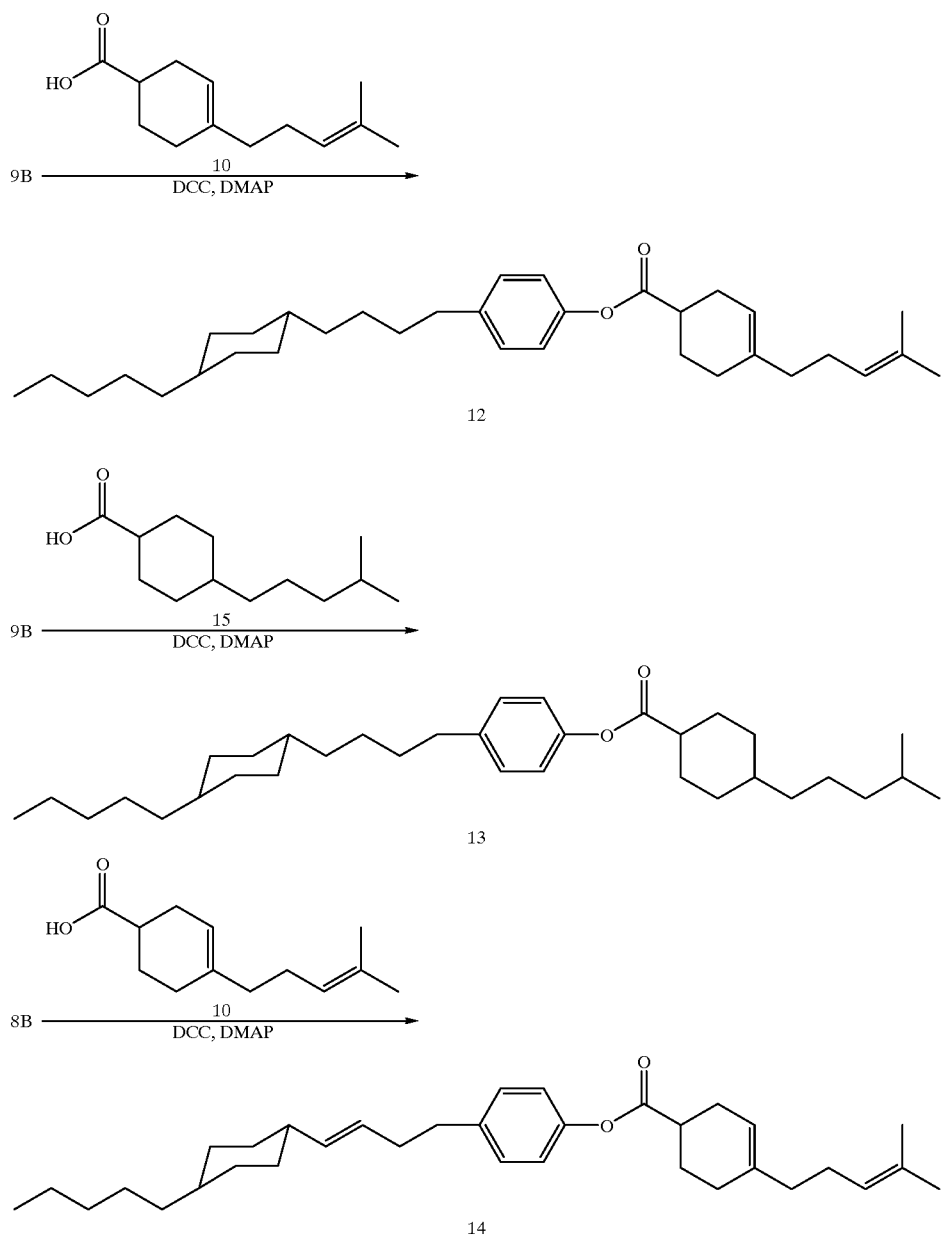

Phenol 9B was coupled with acids 10 and 15 and phenol 8B was coupled with acid 10 using the method in step 8 but using dicyclohexylcarbodiimide (DCC) instead of DIC, giving FLCs 12, 13, and 14 in 8%, 15% and 47% yield, respectively.

Step 9

The preparation of cyclohexane acid 15 from cyclohexene acid 10 is the same as step 7. The yield of the white solid is 95%.

Step 10

The acid 15 (1 eq.) was stirred with oxalyl chloride (5 eq.) at room temperature for three hours. The excess oxalyl chloride was removed in vacuo to give acid chloride 16 as a pale yellow oil in 92% yield.

Step 11

Acid chloride 16 (1 eq.) was added dropwise to the solution of phenol 9A (1 eq.) and triethylamine (1.5 eq.) in anhydrous tetrahydrofuran at room temperature. The reaction mixture was stirred at room temperature for two hours. The reaction mixture was then extracted with ethyl acetate-:hexane (1:1) and water. The organic layer was sequentially washed with water and a saturated solution of sodium chloride, then dried over anhydrous magnesium sulfate. The solvent was removed in vacuo. The crude reaction mixture was passed through silica gel eluting with 2% ethyl acetate in hexane giving compound 17 as a white solid in 81% yield.

Similarly, acid chloride 16 was coupled with phenol 18 to give ester 19 as a white solid in 63% yield.

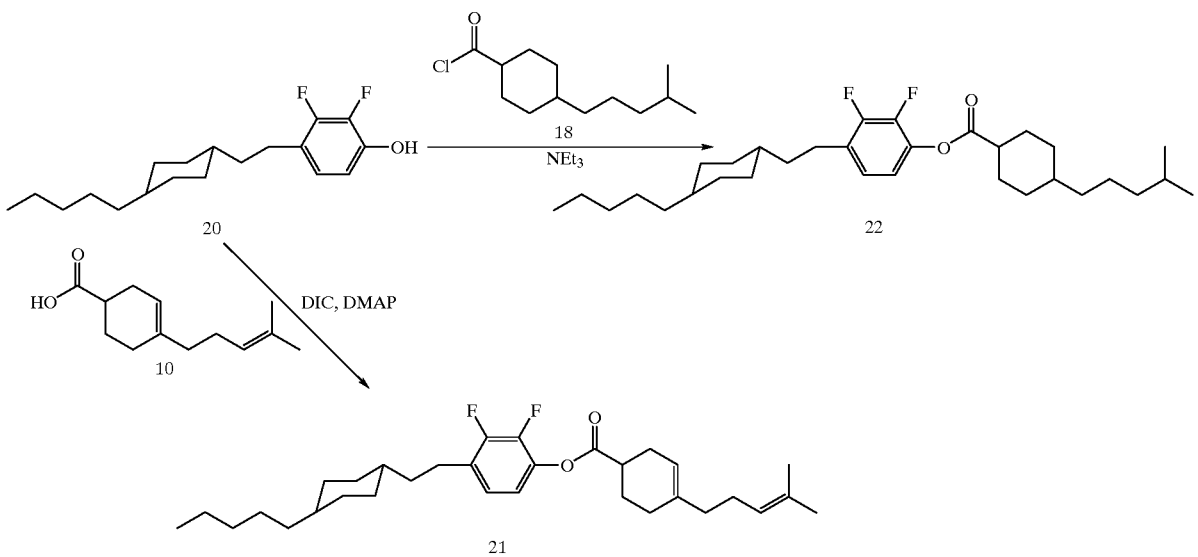

Phenol 20 was coupled with acid 10 using the method in step 8, and with acid chloride 16 using the method in step 11, giving FLCs 21 and 22 in 39% and 44% yield, respectively.

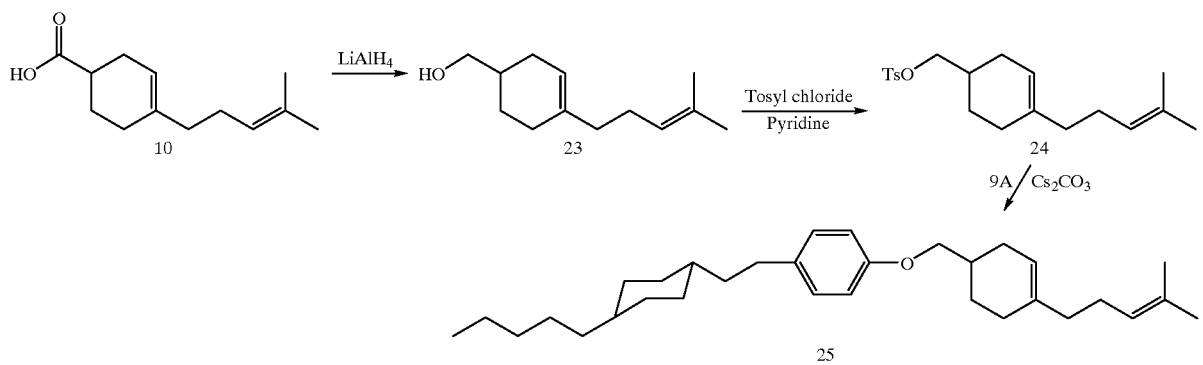

Step 12

Acid 10 was reduced to alcohol 23 using the method in step 4, to give a colorless oil in 98% yield.

Step 13

Tosyl chloride (1.1 eq.) was added to the solution of the alcohol 23 (1 eq.) in pyridine at 0° C. The reaction mixture was stirred at 0° C. for two hours and kept at −20° C. overnight. Tetrahydrofaran (3 ml/mole alcohol) and aqueous ammonia (0.1 eq.) was added to the reaction mixture and stirred for 20 minutes. The reaction mixture was then extracted with ethyl acetate:hexane (1:1) and organic layer was washed with cold 10% aqueous hydrochloric acid, water, brine, and dried over anhydrous magnesium sulfate. The solvent was removed in vacuo. The crude reaction mixture was filtered through silica gel, eluting with 10% ethyl acetate in hexane, to give tosylate 24 as a colorless oil in 99% yield.

Step 14

Cesium carbonate (1.1 eq.) was added to the solution of the tosylate 24 (1 eq.) and phenol 9A (1 eq.) in N,N-dimethylformamide (3 ml/mole phenol) at room temperature. The reaction mixture was stirred at room temperature overnight and then extracted with ethyl acetate:hexane (1:1) and organic layer was washed with water, brine, and dried over anhydrous magnesium sulfate. The solvent was removed in vacuo. The crude reaction mixture was filtered through silica gel, eluting with 10% ethyl acetate in hexane, to give ether 25 as a white solid 47% yield.

The compounds of this invention can be prepared by various methods known to those skilled in the art of organic chemistry. Some examples of important synthetic routes are illustrated below; these are exemplary methods and should not be taken as exhaustive. For the sake of simplicity, the routes are depicted without substituents or derivatization in most cases, but this should not be construed to limit the scope of the synthetic process. The examples provide non-limiting, exemplary reaction conditions and details.

Scheme 1 provides one synthetic route for preparing cyclohexyl- and cyclohexenyl-carboxylic acids and ethers, compounds which can be used, e.g. in Schemes 2–18, as reagents for the preparation of the compounds of this invention, e.g. the compounds of Formulas IIIA, IIIB, IVA, IVB, VA, VB, VIA, VIB, XA, XB, XC and XE. In Scheme 1, R=$R_1$ or $R_2$ as defined above. Specific compounds that are addressed include 1F, which is a 4-alkyl-3-cyclohexene carboxylic acid. In this compound, the R group can be any alkyl group accessible by the reaction of a Grignard reagent with an alkyl halide (such as the coupling reaction forming diene 1C). From this compound can be made cyclohexene carboxylic acids with the double bond in either the 1 or the 2 position, or trans-cyclohexane carboxylic acids. Each of these cyclohexenyl or cyclohexanol carboxylic acids can be reduced using lithium aluminum hydride to give the corresponding alcohol (e.g., 1G), which can be converted into the tosylate (e.g., 1H).

magnesium sulfate. The solvent is carefully removed by rotary evaporation to give 17 g of a colorless, malodorous liquid.

Other alkyl tails, including the saturated hydrocarbons, tails with one or more double or triple bonds, tails including a partially perfluoronated section, tails with one or more

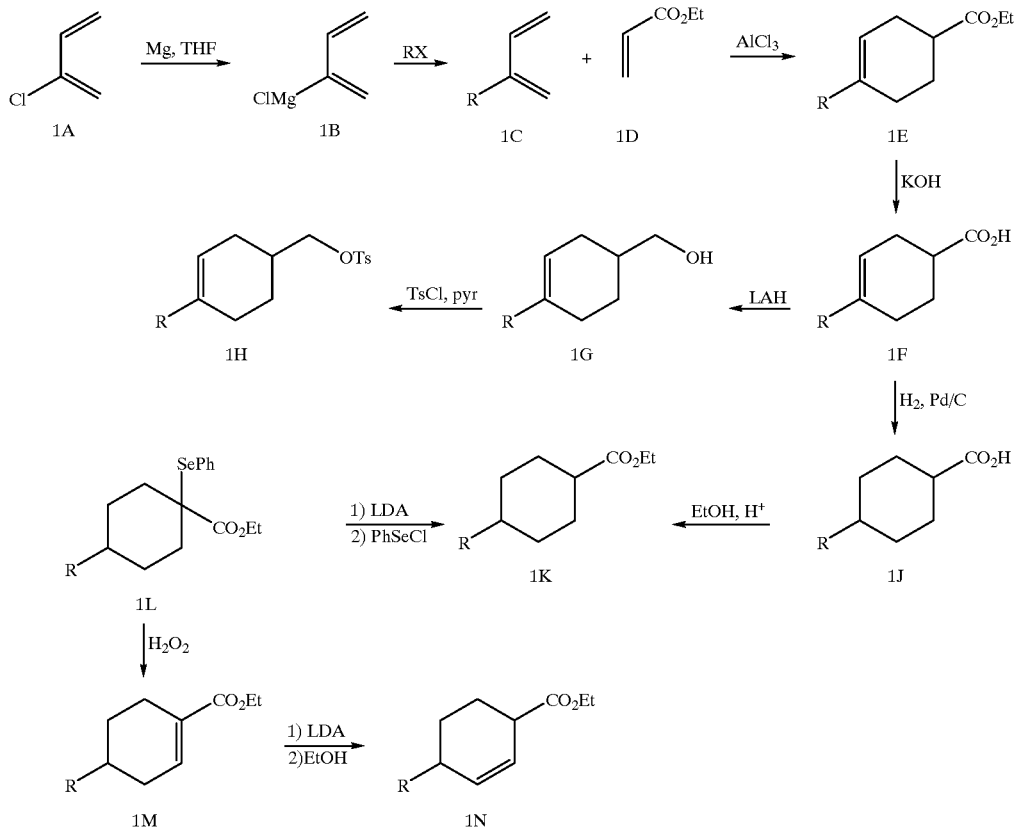

Scheme 1 ether linkages, and tails containing sulfurs or other heteroatoms may be used in place of the pentyl group in this step. Leaving groups on the tails include bromide, tosylate, chloride, iodide, and triflate.

This example illustrates the synthesis of alkyl cyclohexenyl acids.

1B 2-bromomagnesium-1,3-butadiene

To a solution of chloroprene 1A (10 mL, 50% in xylene) in tetrahydroflran (216 mL) is added magnesium shavings (6.31 g). Several drops of 1,2-diiodoethane are added to initiate the reaction, and the reaction is allowed to proceed overnight. If the reaction is excessively vigorous, it is placed in a water bath to control the temperature; if it appears to be nonreactive, it is placed in an ultrasonic bath to encourage further reaction.

1C 2-Pentyl-1,3-butadiene

To a flask containing cuprous bromide (1.0 g) is added bromopentane (23 g) and tetrahydrofaran (154 mL). The solution is cooled to 0° C., and the Grignard reagent 1B is added. The reaction is stirred overnight, gradually warming to room temperature. To the solution is then added 30 mL saturated ammonium chloride. The reaction mixture is stirred for 10 minutes, during which time the aqueous layer turns blue. The reaction mixture is then extracted with hexanes, and the combined organic layers are dried over 1E Ethyl 4-pentyl-3-cyclohexenyl-1-carboxylate To a solution of ethyl acrylate (14.8 mL) in anhydrous toluene (137 mL) is added aluminum chloride (1.82 g). The flask is cooled to 0° C., and the pentylbutadiene 1C (R=pentyl) (17 mL) is added dropwise. The reaction mixture is stirred 5 hours at 0° C., then allowed to stand at 4° C. for a further 16 hours. The reaction mixture is then sequentially extracted with two portions (150 mL each) of 1% hydrochloric acid solution, water (75 mL), and brine (75 mL). It is dried over sodium sulfate, filtered through Celite, and concentrated in vacuo. The product is distilled to give 27.3 g of clear, colorless liquid.

1F 4-Pentyl-3-cyclohexenyl-1-carboxylic acid

To a solution of potassium hydroxide (23.4 g) in water (122 mL) is added ester 1E (R=pentyl) (27.3 g). The mixture is stirred under reflux for 16 hours. The reaction mixture is then neutralized with a mixture of concentrated hydrochloric acid (36 mL), water (40 mL), and ice (40 g), and is extracted with dichloromethane. The combined organic extracts are dried over sodium sulfate, and the solution is concentrated in vacuo to give 21.5 g of a slightly yellow crystalline material. The solid is recrystallized from acetonitrile to give 21 g of fine white crystals.

In compound 1F, the R group can be any alkyl group accessible by the reaction of a Grignard reagent with an alkyl halide (such as the coupling reaction forming diene 1C). From this compound can be made cyclohexene carboxylic acids with the double bond in either the 1 or the 2 position, or trans-cyclohexane carboxylic acids. Each of these cyclohexenyl or cyclohexanyl carboxylic acids can be reduced using lithium aluminum hydride to give the corresponding alcohol (e.g., 1G), which can be converted into the tosylate (e.g., 1H).

This example illustrates the synthesis of cyclohexenyl ethers.

1G 4-(4-Methyl-3-pentenyl)-3-cyclohexenyl-1-methanol

To a cold (0° C.) solution of lithium aluminum hydride (3.64 g) in tetrahydrofaran (THF, 100 mL) in a flask outfitted with a condenser is added, dropwise, a solution of acid 1F (R=4-Methyl-3-pentenyl) (10.0 g) in THF (30 mL). The reaction mixture is allowed to stir at room temperature for at least three hours. It is then re-cooled to 0° C., and water (20 mL) is added dropwise to the solution. An additional 50 mL of THF is also added, and the reaction mixture is allowed to stir for three hours. The reaction mixture is then acidified with 2M HCl (150 mL) and is extracted with a 1:1 ethyl acetate:hexane mixture. The combined organic layers are extracted with brine and dried over sodium sulfate. The solvent is removed in vacuo, and the resultant oil is distilled (92–95° C. at c.a. 1 mm Hg) to give 8.89 g of a slightly yellow oil.

1H 4-(4-Methyl-3-pentenyl)-3-cyclohexenyl-1-methanol toluenesulfonate

To a solution of alcohol 1G (R=4-Methyl-3-pentenyl) (7.89 g) in pyridine (8.2 mL) at 0° C. is added p-toluenesulfonyl chloride (8.13 g). The reaction is allowed to stir in an ice bath for 2 hours, and is then allowed to stand at −20° C. for a further 16 hours. The reaction mixture is thein poured into 2M HCl (75 mL) and extracted with ethyl acetate. The combined organic layers are extracted with brine and dried over sodium sulfate. The solvent is removed in vacuo to give 14.11 g of a light yellow, non-viscous oil.

Preparation of 4-alkyl-3-cyclohexylcarboxylic acid

This example illustrates the synthesis of alkyl cyclohexyl acids.

1J 4-(4-Methyl-3-pentenyl)-3-cyclohexyl-1-carboxylic acid

To a solution of cyclohexenyl carboxylic acid 1F (R=4-Methyl-3-pentenyl) (5 g) in ethanol (25 mL) and ethyl acetate (25 mL) is added Perlman's catalyst (PdOH on carbon, 270 mg). The reaction mixture is placed under a hydrogen atmosphere until TLC shows consumption of all starting material. The reaction mixture is then filtered, and the solution is concentrated in vacuo. The product is recrystallized from acetonitrile to give 3.5 g of the trans-substituted product.

This example illustrates the synthesis of alkyl cyclohex-1-enyl acids.

1K Ethyl 4-(4-Methyl-3-pentenyl)-3-cyclohexyl-1-carboxylate

To a solution of carboxylic acid 1J (R=4-Methyl-3-pentenyl) (10 g) in anhydrous ethanol (150 mL) is added three drops of concentrated suiflirfic acid. The ethanol is then distilled dropwise from the reaction mixture until the starting acid shows complete conversion to the ester. Approx. 1 g of potassium carbonate is then added to the reaction mixture, which is stirred for 10 minutes. The solid is filtered out and the solution is concentrated in vacuo to give 12 g of a colorless oil.

1L Ethyl 4-(4-Methyl-3-pentenyl)-3-cyclohexyl1-phenylselenyl-1-carboxylate

To a solution of ester 1K (R=4-Methyl-3-pentenyl) (10 g) in anhydrous tetrahydrofuran, cooled to −30° C., is added 22.9 mL of a 2M solution of lithium duisopropylamide. The reaction is stirred at that temperature for 1 hour, at which time phenylselenenyl chloride (8.76 g) is added. The reaction is stirred at −30° C. for a further 30 minutes, then is gradually warmed to room temperature over about 2 hours. The reaction is poured into a pH 7 buffer and extracted with hexane, then dried over magnesium sulfate. The solution is concentrated in vacuo.

1M Ethyl 4-(4-Methyl-3-pentenyl)-3-cyclohex-1-enyl-1-carboxylate

To a solution of phenylselenenyl ester 1L (R=4-Methyl-3-pentenyl) (10 g) in ethanol (75 mL), cooled to 0° C., is added a 30% solution of hydrogen peroxide (7.75 mL). This reaction mixture is stirred for one hour, at which time it is brought to room temperature. A saturated solution of sodium carbonate (10 mL) is added, and the reaction mixture is stirred an additional hour. The reaction mixture is then extracted with hexane and dried over magnesium sulfate. The solution is concentrated in vacuo.

This example illustrates the synthesis of alkyl cyclohex-2-enyl acids.

1N Ethyl 4-(4-Methyl-3-pentenyl)-3-cyclohex-2-enyl-1-carboxylate

To a solution of ester 1M (R=4-Methyl-3-pentenyl) (10 g) in anhydrous tetrahydrofaran, cooled to −78° C., is added 22.9 mL of a 2M solution of lithium diisopropylamide. The reaction is stirred at that temperature for 1 hour, at which time ethanol (20 mL) is added. The reaction mixture is gradually warmed to room temperature, extracted with hexane, and dried over magnesium sulfate. The solution is concentrated in vacuo.

Scheme 2, which uses materials prepared in Scheme 1 in addition to other materials which can be selected by routine choice by those of ordinary skill in the art, provides a synthetic route to compounds of Formulas IIIA, IIIB, IVA and IVB, e.g. various alkylcylohexenyl- and alkylcyclohexyl-ethylphenyls, phenyl alkylcyclohexenyl ethers, and phenyl alkylcyclohexenylcarboxylates. Although the starting material shown is a cyclohexenyl compound, the corresponding cyclohexanyl compounds will work equally well. Furthermore, the anisole 2D can be derivatized in various ways, potentially having one to four fluorines, methyl, or trifluoromethyl groups. This scheme also addresses the coupling of phenol 2G with the various compounds whose synthesis was shown in scheme 1, specifically the cyclohexane or cyclohexene carboxylic acids and cyclohexane or cyclohexene methanol tosylates.

Scheme 2

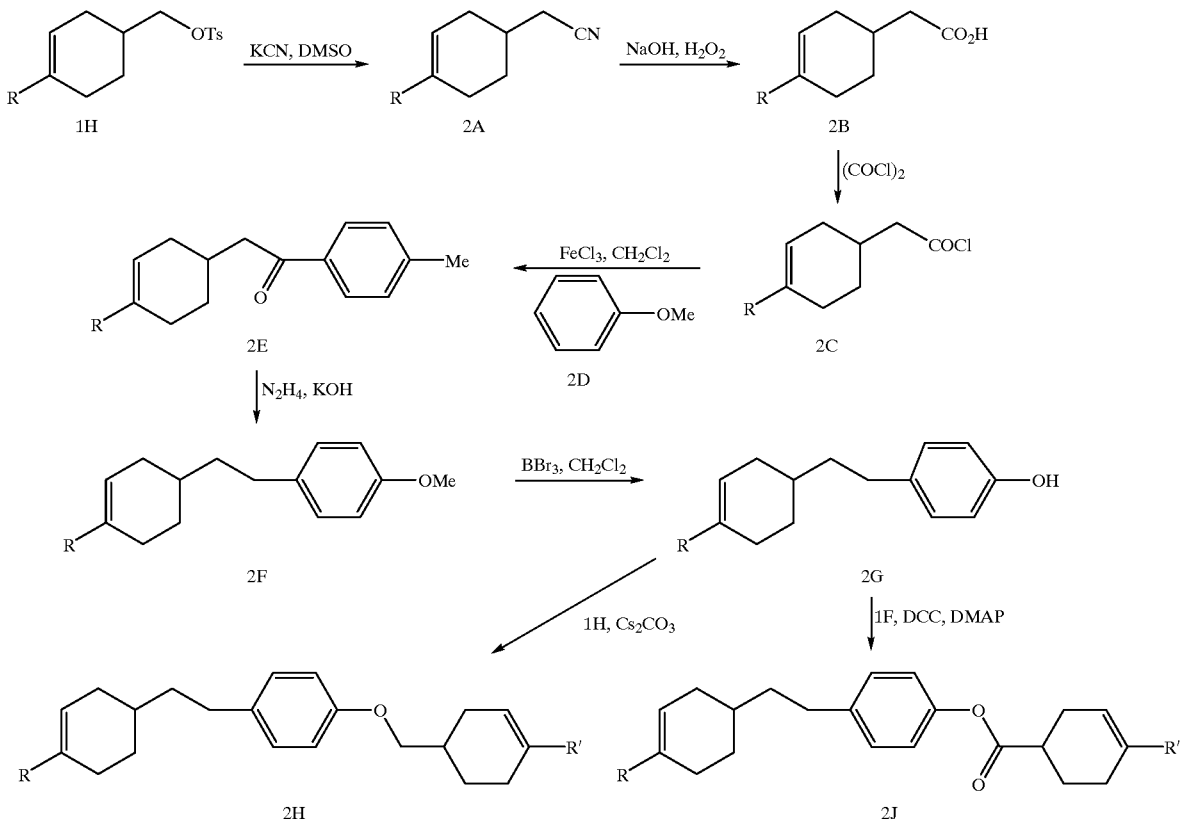

This example illustrates the synthesis of alkylcyclohexenyl and alkylcyclohexylethyl phenols.

2A (4-(4-Methyl-3-pentenyl)-3-cyclohexenyl) acetonitrile

To a solution of tosylate 1H (R=4-Methyl-3-pentenyl) (20 g) in dimethylsulfoxide (178 mL) is added potassium cyanide (19.4 g). The reaction mixture is heated to 100° C., and the reaction mixture is stirred at that temperature for three hours. The reaction mixture is cooled to room temperature, added to water (300 mL), and extracted with hexane. The combined organic layers are dried over magnesium sulfate and the solution is concentrated in vacuo.

2B (4-(4-Methyl-3-pentenyl)-3-cyclohexenyl)acetic acid

To a solution of sodium hydroxide (10.5 g) in water (150 mL) and 30% hydrogen peroxide (50 mL) is added the nitrile 2A (R=4-Methyl-3-pentenyl) (10 g). The reaction mixture is stirred at reflux overnight. The reaction is then cooled to room temperature, and poured into a mixture of ice (30 g) and hydrochloric acid (22 mL). The acid product is extracted with ethyl acetate, and the combined organic layers are washed with brine and dried over magnesium sulfate. The solution is concentrated in vacuo.

2C (4-(4-Methyl-3-pentenyl)-3-cyclohexenyl)acetyl chloride

To a 100 mL flask containing a stirbar is added the acid 2B (R=4-Methyl-3-pentenyl) (10 g) and oxalyl chloride (8.3 mL). The reaction is stirred under a nitrogen atmosphere for one hour after gas evolution ceases. Residual oxalyl chloride is removed in vacuo.

2E 4-Methoxyphenyl (4-(4-methyl-3-pentenyl)-3-cyclohexenyl)methyl ketone

A solution of acid chloride 2C (R=4-Methyl-3-pentenyl) (10 g) in anhydrous dichloromethane (100 mL) is added dropwise to a mixture of ferric chloride (7.8 g) and anisole 2D (4.5 g) in dichloromethane (175 mL), cooled in an ice/ethanol bath. The resulting mixture is gradually warmed to room temperature and stirred overnight. The mixture is poured into 25% HCl (150 mL) and stirred for 30 minutes. The aqueous layer is extracted with dichloromethane, and the combined organic layers are sequentially washed with water, sodium bicarbonate, and water, then dried over magnesium sulfate. The solution is concentrated in vacuo.

2F 2-(4-(4-Methyl-3-pentenyl)-3-cyclohexenyl) ethyl-4-methoxybenzene

To a solution of ketone 2E (R=4-Methyl-3-pentenyl) (10 g) in diethylene glycol (30 mL) is added potassium hydroxide (4.3 g) and hydrazine hydrate (4.5 mL). The solution is sequentially heated to 100° C., 125° C., and 150° C., all for 30 minutes each, then cooled to room temperature. The reaction mixture is extracted between ethyl ether and water, and the combined organic layers are washed with brine and dried over magnesium sulfate. The solution is concentrated in vacuo, and the product is purified by silica gel filtration using 20:1 hexanes:ethyl acetate as an eluent.

2G 4-[2-(4-(4-Methyl-3-pentenyl)-3-cyclohexenyl)ethyl]phenol

To a solution of anisole 2F (R=4-Methyl-3-pentenyl) (6 g) in dichloromethane (100 mL) and cooled in an ice bath is added a 1M solution of boron tribromide (3.4 mL). The solution is stirred for one hour, then poured into water. The reaction mixture is extracted with dichloromethane and dried over magnesium sulfate. The solution is concentrated in vacuo. The product is recrystallized from hexane.

This example illustrates the synthesis of phenyl alkylcyclohexenyl ethers.

2H 4-[2-(4-(4-Methyl-3-pentenyl)-3-cyclohexenyl)ethyl]-1-(4-pentyl-3-cyclohexenyl)methoxybenzene To a round-bottom flask equipped with a stirbar is added phenol 2G (R=4-Methyl-3-pentenyl) (5 g), tosylate 1H (R=n-pentyl) (5.95 g), cesium carbonate (7.45 g), and anhydrous dimethylforrnamide (50 mL). The reaction mixture is stirred overnight. It is then poured into 50 mL dilute HCl, and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

This example illustrates the synthesis of phenyl alkylcyclohexenylcarboxylates.

2J 4-[2-(4-(4-Methyl-3-pentenyl)-3-cyclohexenyl)ethyl]phenyl (4-pentyl-3-cyclohexenyl)carboxylate To a round-bottom flask equipped with a stirbar is added phenol 2G (R=4-Methyl-3-pentenyl) (5 g), acid 1F (R=n-pentyl) (3.5 g), dicyclohexylcarbodiimide (5.44 g), dimethylaminopyridine (215 mg), and anhydrous tetrahydrofuran (50 mL). The reaction is stirred overnight, at which time the solution is poured into water and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

The starting material for Scheme 2 is exemplified by a cyclohexenyl tosylate compound (1H), whichs ultimately yields an alkylcylohexenyl-ethylphenyl compound (2H or 2J); however, a cyclohexyl compound, e.g. a cyclohexyl tosylate, can be used as the starting material instead of 1H, to prepare alkylcyclohexyl-ethylphenyl compounds. In the latter case, compound 2G contains a cyclohexyl ring (and is an alkylcyclohexylethylphenol), rather than a cyclohexenyl ring (as does the alkylcyclohexenylethylphenol shown in Scheme 2). Correspondingly, when the starting material is a cyclohexyl compound, then 2H and 2J contain a cyclohexyl ring rather than a cyclohexenyl ring attached to R. In Scheme 2, R=$R_1$ or $R_2$ as defined above and is introduced to the final compound, e.g. 2H or 2J, via the starting material. R'=the other of $R_1$ or $R_2$ as defined above and is introduced to the final compound, e.g. 2H or 2J, via a material, e.g. prepared in Scheme 1, which is reacted with 2G. The anisole 2D can optionally be derivatized in various ways, e.g. containing from one to four halogens (preferable fluorines), one or more methyl groups, one or more trifluoromethyl groups, or the like.

The methods and materials of Scheme 2 can be modified by routine choice by those of ordinary skill in the art. Examples 2A–2J provide non-limiting, exemplary reaction conditions and details of the various steps and compounds formed thereby in Scheme 2.

Scheme 3, which uses materials prepared in Scheme 1 in addition to other materials which can be selected by routine choice by those of ordinary skill in the art, provides a provides a synthetic route to compounds of Formulas IIIA, IIIB, IVA and IVB, XB, and XE e.g. various alkylcyclohexenyl- and alkylcyclohexyl-butenylphenols, as well as alkylcylohexenyl- and alkylcyclohexyl-butylphenols, and alkylcyclohexenyl- and alkylcyclohexyl-carboxylates. Alcohol 3E can be either a cyclohexene or a cyclohexane derivative, leading to compounds such as 3G, incorporating either cyclohexene or cyclohexane rings. The hydrogenation leading to 3H will reduce all non-aromatic double bonds in the compound. This scheme further addresses the coupling of phenols 3G or 3H with the various compounds whose synthesis was shown in scheme 1.

Scheme 3

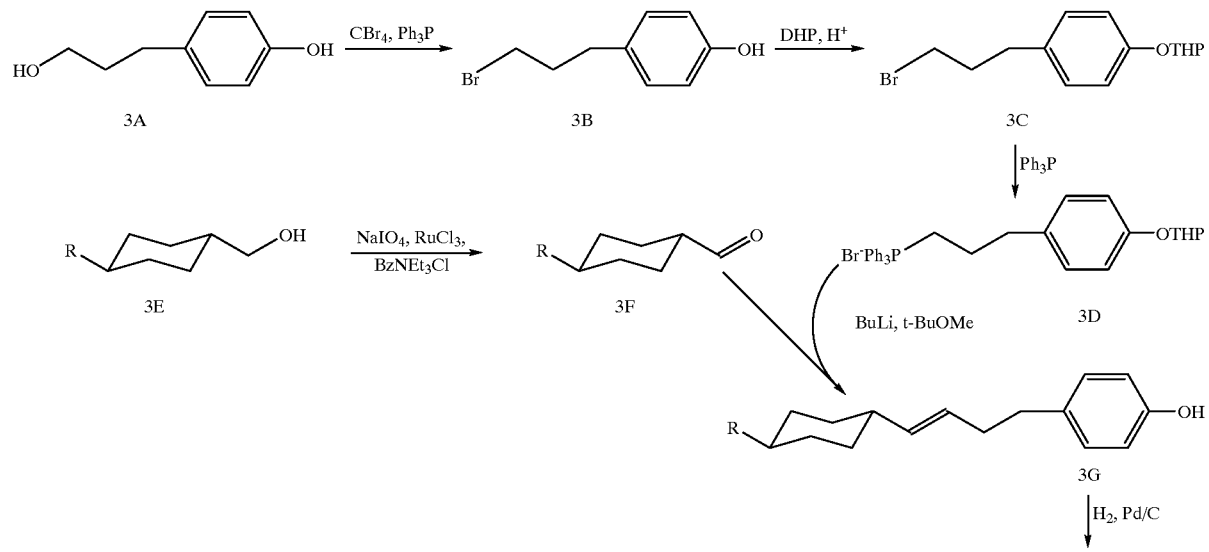

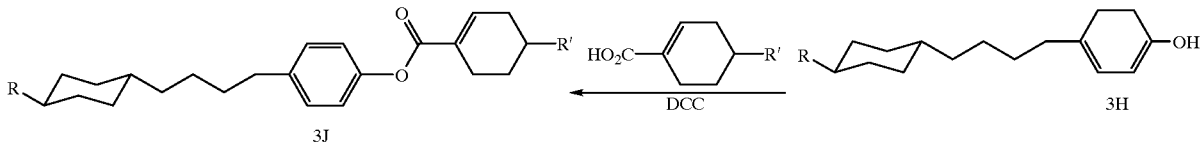

This example illustrates the synthesis of alkylcyclohexenyl and alkylcyclohexyl butenyl phenols.

3B 1-(4'-hydroxyphenyl)-3-bromopropane

To a solution of 3-(4-hydroxyphenyl)-1-propanol 3A (4.0 g) and tripohenylphosphine (7.96 g) in anhydrous dichloromethane (77 mL), cooled to 0° C., is added, dropwise, a solution of tetrabromomethane (9.59 g) in anhydrous dichloromethane (15.4 mL). The reaction mixture gradually warmed to room temperature and allowed to stir overnight. The solution is then poured into water and extracted with ethyl acetate. The combined organic layers are washed with brine and dried over magnesium sulfate. The solution is concentrated in vacuo.

3C 1-(4'-(2-tetrahydropyranyloxy)phenyl)-3-bromopropane

To a solution of 1-(4'-hydroxyphenyl)-3-bromopropane 3B (3.56 g) in dichloromethane (11 mL) is added dihydropyran (2.3 mL). The reaction mixture is cooled to 0° C., and three drops of phosphorus oxychloride are added. The reaction mixture is stirred in the ice bath for a further two hours, then gradually allowed to warm to room temperature, where it is allowed to stir overnight. To the reaction mixture is then added potassium carbonate (3 g), and the reaction mixture is stirred an additional hour. The solid is then filtered out, and the solvents and residual DHP is removed in vacuo.

3D [3-(4-[2-Tetrahydropyranyloxy]phenyl)propyl]triphenylphosphonium bromide

To a solution of 1-(4'-(2-tetrahydropyranyloxy)phenyl)-3-bromopropane 3C (4.2 g) in anhydrous dimethylformamide (11.3 mL) is added triphenylphosphine (6.12 g). The reaction mixture is stirred under nitrogen at 100° C. overnight. The reaction mixture is then cooled to room temperature. The white precipitate is filtered and washed with ethyl acetate, then dried under vacuum.

3F 4-Pentylcyclohexanal

To a stirred solution of alcohol 3E (R=pentyl; made by the same method as 1G) (1.12 g), benzyltriethylammonium chloride (68 mg), NaIO$_4$ (1.92 g), and K$_2$CO$_3$ in chloroforn:water (1:1, 12 mL) is added RuCl$_3$*H$_2$O (38 mg). The reaction temperature is gradually raised to reflux. After two hours, 2-propanol (1.8 mL) is added. The reaction mixture is stirred for one hour, then filtered through Celite. The organic layer is separated and the aqueous layer is washed with dichloromethane. The combined organic layers are washed with saturated sodium sulfite, water, and brine, then dried over sodium sulfate. The solvent is removed in vacuo to give a colorless oil.

3G 4-[(4-(trans-4-Pentylcyclohexyl)-3-butenyl]phenol

To a solution of [3-(4-[2-Tetrahydropyranyloxy]phenyl)propyl]triphenylphosphonium bromide 3D (R=pentyl) (1.68 g) in tert-butyl methyl ether at room temperature is added, dropwise, a 2.6 M solution of butyllithium (1.25 mL). The orange reaction mixture is stirred for 30 minutes, then a solution of cyclohexanal 3F (R=pentyl) (0.558 g) in tert-butyl methyl ether (3 mL) is added dropwise. The reaction is stirred a further 30 minutes, then poured into water and extracted with ether. The combined organic layers are washed with brine, then dried over sodium sulfate. The solvent is removed in vacuo and the residual material is flash chromatographed using 10% ethyl acetate in hexanes as the eluent.

3H 4-[(4-(trans-4-Pentylcyclohexyl)butyl]phenol

To a solution of alkene 3H (10.4 g) in a 1:1 mixture of ethanol and ethyl acetate (100 mL of each) is added palladium on carbon (1 g). The reaction mixture is placed under a hydrogen atmosphere and stirred until no more starting material is apparent by TLC. The catalyst is then filtered out, and the solvents removed in vacuo.

This example illustrates the synthesis of phenyl alkylcyclohexenylcarboxylates.

3J 4-(4-pentylcyclohexyl)butylphenyl (4-pentyl-1-cyclohexenyl)carboxylate

To a round-bottom flask equipped with a stirbar is added phenol 3H (R=pentyl) (5 g), (4-(4-Methyl-3-pentenyl)-1-cyclohexenyl)carboxylic acid (R=n-pentyl) (3.3 g), dicyclohexylcarbodiimide (5.11 g), dimethylaminopyridine (202 mg), and anhydrous tetrahydrofuran (50 mL). The reaction is stirred overnight, at which time the solution is poured into water and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

In Scheme 3, R=R$_1$ or R$_2$ as defined above and is introduced to the final compound, e.g. 3J, via the starting material. R'=the other of R$_1$ or R$_2$ as defined above and is introduced to the final compound via a material, e.g. prepared in Scheme 1, which is reacted with 3H or 3G. Compound 3G or 3H is coupled to a material which can be prepared as shown in Scheme 1 and which introduces R' to the final compound. The alkylcyclohexenylcarboxylic acid material coupled to 3H in the last step of Scheme 3 can be replaced with other materials, e.g. alkylcyclohexylcarboxylic acids, alkylcyclohexenyl methanol tosylates, or alkylcyclohexyl methanol tosylates provided in Scheme 1. In Scheme 3, hydrogenation of 3G to 3H can be preformed prior to (as shown) coupling with a material containing tail R', such as an alkylcyclohexenylcarboxylic acid, in the last step. Alternatively, coupling of 3G with a material such as an alkylcyclohexenylcarboxylic acid can be performed prior to, or instead of, hydrogenation of the double bond of the linker. Further, the alkylcyclohexanol starting material (3E) can be replaced by an alkylcyclohexenol starting material, so that the final product contains a cyclohexenyl ring, rather than a cyclohexyl ring, bonded to R.

Scheme 4 provides one synthetic route for preparing alkylcyclohexenols, alkylcyclohexenthiols, and alkylcyclohexenethynylphenols, compounds which can be used, e.g., in Schemes 5 and 6, as reagents for the preparation of the compounds of this invention, e.g., the compounds of Formulas IIIA, IIIB, IVA and IVB. One compound that can be prepared is 4-alkyl-3-cyclohexanol. This compound and its derivatives can be reduced (not shown) to give the cyclohexane. The compound or its reduced form can be transformed into the thiol 4E, it can also be transformed into a cyclohexylalkynyl phenol by going through intermediate 4G.

hydrate (6.3 g). The solution is heated to 80° C. and stirred at that temperature for 8 hours. The cooled reaction mixture is poured into pH 7 buffer and extracted with 1:1 hexanes-:ethyl acetate. The combined organic layers are washed with brine and dried over potassium carbonate, and the solution is concentrated in vacuo.

This example illustrates the synthesis of alkylcyclohexenylethynylphenols

4F 4-Methyl-3-cyclohexenylacetylene

To a solution of lithium acetylide ethylenediamine complex (4.53 g) in dry tetrahydrofuran (38 mL), stirred and Scheme 4

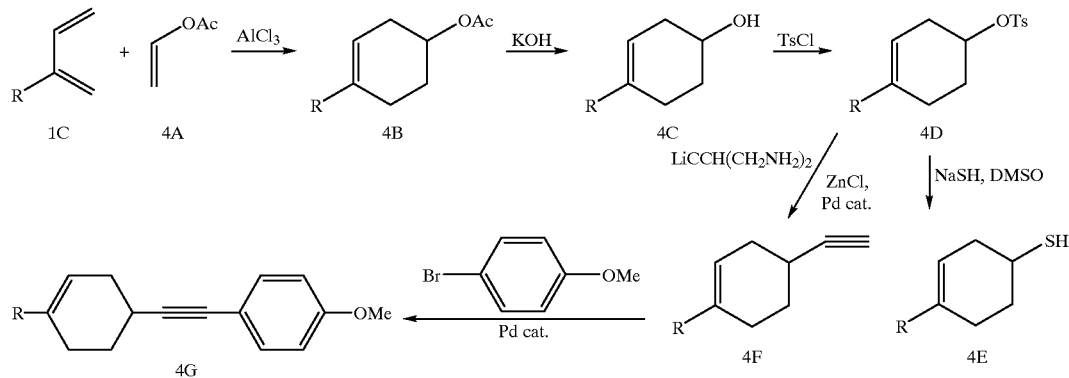

4B 4-Methyl-3-cyclohexenol acetate

To a solution of vinyl acetate 4A (20 mL) in anhydrous toluene (220 mL) is added aluminum chloride (2.89 g). The flask is cooled to 0° C., and the isoprene 1C (R=methyl) (21.7 mL) is added dropwise. The reaction mixture is stirred 5 hours at 0° C., then allowed to stand at 4° C. for a further 16 hours. The reaction mixtire is then sequentially extracted with two portions (150 mL each) of 1% hydrochloric acid solution, water (75 mL), and brine (75 mL). It is dried over sodium sulfate, filtered through Celite, and concentrated in vacuo. The product is distilled to give 30 g of clear, colorless liquid.

4C 4-Methyl-3-cyclohexenol

To a solution of potassium hydroxide (37 g) in water (100 mL) and ethanol (100 mL) is added ester 4B (R=methyl) (30 g). The mixture is stirred under reflux for 16 hours. The reaction mixture is then neutralized with a mixture of concentrated hydrochloric acid (56 mL), water (60 mL), and ice (60 g, and is extracted with dichloromethane. The combined organic extracts are dried over sodium sulfate, and the solution is concentrated in vacuo.

4D 4-Methyl-3-cyclohexenol tosylate

To a solution of alcohol 4C (R=methyl) (10 g) and p-toluenesulfonyl chloride (20.8 g) in anhydrous tetrahydrofaran (21 mL) at 0° C. is added anhydrous pyridine (21 mL). The reaction is allowed to stir in an ice bath for 2 hours, and is then allowed to stand at −20° C. for a further 16 hours. The reaction mixture is then poured into 2M HCl (75 mL) and extracted with ethyl acetate. The combined organic layers are extracted with brine and dried over sodium sulfate. The solvent is removed in vacuo.

4E 4-Methyl-3-cyclohexenthiol

To a solution of tosylate 4D (R=methyl) (20 g) in anhydrous dimethylsulfoxide is added sodium hydrosulfide cooled to 0° C., is slowly added a 0.5M solution of zinc chloride in dry tetrahydrofuran (100 mL). The mixture is stirred at 10° C. for 30 minutes, then cooled to 0° C. again. A solution of tosylate 4D (R=methyl) (5 g) in dry tetrahydrofuran (11 mL) is then added dropwise, followed by addition of palladium tetrakis(triphenylphosphine) (650 mg). The reaction mixture is stirred overnight at room temperature. The mixture is poured into 10% HCl and extracted into ether. The combined organic layers are sequentially washed with a dilute sodium carbonate solution and brine, then dried over magnesium sulfate. The solvent is removed in vacuo.

4G 4-(4-Methyl-3-cyclohexenylethynyl)anisole

To a round-bottom flask equipped with a stirbar is added acetylene 4F (R=methyl) (2 g), 4-bromoanisole (3.40 g), palladium catalyst (made by mixing together 29.11 g triphenylphosphine, 3.28 g PdCl$_2$, and 200 mL dipropylamine; refluxing the slurry for 3 hours to get a yellow slurry; cooling to room temperature; adding 3.69 g copper (II) acetate monohydrate; refluxing 1 hour; cooling and storing in the freezer) (330 mg), and diisopropylamine (80 mL). A stream of dry nitrogen is bubbled through this solution for 15 minutes to degas it, and the solution is then refluxed under a nitrogen atmosphere for 5 hours. The cooled solution is poured onto silica gel and eluted with 1:1 hexanes:ethyl acetate to give the product. The methyl group may be removed using the conditions used for deprotection of methyl ether 2F.

In Scheme 4, R=R$_1$ or R$_2$ as defined above. The products of Scheme 4 can be coupled with the products of Scheme 5, for example, as illustrated in Scheme 6. The 4-alkyl-3-cyclohexenol (4C) can be reduced (not shown) to give the cyclohexanol. Further, 4C or its reduced (cyclohexyl) counterpart can be transformed into the thiol 4E, or it can be transformed into a cyclohexylalkynylphenol via intermediate 4G.

Scheme 5 provides one synthetic route for preparing alkylcyclohexylethylphenyl thiols and alkylcyclohexylethylphenyl methanol compounds, compounds which can be used, e.g. coupled with the product compounds of Schemes 4, for the preparation of the compounds of this invention, e.g. the compounds of Formulas IIIA, IIIB, IVA and IVB, as exemplified in Scheme 6. In this scheme, the R group contains either an alkylcyclohexyl or an alkylcyclohexenyl group, linked to the phenol by either a two- or four-carbon link. The phenol can be transformed into a thiophenol or into a benzoic acid. The benzoic acid may be reduced to a benzyl alcohol and a benzyl bromide to provide access to ether derivatives.

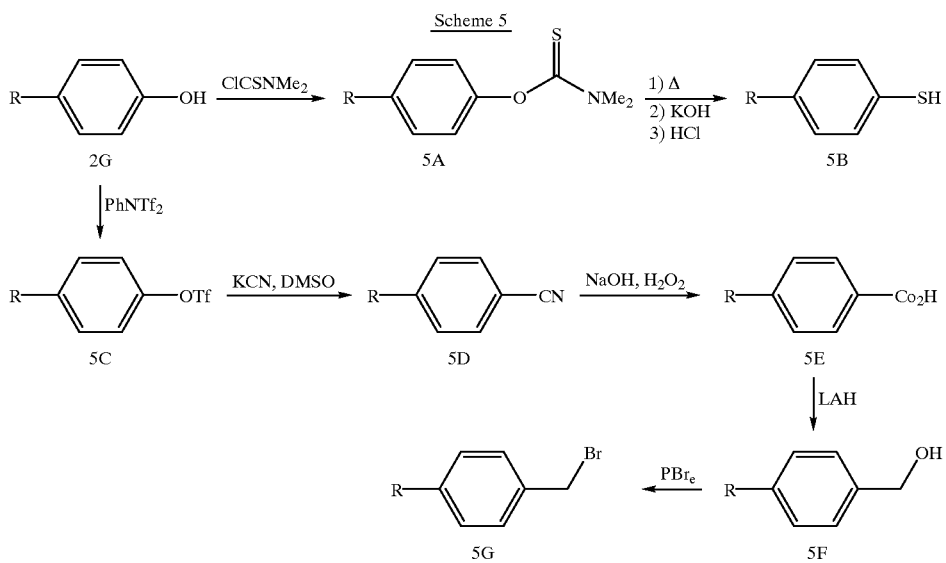

5A 4-[2-(4-Methyl)-3-cyclohexenyl)ethyl]phenol thiodimethylcarbamide

To a round-bottom flask equipped with a stirbar is added phenol 2G (R=4-Methyl)-3-cyclohexenyl)ethyl) (15 g), KOH (3.89 g), and water (70 mL). The solution is cooled to 5° C. in an ice bath, and a solution of N,N-dimethylthiocarbamoyl chloride (11.4 g) in dry THF (19 mL) is added dropwise. The temperature of the reaction flask is kept below 12° C. After the addition is complete, the cooling bath is removed and the reaction mixture is stirred for an additional 20 minutes. The reaction mixture is then made basic with 10% KOH and extracted with toluene. The combined organic layers are washed with brine and dried over magnesium sulfate, and the solvent is removed in vacuo. The solid product is recrystallized from methanol.

5B 4-[2-(4-Methyl)-3-cyclohexenyl)ethyl]phenyl mercaptan

To a 50 mL flask equipped with a stirbar and a nitrogen tube is added thiodimethylcarbamide 5A (R=4-methyl)-3-cyclohexenyl)ethyl) (15 g). The flask is placed into a sand bath and heated, with stirring, to 270° C. for 45 minutes, while being swept with a stream of nitrogen. After cooling, a solution of KOH (4.32 g) in water (5.15 mL) and ethylene glycol (39 mL) is added to the reaction mixture. The flask is equipped with a condenser, and the reaction mixture is refluxed for one hour. The cooled reaction mixture is poured over ice and extracted with dichloromethane. The organic layer is discarded and the aqueous layer is acidified with HCl. The acidified aqueous layer is then extracted with dichloromethane, and the combined organic layers are dried over sodium sulfate. The solvent is removed in vacuo.

This example illustrates the synthesis of alkylcyclohexylethylphenyl methanol compounds.

5C 4-[2-(4-Methyl)-3-cyclohexenyl)ethyl]phenol triflate

To a round-bottom flask equipped with a stirbar is added phenol 2G (R=4-Methyl)-3-cyclohexenyl)ethyl) (15 g), N-phenyltrifluoromethanesulfonimide (24.77 g), and dry dichloromethane (200 mL). The reaction mixture is cooled to −78° C., and dry triethylamine (14.5 mL) is added. The reaction mixture is gradually allowed to warm to room temperature, and is then poured into a separatory funnel and extracted twice with a solution of sodium a carbonate and once with water. The organic layer is then dried over potassium carbonate and the solvent is removed in vacuo.

5D 4-[2-(4-Methyl)-3-cyclohexenyl)ethyl]benzonitrile

To a round-bottom flask equipped with a stirbar is added triflate 5C (R=4-Methyl)-3-cyclohexenyl)ethyl) (23 g), copper (I) cyanide (13 g), and dry dimethylformamide. A reflux condenser is attached, and the reaction mixture is refluxed overnight. The cooled reaction mixture is then poured into water, extracted with hexane, and passed through silica gel, eluting with 10% ethyl acetate in hexanes. The solvent is removed in vacuo.

5E 4-[2-(4-Methyl)-3-cyclohexenyl)ethyl]benzoic acid

To a round-bottom flask equipped with a stirbar is added nitrile 5D (R=4-Methyl)-3-cyclohexenyl)ethyl) (12 g), NaOH (10.65 g), water (160 mL), and 30% hydrogen peroxide (53 mL). The flask is equipped with a reflux condenser, and the reaction mixture is stirred at reflux overnight. The cooled reaction mixture is then poured into a mixture of ice and concentrated HCl (22.5 mL), and the suspension is extracted with 1:1 hexanes:ethyl acetate. The combined organic layers are washed with brine and dried over potassium carbonate, and the solution is concentrated in vacuo.

5F 4-[2-(4-Methyl)-3-cyclohexenyl)ethyl]phenyl methanol

4-[2-(4-Methyl)-3-cyclohexenyl)ethyl]phenyl methanol is prepared from benzoic acid 5E using lithium aluminum hydride, using the procedure for the reduction of acid 1F to 1G.

products of Scheme 5 can be coupled with the products of Scheme 4, for example, as illustrated in Scheme 6.

Scheme 6 provides one synthetic route for preparing compounds of Formulas IIIA, IIIB, IVA and IVB, e.g. phenol- and thiophenol- cyclohexenylcarboxylates and cylohexenylethers, by coupling phenol derivatives with alcohols, thiols, tosylates and carboxylic acids.

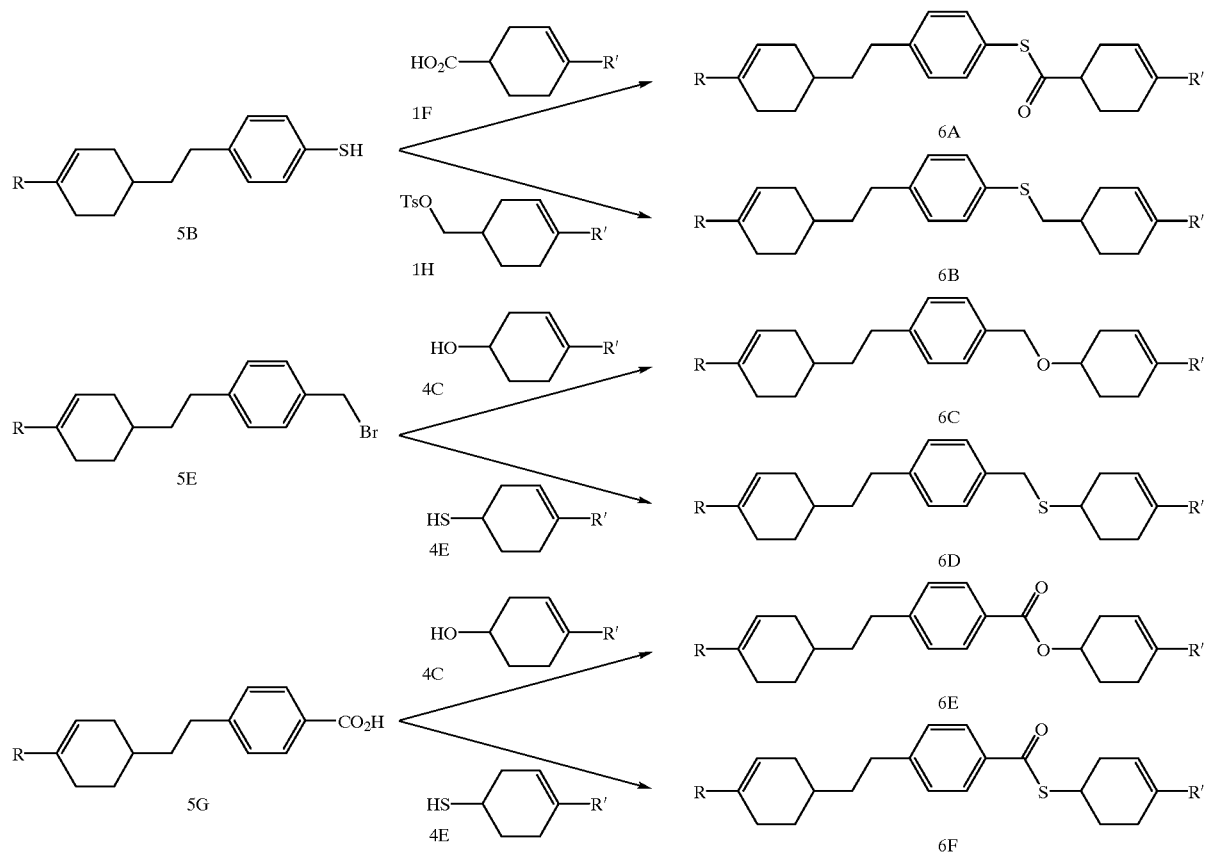

Scheme 6

5G 4-[2-(4-Methyl)-3-cyclohexenyl)ethyl]benzyl bromide

To a stirred solution of benzyl alcohol 5F (R=4-Methyl)-3-cyclohexenyl)ethyl) (10 g) in dry dichloromethane (175 mL), cooled to 0° C. in an ice bath, is added dropwise a solution of phosphorus tribromide (1.65 mL) in dry dichloromethane (22 mL). The solution is stirred 2 hours, then 10 mL of water was added and the reaction mixture was stirred an additional hour. The layers were separated, and the organic layer was dried over sodium sulfate. The solvent was removed in vacuo.

In Scheme 5, R=$R_1$ or $R_2$ as defined above. Phenol 2G can be transformed into a thiophenol (5B) or into a benzoic acid (5E). The benzoic acid can be reduced to a benzyl alcohol (5F) and then converted to a benzyl bromide (5G). The 6A 4-[2-(4-Methyl)-3-cyclohexenyl)ethyl]thiophenol 4-(4-methyl-3-pentenyl)-3-cyclohexenylcarboxylate To a flask containing a stirbar and carboxylic acid 1F (R'=4-methyl-3-pentenyl) (1 g) is added oxalyl chloride (1.26 mL). The reaction mixture is stirred for 30 minutes past the last observation of gas evolution, and then excess oxalyl chloride is removed in vacuo. To this oil is added thiophenol 5B (R=methyl) (1.12 g) and dry tetrahydrofaran (14 mL). The reaction mixture is stirred until homogenous, then dry triethylamine (3.35 mL) is added. The reaction mixture is stirred overnight. It is then poured into water and extracted with ethyl acetate. The combined organic layers are washed with brine and dried over sodium sulfate, and the solvent and residual triethylamine is removed in vacuo. The product is filtered through silica gel, eluting with 15% ethyl acetate in hexanes.

6B 4-[2-(4-(4-Methyl-3-pentenyl)-3-cyclohexenyl) ethyl]-1-(4-pentyl-3-cyclohexenyl) thiomethoxybenzene To a round-bottom flask equipped with a stirbar is added thiophenol 5B (R=4-Methyl-3-pentenyl) (1 g), tosylate 1H (R'=n-pentyl) (1.13 g), cesium carbonate (1.41 g, and anhydrous dimethylformamide (10 mL). The reaction mixture is stirred overnight. It is then poured into 50 mL dilute HCl, and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

6C 4-[2-(4-Methyl-3-cyclohexenyl)ethyl]benzyloxy-4-pentyl-3-cyclohexene

To a round-bottom flask equipped with a stirbar is added cyclohexenol 4C (R=pentyl) (1 g), benzyl bromide 5G (R=methyl) (1.74 g), and dry dimethylformamide (18 mL). To this stirred solution is added a 50% oil suspension of NaH (371 mg). The reaction mixture is stirred overnight at room temperature. It is then poured into a 10% HCl solution and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

6D 4-[2-(4-Methyl-3-cyclohexenyl)ethyl]benzylthioxy-4-pentyl-3-cyclohexene

To a round-bottom flask equipped with a stirbar is added cyclohexenthiol 4E (R=pentyl) (1 g), benzyl bromide 5G (R=methyl) (1.59 g), and dry dimethylformamide (16 mL). To this stirred solution is added a 50% oil suspension of NaH (339 mg). The reaction mixture is stirred overnight at room temperature. It is then poured into a 10% HCl solution and extracted with 1:1 hexanes:ethyl acetate. The combined organic layers are washed with brine and dried over potassium carbonate, and the solution is concentrated in vacuo. Filtration through silica gel using 10% ethyl acetate in hexanes gives the pure product.

6E 4-pentyl-3-cyclohexenyl 4-[2-(4-methyl-3-cyclohexenyl)ethyl]benzoate

To a flask containing a stirbar and carboxylic acid 5E (R'=methyl) (1 g) is added oxalyl chloride (1.07 mL). The reaction mixture is stirred for 30 minutes past the last observation of gas evolution, and then excess oxalyl chloride is removed in vacuo. To this oil is added cyclohexenol 4C (R=pentyl) (689 mg) and dry tetrahydrofuran (12 mL). The reaction mixture is stirred until homogenous, then dry triethylamine (2.85 mL) is added. The reaction mixture is stirred overnight. It is then poured into water and extracted with ethyl acetate. The combined organic layers are washed with brine and dried over sodium sulfate, and the solvent and residual triethylamine is removed in vacuo. The product is filtered through silica gel, eluting with 15% ethyl acetate in hexanes.

6F 4-pentyl-3-cyclohexenyl 4-[2-(4-methyl-3-cyclohexenyl)ethyl]thiobenzoate

To a flask containing a stirbar and carboxylic acid 5E (R'=methyl) (1 g) is added oxalyl chloride (1.07 mL). The reaction mixture is stirred for 30 minutes past the last observation of gas evolution, and then excess oxalyl chloride is removed in vacuo. To this oil is added cyclohexenthiol 4E (R=pentyl) (755 mg) and dry tetrahydrofuran (12 mL). The reaction mixture is stirred until homogenous, then dry triethylamine (2.85 mL) is added. The reaction mixture is stirred overnight. It is then poured into water and extracted with ethyl acetate. The combined organic layers are washed with brine and dried over sodium sulfate, and the solvent and residual triethylamine is removed in vacuo. The product is filtered through silica gel, eluting with 15% ethyl acetate in hexanes.

In Scheme 6, R=$R_1$ or $R_2$ as defined above and is introduced to the final compound, via the starting material. R'=the other of $R_1$ or $R_2$ as defined above and is introduced to the final compound via coupling to a material, e.g. prepared in Schemes 1 or 4. The cyclohexenyl ring of the starting material, e.g. 5B, 5G, or 5E, and/or of the material to which it is coupled, e.g. 1F, 1H, 4C, or 4E, can be replaced with a cyclohexyl ring. Hence, any of the cyclohexenyl rings of the products of Scheme 6, e.g. 6A–6F, can be replaced with a cyclohexyl ring.

Scheme 7 provides one synthetic route for preparing alkylphenylpyridinols, compounds which can be used, e.g. coupled with the product compounds of Schemes 1, for the preparation of the compounds of this invention, e.g. the compounds of Formulas VA, VB, VIA, VIB, XC, XA and VIB.

Scheme 7

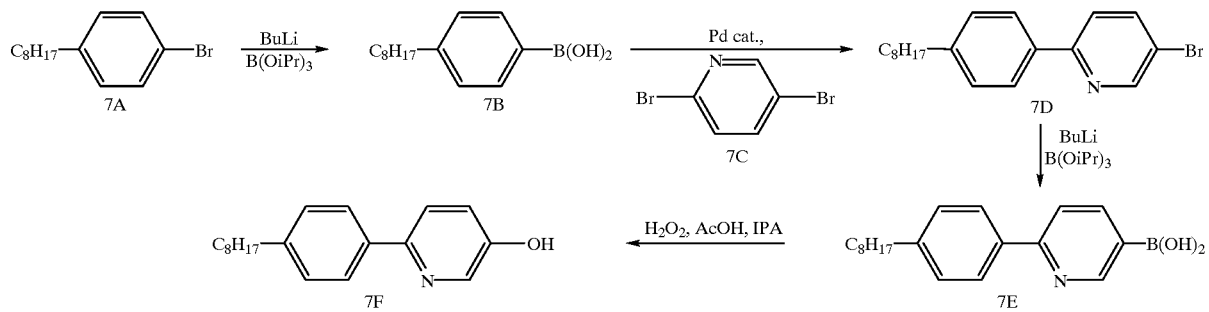

7B 4-Octylphenylboronic acid

To a 1000 mL oven-dried round bottom flask equipped with a stirbar was added bromophenyloctane 7A (40.383 g) and anhydrous tetrahydrofaran (300 mL). This solution was cooled to −78° C. in a dry ice/isopropanol bath. To this solution was added 2.5 M butyllithium (67.2 mL). The reaction was stirred one hour, and then triisopropyl borate (69.3 mL) was added. The reaction was allowed to warm to room temperature, while stirring, overnight. Water (100 mL) was added, and the reaction was allowed to stir for two hours. The reaction mixture was then acidified to pH 5 and extracted with ethyl acetate. The combined organic layers were washed with brine, dried over magnesium sulfate, and rotovapped to give a solid. The product was silica gel filtered, eluting sequentially with hexane, then with 5% ethyl acetate in hexanes, then with ethyl acetate. The product came off with the ethyl acetate eluent. The pure material weighed 23.712 g.

7D 5-Bromo-2-(4-octylphenyl)pyridine

To a 1000 mL round bottom flask equipped with a stirbar was added dibromopyridine 7C (22.506 g), boronic acid 7B (22.356 g), tetrakis(triphenylphosphine)palladium(0) (3.294 g), saturated sodium carbonate solution (238 mL), and toluene (190 mL). A reflux condenser was attached and the reaction was heated at 100° C. for 24 hours. The cooled reaction mixture was extracted with 1:1 hexane:ethyl acetate, and the combined organic layers were washed with brine and dried over magnesium sulfate and the solvent was removed in vacuo. The solid product was dissolved in dichloromethane, placed on silica gel, and silica gel filtered. The elution solvents were hexane, which removed a higher Rf side product, and 2.5% E/H, resulting in 31.251 g of solid. The product was recrystallized from acetonitrile to give 30.125 g of a white solid.

7E 2-(4-Octylphenyl)pyridyl-5-boronic acid

To a 250 mL oven-dried round bottom flask containing a stirbar was added bromide 7D (6.92 g) and anhydrous tetrahydrofuran (80 mL). The reaction mixture was cooled to −78° C. in a dry ice/isopropanol bath. To this solution was added 2.5 M butyllithium (8.95 mL). The reaction was stirred one hour, and then triisopropyl borate (9.23 mL) was added. The reaction was allowed to warm to room temperature, while stirring, overnight. Water (15 mL) was added, and the reaction was allowed to stir for two hours. The reaction mixture was then acidified to pH 5 and extracted with ethyl acetate. The combined organic layers were washed with brine, dried over magnesium sulfate, and the solvent was removed in vacuo to give 6.018 g (97%) of a solid.

7F 5-Hydroxy-2-(4-octylphenyl)pyridine

To a 100 mL round bottom flask containing a stirbar was added boronic acid 7E (1.331 g), 30% hydrogen peroxide (0.73 mL), glacial acetic acid (8.6 mL), and isopropanol (8.6 mL). The reaction mixture was stirred overnight. The solid was filtered out and washed with water. The combined liquid layers were extracted with ethyl acetate, and the combined organic layers were washed with brine, dried over magnesium sulfate, and the solvent was removed in vacuo. The solid product was recrystallized twice from 10% ethyl acetate in hexanes, to give 1.015 g (84%) of white solid. This pyridinol may be coupled with various cyclohexyl carboxylic acids and tosylates in the usual manner, using procedures such as those used for compounds 2J and 2H.

In Scheme 7 an unbranched alkyl chain, —$C_8H_{17}$—, is shown as an example of a tail, but any tail defined above as $R_1$ or $R_2$ can substitute therefore. Pyridinol 7F can be coupled with various materials, e.g. cyclohexyl carboxylic acids and tosylates, for example 2H or 2J.

Scheme 8 provides one synthetic route for preparing compounds of Formulas VA, VB, VIA and VIB, e.g. phenylpyrimidine compounds. The resulting phenols can be derivatized with cyclohexyl and cyclohexenyl compounds from Scheme 1.

Scheme 8

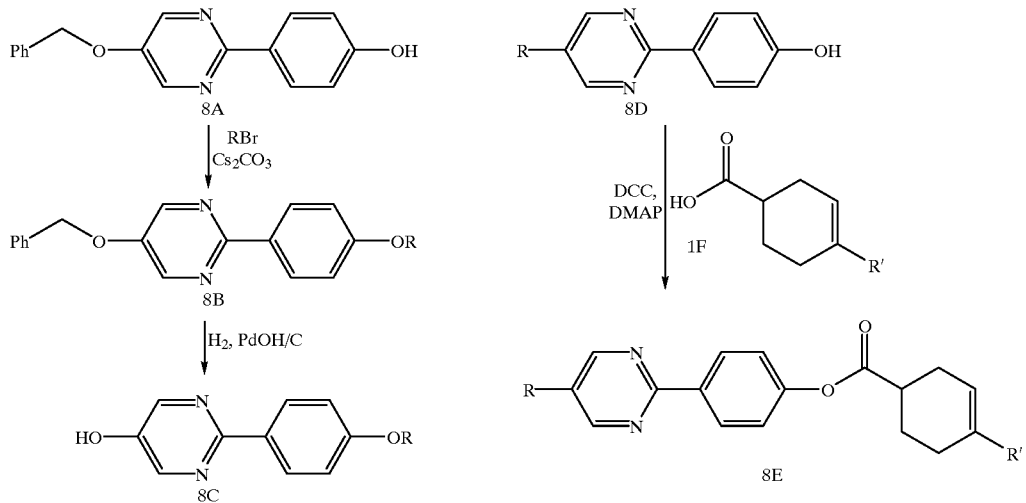

8B 5-benzyloxy-2-(4-decyloxyphenyl)pyrimidine

The reaction between 5-benzyloxy-2-(4-hydroxyphenyl) pyrimidine (prepared essentially according to the procedure of E. P. Janulis et al., U.S. Pat. No. 5,399,291) and bromodecane is essentially that used for synthesis of ether 2H.

8C 5-hydroxy-2-(4-decyloxyphenyl)pyrimidine

The deprotection reaction realizing pyrimidinol 8C (R=decyl) is essentially that used for the hydrogenation of 3G to 3H.

8E 4-(5-decyl-2-pyrimidyl)phenol 4-pentyl-3-cyclohexenylcarboxylate

The reaction between 4-(5-decyl-2-pyrimidyl)phenol (prepared essentially according to the procedure of H. Zaschke and R. Stolle, Z. Chem. 15, 441–43 (1975)) and 4-pentyl-3-cyclohexenylcarboxylic acid is essentially that used for the synthesis of ester 2J.

In Scheme 8, R=$R_1$ or $R_2$ as defined above and is introduced to the final compound, via the bromide in the first step, although this step does not have to be performed first. R'=the other of $R_1$ or $R_2$ as defined above and is introduced to the final compound via coupling of phenol 8C or 8D to a material containing R', e.g. prepared in Schemes 1 or 4. The cyclohexenyl ring of 1F can be replaced with a cyclohexyl ring. Hence, the cyclohexenyl ring of product 8E can be replaced with a cyclohexyl ring.

Scheme 9 provides one synthetic route for preparing compounds of Formulas VA, VB, VIA, VIB, and XA, e.g. monosubstituted biphenols and bisubstituted biphenyls. The phenols and biphenyls can be converted to cyclohexenyl esters (shown), or by analogy, cyclohexyl esters or cyclohexenyl or cyclohexyl ethers.

9F 4-hydroxy-4'-octyloxybiphenyl

To a solution of 4-octyloxy-4'-tetrahydropyranyloxybiphenyl 9E (R=octyl) (5 g) in methanol (39 ml) is added toluenesulfonic acid (25 mg). The reaction mixture is stirred at room temperature overnight, at which time potassium carbonate (1 g) is added. The reaction mixture is stirred an additional hour, and is then filtered. The solvent is removed in vacuo.

9G 4-hydroxy-4'-octyloxybiphenyl 4-(4-methyl-3-pentenyl)-3-cyclohexenylcarboxylate The reaction between 4-hydroxy-4'-octyloxybiphenyl 9F (R=octyl) and carboxylic acid 1F (R'=4-methyl-3-pentenyl) to give the ester is essentially that used for the synthesis of ester 2J.

In Scheme 9, R=$R_1$ or $R_2$ as defined above and is introduced to the final compound, via the bromide in the first

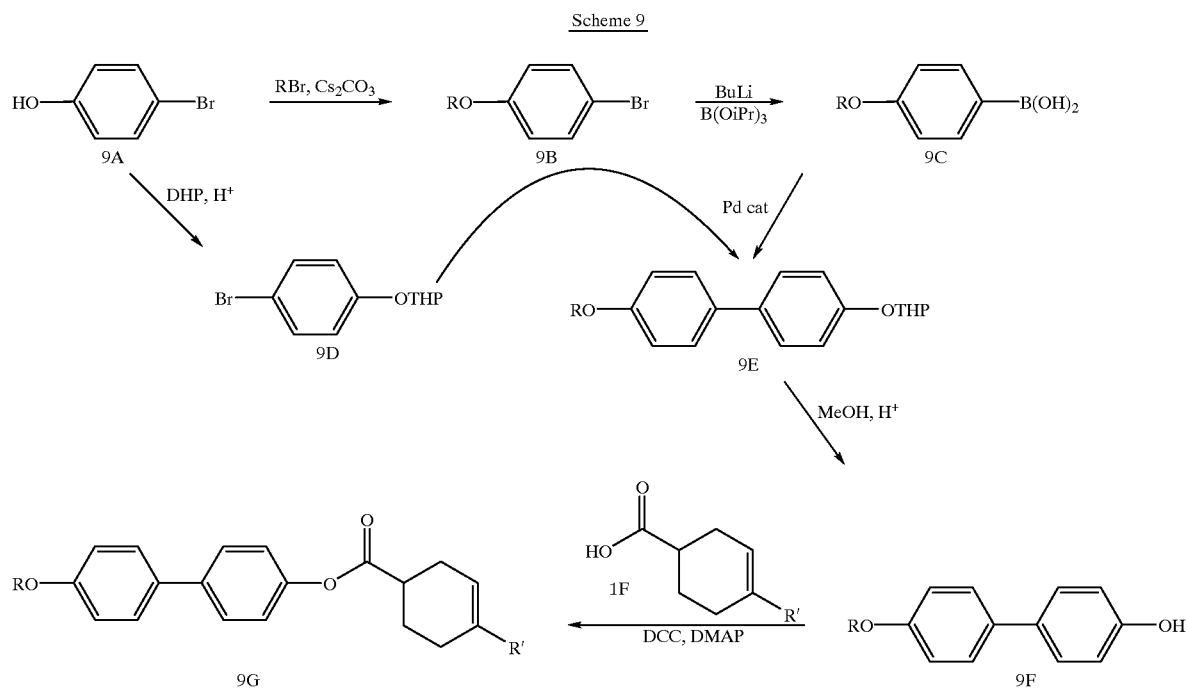

Scheme 9

9B 4-Bromooctyloxybenzene

The reaction between 4-bromophenol 9A and octyl bromide is essential that used for the alkylation of phenol 2G to ether 2H.

9C 4-Octyloxyphenylboronic acid

The reaction of 4-bromooctyloxybenzene 9B (R=octyl) to give the boronic acid 9C (R=octyl) is essentially that used for the conversion of bromide 7A into phenyl boronic acid 7B.

9D 4-Bromophenol tetrahydropyranyl ether

The reaction between to make the tetrahydropyranyl ether of 4-bromophenol is essentially that used for the conversion of phenol 3B to tetrahydropyranyl ether 3C

9E 4-octyloxy-4'-tetrahydropyranyloxybiphenyl

The reaction coupling phenylboronic acid 9C (R=octyl) with phenyl bromide 9D is essentially that used for the coupling of phenylboronic acid 7B with dibromopyridine 7C.

step, although this step does not have to be performed first. R'=the other of $R_1$ or $R_2$ as defined above and is introduced to the final compound via coupling of monosubstituted biphenyl 9F to material containing R', e.g. prepared in Schemes 1 or 4. The cyclohexenyl ring of 1F can be replaced with a cyclohexyl ring. Hence, the cyclohexenyl ring of product 9G can be replaced with a cyclohexyl ring.

The synthesis of a representative partially fluorinated tail is shown in Scheme 10. The commercially available alkenol 10A and aperfluorinated iodoalkane were mixed together and refluxed four hours in the presence of a catalytic amount of AIBN to give iodoalcohol 10B in quantitative yield. The iodo group was removed by reduction with lithium aluminum hydride. The resulting fluoroalcohol 10C was purified by distillation and treated with toluenesulfonyl chloride and pyridine to give the desired tosylate 10D. In these partially perfluorinated tails, the hydrocarbon portion of the tail is from two to ten carbons long, the fluorocarbon portion is from one to eight carbons long, and the total chain length is from six to twelve carbons long.

Scheme 10
Synthesis of a partially perfluorinated tail

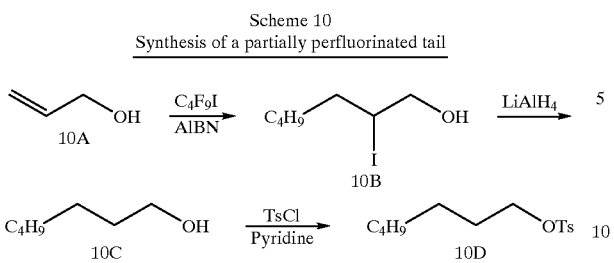

The synthesis of two types of phenylpyrimidines is shown in Scheme 11.

The reaction sequence starts with the hydroxyphenylnitrile, which is treated with anhydrous hydrogen chloride in a benzene/ methanol mixture, it gives a methoxyimine. It is quite important that this methoxyimine not be allowed to come in contact with water vapor, since it could be easily hydrolyzed to the amide. Instead, it is treated with an anhydrous alcoholic ammonia solution to give the benzamidine 11B. This benzamidine can be analyzed by $^{13}C$ NMR to ascertain that it is actually the desired product.

When the benzamidine 11B is heated with bis-dimethylamino ethoxypropylidine in refluxing pyridine, it yields the phenylpyrimidine 11C. A hetero group on the pyrimidine ring can be replaced by an alkoxide via an $S_N2$ mechanism. Thus, sodium hydroxide in diethylene glycol at $200_i$ C transforms the ethyl ether into bisphenol 11D, which is alkylated using octyl bromide under basic conditions to give dialkoxyphenylpyrimidine 11E. The alkylphenylpyrimidine 11F is synthesized from the commercially available alkanals. The alkanal 11H was treated with trimethyl orthoformate followed by phosphorous oxychloride and dimethyl formamide to methacrolein 11G. The reaction of methacrolein 11G with sodium methoxide in methanol gives alkylphenylpyrimidine 11F. The partially perfluorinated phenylpyrimidines were made by treating the phenols with fluorinated tosylates (shown in Scheme 10) in the presence of cesium carbonate.

The partially fluorinated alkyl or alkoxy chiral ethers or esters were made from phenylpyrimidine bisphenol 11D. The epoxide 12A was made under Sharpless conditions and was taken through the steps outlined in Scheme 12, with the epoxide being sequentially converted to tosylate 12B with toluenesulfonyl chloride, opened to fluorohydrin 12C using hydrogen fluoride, then converted into the difluoride 12D using DAST. This reaction sequence's overall yield was 45–50%

Scheme 12
Synthesis of the difluoro tosylate

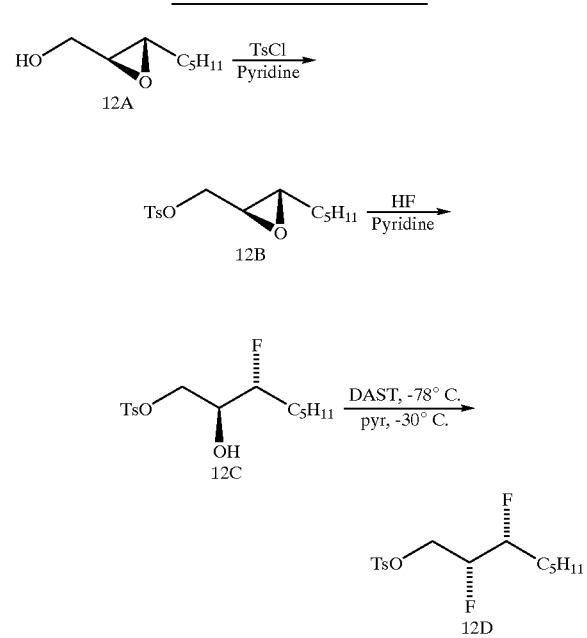

Scheme 11
Synthesis of the dioxyphenylpyrimidine core

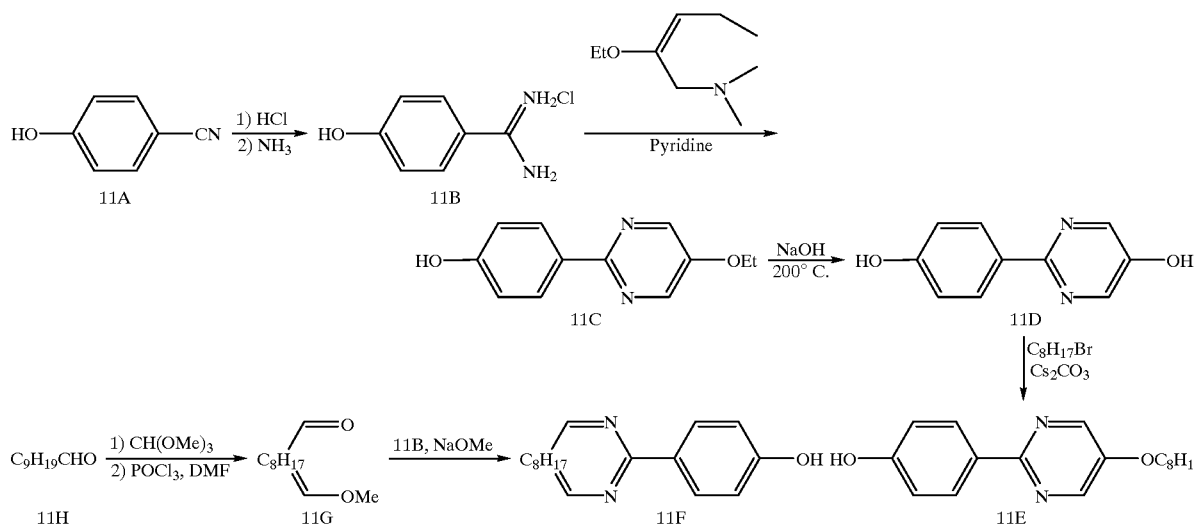

Scheme 13
Synthesis of an aryl 2-methyl-2-fluoropentane

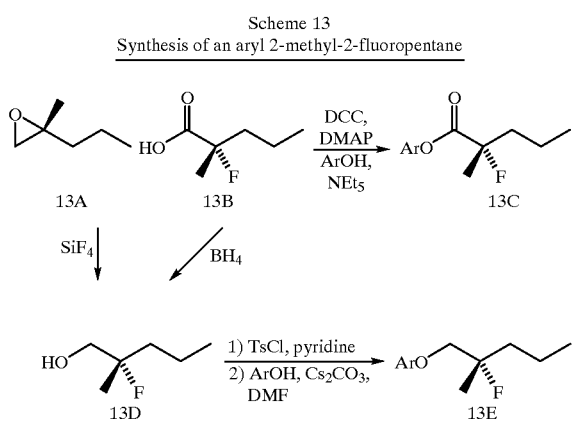

Partially perfluorinated chiral and achiral compounds containing one phenyl ring were prepared from acid 14C and phenol 14F. Their synthesis is outlined in Scheme 14. Methyl hydroxybenzoate 14A was treated with fluorotosylate and cesium carbonate to give ether 14B, which upon hydrolysis with potassium hydroxide gives acid 14C in excellent yield. Similarly, the phenol 14F was made from the commercially available monobenzone 14D by coupling with the tosylate to give ether 14E, which was then deprotected by hydrogenation to give the phenol.

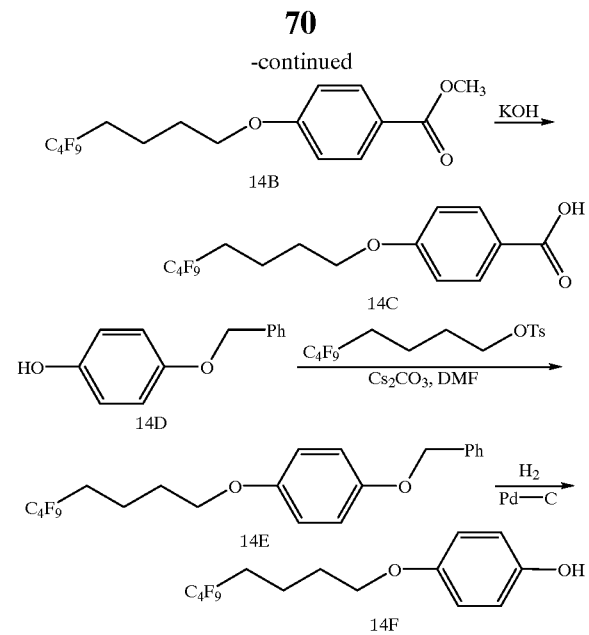

The cyclohexylethylene phenyl benzoates were synthesized from hydroxybenzaldehyde 15A. The hydroxy group of benzaldehyde was protected as a tetrahydropyran, and sodium borohydride was then used to reduce the aldehyde group to the benzyl alcohol 15C. This alcohol was coupled with cyclohexylethylene phenol 15D in the presence of DEAD and TPP to give ether 15E in moderate yield (60–70%). The THP group is removed in acidic methanol. The resultant phenol 15F was attached to different tails. The synthesis is outlined in Scheme 15.

Scheme 15
Synthesis of a cyclohexylethylene phenyl benzoate

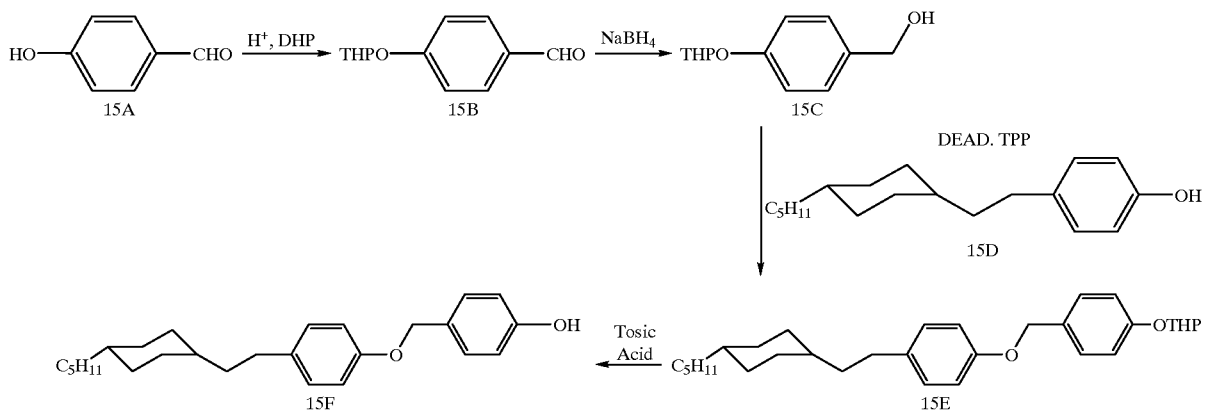

The core-fluorinated difluoroalkoxides were made by the method outlined in Scheme 16. The synthesis started with started with the commercially available difluorophenol 16A, which was alkylated using cesium carbonate and alkyl bromide. The resultant ether was lithiated with butyllithium and TMEDA at −78, then treated with diethyl carbonate to give ester 16B. The ester was hydrolyzed with potassium carbonate, converted to the acid chloride with oxalyl chloride, then reduced with lithium aluminum hydride to give alcohol 16C. The alcohol was coupled with phenol 16D under Mitsunobu conditions to give ether 16D.

Scheme 14
Synthesis of partially perfluorinated one ring phenols

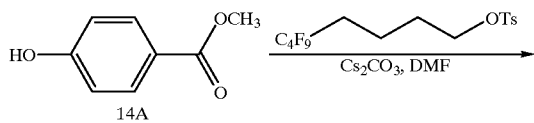

Scheme 16
Synthesis of a core-fluorinated difluoroalkoxide

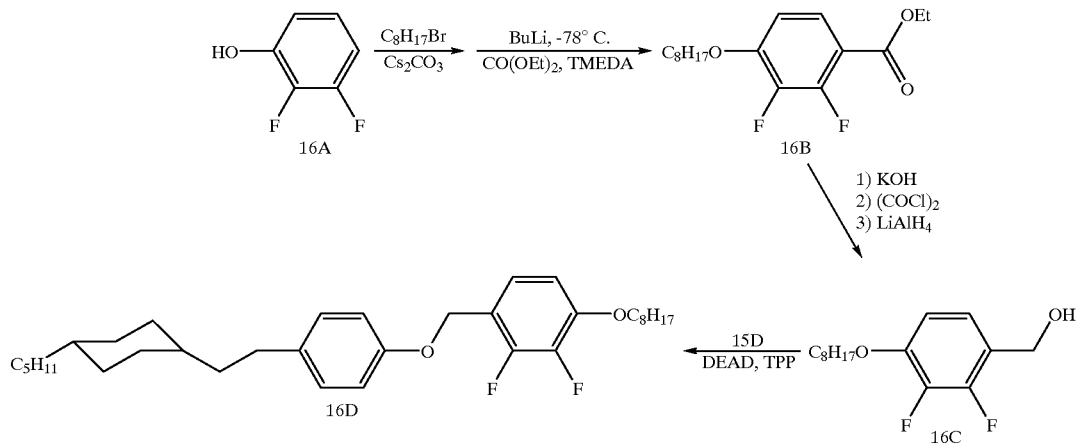

The synthesis of a difluorophenylpyridine core is illustrated in Scheme 17. The reaction sequence starts with commercially available difluorophenol 16A, which was iodinated using sodium iodide and bleach, giving the difluoroiodophenol, which was then alkylated to 17A using alkyl bromide and cesium carbonate. 17A was transformed into boric acid 17B by first doing a bromine-lithium exchange using butyllithium at −78° C. Addition of triisopropylborate and subsequent hydrolysis gave the boronic acid 17B. The arylboronic acid was then coupled to dibromopyridine in the presence of tetrakis-triphenylphosphine palladium to give the phenylpyridine 17C. The bromo group of 17C was then converted to a boronic acid, which was treated with hydrogen peroxide in acetic acid to give the desired phenol 17D in 60–65% yield.

All references cited in this specification are incorporated in their entirety by reference herein, to the extent not inconsistent with the disclosure herein. Although the description above contains many specificities, these should not be construed as limiting the scope of the invention, but as merely providing illustrations of some of the presently-preferred embodiments of this invention. Thus the scope of the invention should be determined by the appended claims and their legal equivalents, rather than by the examples given.

Scheme 17
Synthesis of a difluorophenylpyridine core

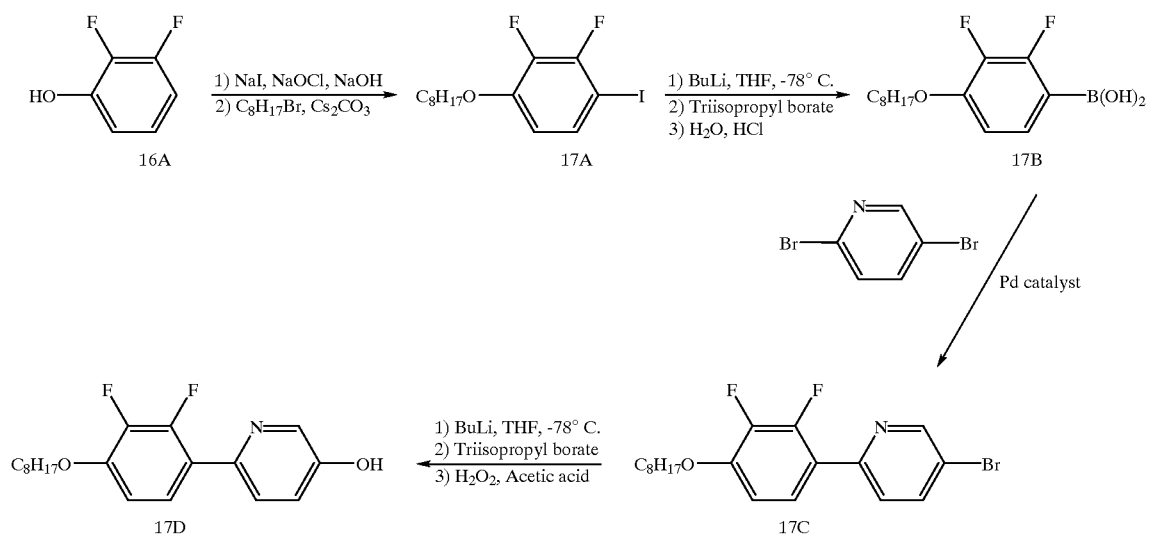

TABLE 1

Properties of compounds

| MDW # | Tilt Angle[1] | Switching Time (μsec)[1] | $T_{cr}$ (° C.)[2] | $T_{melt}$ (° C.)[2] |
|---|---|---|---|---|
| 1267 | 29.5 | 126 | −11.7 | −3.2 |
| 1268 | 22 | 98 | −15 | −1.2 |
| 1269 | 17 | 108 | −12.4 | −1.5 |
| 1270 | 12.2 | 109 | −13.1 | 0.3 |
| 1271 | 24 | 128 | −10.9 | −1.4 |
| 1272 | 25.5 | 130 | <−18 | |
| 1273 | 19 | 87 | −15.5 | −1.9 |
| 934 | 19.8 | 106 | −15.8 | −5.9 |

TABLE 1-continued

Properties of compounds

| MDW # | Tilt Angle[1] | Switching Time (μsec)[1] | $T_{cr}$ (° C.)[2] | $T_{melt}$ (° C.)[2] |
|---|---|---|---|---|
| 942 | 19 | 100 | | |
| 1274 | 7 | 54 | −13.3 | −9.7 |
| 1275 | 16 | 92 | −15.2 | −2 |

Notes:
[1]The tilt angle and switching time were measured at room temperature in 1.8 μm transmissive cell under 5 V/μm at 100 Hz.
[2]The crystallization temperature ($T_{cr}$) and melting point ($T_{melt}$) were measured by DSC (20° C. to −20° C. at 3° C./min; −20° C. to −30° C. at 2° C./min; −30° C. to 20° C. at 3° C./min).

TABLE 2

Physical properties of mixtures

| MDW # | % doped | Host[2,4] | $P_{ext}$[1] | Tilt Angle | $t_{0-90}$[5] | $t_{10-90}$[5] | Viscosity | Polarization (nC/cm2) | Rise time[3] | Switching Speed(μs) |
|---|---|---|---|---|---|---|---|---|---|---|
| 956 | 10 | 6111 | 0 | | | | | | | |
| 957 | 10 | 6111 | −82 | 11 | 408 | 335 | | | | |
| 964 | 10 | 6111 | −163 | 15 | 204 | 121 | | | | |
| 980 | 10 | 6111 | −69 | 12 | | 60 | | | | |
| 1086 | 10 | 6111 | 133 | 25 | 135 | 68 | | | | |
| 1088 | 10 | 6111 | 132 | 24 | 252 | 142 | | | | |
| 1089 | 10 | 6111 | 331 | 27 | 180 | 81 | | | | |
| 1091 | 10 | 6111 | −65 | 19 | 292 | 182 | | | | |
| 942 | 10 | 6146 | | 17 | | | 22.5 | 5.9 | | 108 |
| 942 | 20 | 6146 | | 11.7 | | 225 | 30 | 4.9 | 205 | |
| 934 | 20 | 6146 | | 15.5 | | 335 | 75 | 6.6 | 355 | |
| 1457 | 10 | 6146 | | 13 | | | 24.2 | 3.98 | | 195 |
| 1456 | 10 | 6146 | | 18 | | | 22.6 | 5.92 | 99 | |
| 1055 | 20 | 6146 | | 17.0 | | 250 | 51 | 8.0 | 257 | |
| 1135 | 15 | 6146 | | 25.0 | | 208 | 70 | 10.6 | 325 | |
| 1131 | 15 | 6146 | | 23.5 | | 195 | 94 | 10.0 | 325 | |
| 942 | 20 | 8058+[4] | | | | | 49 | 9.0 | 275 | |
| 1122 | 20 | 8058+[4] | | | | | 58 | 9.3 | 265 | |
| 1055 | 20 | 8058+[4] | | | | | 46 | 12.2 | 210 | |
| 1123 | 20 | 8058+[4] | | | | | 44 | 11.5 | 185 | |
| 1356 | 10 | 6146 | | 21.5 | | | 69 | 7.2 | | 173 |
| 1355 | 10 | 6146 | | 16.8 | | | 81 | 7.2 | | 130 |
| 1367 | 10 | 6146 | | 29.3 | | | 31 | 6.0 | | 150 |
| 1354 | 10 | 6146 | | 23.3 | | | 59 | 7.5 | | 110 |
| 1353 | 10 | 6146 | | 20 | | | 89 | 7.9 | | 185 |
| 1268 | 10 | 6146 | | 22 | | | 47 | 6.1 | | 98 |
| 1267 | 10 | 6146 | | 20.5 | | | 47 | 5.4 | | 126 |
| 1270 | 10 | 6146 | | 12.2 | | | 26 | 5.3 | | 109 |
| 1269 | 10 | 6146 | | 17 | | | 41 | 7.0 | | 108 |
| 1344 | 10 | 6146 | | 25 | | | 62 | 8.0 | | 125 |
| 1345 | 10 | 6146 | | 24.3 | | | 52 | 7.5 | | 128 |
| 1343 | 10 | 6146 | | 21.4 | | | 35 | 6.7 | | 125 |
| 1359 | 10 | 6146 | | 23 | | | 85 | 8.0 | | 141 |
| 1135 | 10 | 6146 | | 23.7 | | | 63.6 | 8.1 | | 128 |
| 1275 | 10 | 6146 | | 16 | | | 83 | 5.8 | | 92 |

TABLE 2-continued

Physical properties of mixtures

| MDW # | % doped | Host[2,4] | $P_{ext}$[1] | Tilt Angle | $t_{0-90}$[5] | $t_{10-90}$[5] | Viscosity | Polarization (nC/cm2) | Rise time[3] | Switching Speed(μs) |
|---|---|---|---|---|---|---|---|---|---|---|
| 6146 | | | | 21.2 | | | | | | 113 |
| 1055 | 10 | 6146 | | 19.8 | | | | 6.5 | | 129 |

Notes:
[1]The Pext is determined by multiplying the measured polarization by the inverse of the concentration.
[2]6111 host is made of phenylpyrimidines and has a smectic C phase from −9 to 58° C. 6146 host is 6111 host with 5% MDW 232 chiral dopant added and has a smectic phase from −11 to 57° C. 8058 host is made of phenylpyrimidines and has a C phase from −12 to 59° C. The structure of MDW 232 is:

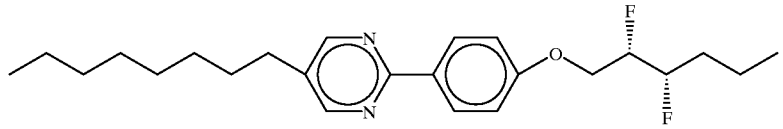

[3]Rise time is measured with a filed of 5V/μm.
[4]8058+ includes 4.5% MDW 232 chiral dopant.
[5]$t_{0-90}$ is the amount of time is takes to get from 0% to 90% of the optical response. $t_{10-90}$ is the amount of time is takes to get from 10% to 90% of the optical response.

TABLE 3

Phase Diagrams for pure materials

| MDW# | Phase Diagram |
|---|---|
| 1267 | I 109 N 85 SC 15 SX −3 X |
| 1268 | I 133 N 128.5 SZ 74 SC(?) 30 SC 2 SX |
| 1269 | I 159 SA 117 SC 79.5 SI −30 X |
| 1270 | I 179 SA 163 SC −70 SI (?) X |
| 1271 | I 119.3 N 96 SC −35 X |
| 1272 | I 156.5 N 148 SA 108 SC −55 SX −40 X |
| 1273 | I 122.5 SB |
| 934 | I 162 N 144 SX 35.6 X 42.5 SX' 52.5 SX 144 N 162 I |
| 942 | I 105 SB <10 X |
| 1256 | I 95 N 82 SB < RT S? |
| 1457 | Liquid at 25° C. |
| 1274 | I 81.5 SA <40 SC |
| 1275 | I 101.5 SB < RT X |
| 1055 | I 133 SB 62 X 76 SB |
| 1122 | I 90 S <20 X |
| 1123 | I 110 SB75 X |
| 1130 | I 184 N 181 S _X |
| 1131 | I> 199 N 195 S 153 S 88 SX |
| 1135 | I 186 N 175 S 104 S 85 SX 73.5 X |
| 1136 | I 161 A 130 SX 47.7 X 89 X |
| 938 | I 128 N 123 SB 55.6 X 52.5 S? 72 SB 123 N 128 I |
| 1064 | I 112 SB |
| 1076 | I 82 N _S? 24 X 46 S? _I |
| 1309 | I 119 SB <40 X |
| 939 | I 84 SB <20 X 22 SB |
| 1108 | I 157 N 148 SA 140 SC _S? X 75 S? 97 SC |
| 1310 | I 116 SB <40 X |
| 1311 | I 107 SB <20 X |
| 1312 | I 113.6 SB |
| 1309 | I 119 SB <40 X |
| 1306 | I 117.5 SB <40 X |
| 1273 | I 122.5 SB |
| 1024 | I 79 N 86 SB |
| 1014 | I 79 N 72 SB 58 X70 SB |
| 1061 | I 178 N 170 SA 120 SC 62 X |
| 1059 | I 115 N 94 SC 70 S? 60 S? |
| 1061 | I 178 N 170 SA 120 SC 62 |
| 1359 | I 87.5 N 74 SX 72 X |
| 1343 | I 83 X |
| 1345 | I 72.5 X |
| 1344 | I 100 N 89 SG 71 X |
| 1025 | I 190 SA 41 X 59 S? 63 SA |
| 1026 | I 161 N 150 SC 87 X 104 SC |
| 1027 | I 171 SA 81 X 88 SA |

TABLE 3-continued

Phase Diagrams for pure materials

| MDW# | Phase Diagram |
|---|---|
| 1028 | I 150 SA 148 SC 105 X |
| 1300 | I 116N 102 SC <40 SC 37 SX |
| 1303 | I 140.5 SA 121.5 SC |
| 1268 | I 133 N 128.5 SA 74 SC? 30 SC? 22.4 X |
| 1304 | I 140 SA 107.5 SC |
| 1267 | I 109 N 85 SC 15 SX −3 X |
| 1301 | I 118 N 95 SC _X |
| 1354 | I 110.5 N 88 SC 86 SG 55 X |
| 1353 | I 75 N 60 SG 49 X |
| 6146 | I 76 N 71 SA 56 SC −10.6 X −0.7 SC |
| 1356 | I 98.5 N 62.5 X |
| 1355 | I 67.5 N 62.5 SA 60 SB 55 X |
| 1367 | I 119.5 N 81.2 SA 45 X |

TABLE 4

Phase Diagrams for Mixtures

| MDW # | % Doped | Host | Phase Diagram |
|---|---|---|---|
| 1267 | 10 | 6146 | I 79.2 N 71.5 SA 60 SC |
| 1268 | 10 | 6146 | I 81.5 N 73 SA 61.2 SC |
| 1269 | 10 | 6146 | I 81 N 77.6 SA 51 SC |
| 1270 | 10 | 6146 | I 95-81 SA 41 SC |
| 1271 | 10 | 6146 | I 81.5 N 72.5 SA 63.8 SC |
| 1272 | 10 | 6146 | I 84.5 N 75 SA 64 SC |
| 1273 | 10 | 6146 | I 79.1 N 73 SA 51 SC |
| 934 | 10 | 6146 | I 84 N 75.5 SA 55.3 SC |
| 942 | 10 | 6146 | I 77 N 71.3 SA 51 SC −16.0 X |
| 1274 | 10 | 6146 | I 81.5 SA <40 SC |
| 1275 | 10 | 6146 | I 77.5 N 72 SA 46 SC |
| 6146 | | | I 77.7 N 72.2 SA 58.5 SC −10.6 X |
| 942 | 20 | 6146 | I 72 N 62 A 30 SC (−23) −4.5, −14 X |
| 934 | 20 | 6146 | I 83 N 68 A 38 SC (−19) −2 X |
| 1055 | 20 | 6146 | I 79 N 68 A 40 SC (−19) −2 X |
| 1135 | 15 | 6146 | I 91 N 78 A 71 SC (−19) −1, −11 X |
| 1131 | 15 | 6146 | I 93 N 79 A 70 SC (−19.5) −0.5, −9 X |
| 942 | 20 | 8058+[3] | I 80 N 62 A 48 SC (−33) −20 X |
| 1122 | 20 | 8058+[3] | I 77 N 59 A 49 SC (−33) −20 X |
| 1055 | 20 | 8058+[3] | I 85 N 66 A 53 SC (−27) −17 X |
| 1123 | 20 | 8058+[3] | I 79 N 63 A 50 SC (−33) −20 X |
| 1130 | 15 | 6111 | I 83 N 74 A 54 C (−14.5) −0.7 X |
| 1136 | 15 | 6111 | I 81 N 72 A 56 C (−16) −4 X |

TABLE 4-continued

Phase Diagrams for Mixtures

| MDW # | % Doped | Host | Phase Diagram |
|---|---|---|---|
| 1130 | 10 | 8058 | I 87.5 N 70 A 63C (−21) −27.5 X |
| 1136 | 10 | 8058 | I 86 N 69 A 66.5 X (−17) −27 X |
| 1055 | 10 | 6146 | I 80.5 N 82.6 SA 50 SC −16.8, −19.5 X |
| 1456 | 10 | 6146 | I 76.1 N 70.6 SA 46.1 SC −14.8 X |
| 1457 | 10 | 6146 | I 69.4 N 57 SA 47.2 SC −12 X |
| 1275 | 10 | 6146 | I 77.5 N 72 SA 46 SC |
| 1312 | 10 | 6146 | I 76.3 N 69.3 SA 47.4 SC −17.4 X |
| 1135 | 10 | 6146 | I 84 N 76 SA 66 SC −16.6 X |
| 1359 | 10 | 6146 | I 72.61 N __SA 56.76 SC −8.65 X |
| 1343 | 10 | 6146 | I 70.93 N 66.06 SA 53.03 SC 12.32 X |
| 1345 | 10 | 6146 | I 70.89 N 61.42 SA 54.76 SC −15.86 X |
| 1344 | 10 | 6146 | I 72.35 N 64.85 SA 59.14 SC 17.35 X |
| 1269 | 10 | 6146 | I 81 N 77.6 SA 51 SC |
| 1270 | 10 | 6146 | I 95-81 SA 41 SC |
| 1268 | 10 | 6146 | I 81.5 N 73 SA 61.2 SC |
| 1267 | 10 | 6146 | I 79.2 N 71.5 SA 60 SC |
| 1354 | 10 | 6146 | I 73.3 N 62.95 SA 58.51 SC −17.87 X |
| 1353 | 10 | 6146 | I 69.88 N 60.44 SA 51.59 SC −17.26 X |
| 1356 | 10 | 6146 | I 73 N 58 SA 54 SC |
| 1355 | 10 | 6146 | I 70.67 N 64.2 SA 51.64 SC −12.91 X |
| 1367 | 10 | 6146 | I 88.8 N 84.7 SA 76.2 SC |
| 1123 | 20 | 8058 | I 80 N 63 A 51 X (−33) −20 X |
| 1055 | 20 | 8058 | I 87 N 68 A 54 C (−27) −13, −17 X |
| 1122 | 20 | 8058 | I 78 N 60 A 50 C (−33) −20X |
| 942 | 20 | 8058 | I 81 N 63 A 49 C (−33) −20 X |
| 1124 | 20 | 8058 | I 61 N 39 A 35 C (−32) −24 X |
| 1125 | 20 | 8058 | I 72 N 39 A 35 C (−32) −19 X |
| 934 | 20 | 8058 | I 91 N 68 A 55 C (−32) −11, −17 X |
| 1076 | 20 | 8058 | I 79 N 39 C (−34, −38), −22 X |
| 1126 | 20 | 8058 | I 72 N 30 C (−33), −20 X |

Notes:
1. The phase diagrams were measured by optical observation or DSC.
2. 6111 host is made of phenylpyrimidines and has a smectic C phase from −9 to 58° C. 6146 host is 6111 host with 5% MDW 232 chiral dopant and has a smectic phase from −11 to 57° C. 8058 host is made of phenylpyrimidines and has a C phase from −12 to 59° C.
3. Host 8058+ includes 4.5% MDW 232 chiral dopant.

TABLE 5
Composition of MX 6111 and MX 8058
| Structure and MDW # | % Composition | Structure and MDW # | % Composition |
|---|---|---|---|
| MDW 1 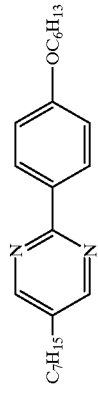 | 5.6 | MDW 3 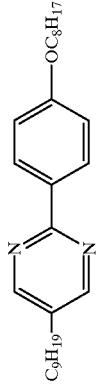 | 12.8 |
| MDW 2 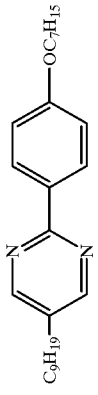 | 5.6 | MDW 4 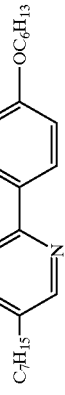 | 12.8 |
| MDW 3 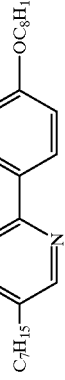 | 5.6 | MDW 5 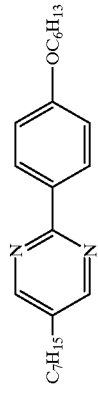 | 12.8 |
| MDW 4 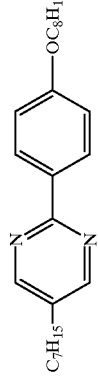 | 7.2 | MDW 6 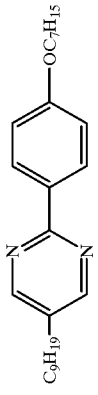 | 12.8 |
| MDW 22 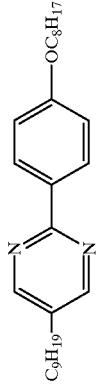 | 5.6 | MDW 31 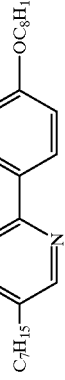 | 12.8 |
| MDW 31 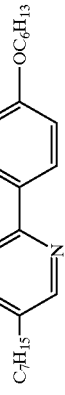 | 5.6 | MDW 336 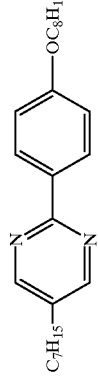 | 12 |
| MDW 343 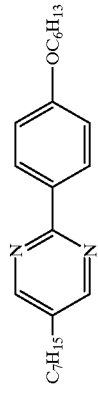 | 20 | MDW 576 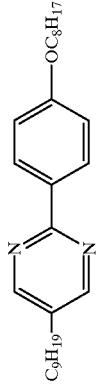 | 12 |

TABLE 5-continued

Composition of MX 6111 and MX 8058

| Structure and MDW # | % Composition | Structure and MDW # | % Composition |
|---|---|---|---|
| MDW 764 | 9.6 | MDW 577 | 12 |
| MDW 1287 | 33.6 | | |
| MX 6111+ (also known as MX 6146) MX 6111 MDW 232 | 95<br>5 | MX 8058+ MX 8058 MDW 232 | 95.5<br>4.5 |

We claim:

1. A liquid crystal composition comprising a host material and a low birefringence liquid crystal compound of the formula R$_1$—Ar—R$_2$, wherein Ar is a ring core moiety of the formula:

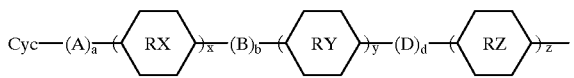

wherein Cyc is a 1,4-cyclohexenyl ring, RX is an aromatic ring, RY is a 1,4-cyclohexyl ring, A is —COO—, a, b, x and y are 1, d and z are 0, 1, R$_1$ is a terminally branched alkenyl group, having from 4 to 12 carbon atoms, R$_2$ is a straight chain alkyl group, having from 1 to 12 carbon atoms, and B is —(CH$_2$)$_w$—, wherein w is 1 to 6.

2. A liquid crystal composition comprising a host material and a low birefringence liquid crystal composition of the formula:

wherein

R$_1$ and R$_2$, independently of one another, are selected from the group consisting of internally branched alkyl groups having from 4 to 20 carbon atoms, terminally branched alkyl groups having from 3 to 20 carbon atoms, internally branched alkenyl groups having from 3 to 20 carbon atoms and terminally branched alkenyl groups having from 4 to 20 carbon atoms, wherein one or more —CH$_2$— groups in R$_1$ and R$_2$ may be independently replaced with O, said R$_1$ or R$_2$, independently of one another, can be partially or fully halogenated, and wherein one or both of said R$_1$ and R$_2$ can be absent;

Ar is a ring core moiety of the general formula:

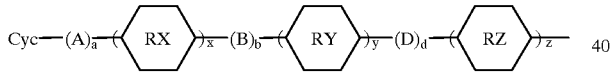

wherein
Cyc is a cyclohexyl ring or a cyclohexenyl ring;
RX is a phenyl ring which may be optionally substituted with one or more fluorines; RY is a cyclohexyl or cyclohexenyl ring;
wherein x and y are 1 and z is 0;

wherein A is COO; and B is selected from the group of small alkyl or alkenyl group having from 1 to 8 carbon atoms, COO and OCO;
wherein a and b are 1 and d is zero.

3. A liquid crystal composition comprising a host material and a low birefringence liquid crystal compound of the formula:

wherein R$_1$ (1–20 carbon atoms) is alkyl or alkenyl; R$_2$ (1–20 carbon atoms) is alkyl; and Ar is a ring core moiety of formula:

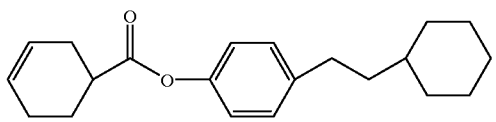

4. A liquid crystal composition comprising a host material and a low birefringence liquid crystal compound of the formula:

wherein

R$_1$ and R$_2$ are terminally branched alkenyl groups having from 4 to 20 carbon atoms or internally branched alkenyl groups having from 3 to 20 carbon atoms;

Ar is a ring core moiety of the general formula:

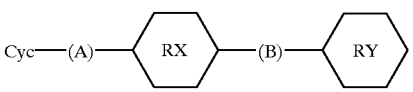

wherein Cyc is a cyclohexenyl ring; A is COO; B is selected from the group consisting of COO, CH$_2$CH$_2$ and CH$_2$O; RX is a cyclohexyl or phenyl ring; RY is a cyclohexyl or phenyl ring.

5. The composition of claim 1, wherein w is 2.
6. The composition of claim 1, wherein w is 4.

* * * * *

UNITED STATES PATENT AND TRADEMARK OFFICE
CERTIFICATE OF CORRECTION

PATENT NO. : 6,413,448 B1  
DATED : July 2, 2002  
INVENTOR(S) : Wand et al.

It is certified that error appears in the above-identified patent and that said Letters Patent is hereby corrected as shown below:

Column 2,  
Line 29, replace "fall" with -- full --.

Column 3,  
Line 23, delete "gm".

Column 9,  
Lines 23-25, replace "  " with -- 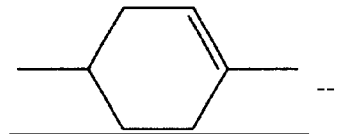 --

Lines 27-30, replace "  " with -- 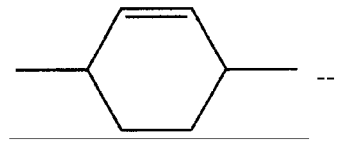 --

Column 15,  
Line 64, replace "H$_2$or" with -- H$_2$ or --.

Column 36,  
Line 65, replace "absop tion" with -- absorption --.

Column 48,  
Line 8, replace "suiflirfic" with -- sulfuric --.

Column 51,  
Line 20, replace "dimethylforrnamide" with -- dimethylformamide --.

Column 62,  
Line 61, replace "tetrahydrofaran" with -- tetrahydrofuran --.

Column 67 and 68,  
Scheme 11, line 47, replace " 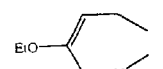 " with -- 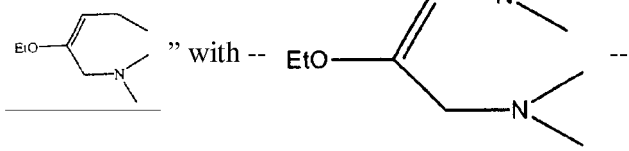 --

Column 68,  
Line 15, replace "tosylate" with -- tosylate. Methods to attach chiral tails to an FLC core are shown in Scheme 13. --.

Column 69,  
Line 8, replace "NEt$_5$" with -- NEt$_3$ --.

UNITED STATES PATENT AND TRADEMARK OFFICE
CERTIFICATE OF CORRECTION

PATENT NO.    : 6,413,448 B1
DATED         : July 2, 2002
INVENTOR(S)   : Wand et al.

It is certified that error appears in the above-identified patent and that said Letters Patent is hereby corrected as shown below:

Column 75,
Line 20, replace "filed" with -- field --.

Column 84,
Line 3, replace "COO and OCO" with -- and COO --.

Signed and Sealed this

Sixteenth Day of March, 2004

JON W. DUDAS
*Acting Director of the United States Patent and Trademark Office*